(12) United States Patent
Patel et al.

(10) Patent No.: US 8,475,933 B2
(45) Date of Patent: Jul. 2, 2013

(54) INTERPOLYMERS SUITABLE FOR MULTILAYER FILMS

(75) Inventors: Rajen M. Patel, Lake Jackson, TX (US); David W. Fuchs, Lake Jackson, TX (US); Pradeep Jain, Lake Jackson, TX (US); Seema Karande, Pearland, TX (US); Mehmet Demirors, Pearland, TX (US); Mark Grant Spencer, Lake Jackson, TX (US); Kim L. Walton, Lake Jackson, TX (US); Angela N. Taha, Missouri City, TX (US); Phillip D. Hustad, Manvel, TX (US); Roger L. Kuhlman, Lake Jackson, TX (US); Anthony J. Castelluccio, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/424,755

(22) Filed: Mar. 20, 2012

(65) Prior Publication Data
US 2012/0231287 A1     Sep. 13, 2012

Related U.S. Application Data

(63) Continuation of application No. 11/762,643, filed on Jun. 13, 2007, now Pat. No. 8,153,243, which is a continuation-in-part of application No. 11/608,171, filed on Dec. 7, 2006.

(60) Provisional application No. 60/749,308, filed on Dec. 9, 2005.

(51) Int. Cl.
*B32B 27/32* (2006.01)
*C08F 210/02* (2006.01)

(52) U.S. Cl.
USPC ........... 428/523; 428/339; 428/219; 526/348; 526/348.2

(58) Field of Classification Search
USPC .................................................. 428/219, 339
See application file for complete search history.

(56) References Cited

U.S. PATENT DOCUMENTS

| | | | |
|---|---|---|---|
| 2,973,344 A | 2/1961 | Fasce | |
| 2,997,432 A | 8/1961 | Koble et al. | |
| 3,873,642 A | 3/1975 | Jezl | |

(Continued)

FOREIGN PATENT DOCUMENTS

| | | |
|---|---|---|
| EP | 0500590 | 7/1995 |
| EP | 0719797 | 7/1996 |

(Continued)

OTHER PUBLICATIONS

International Search Report and Written Opinion of the International Searching Authority, mailed May 15, 2007 (PCT/US2006/060209).

(Continued)

*Primary Examiner* — David Sample
*Assistant Examiner* — Tahseen N Khan
(74) *Attorney, Agent, or Firm* — Whyte Hirschboeck Dudek S.C.

(57) ABSTRACT

The present invention relates to compositions and processes of making and using interpolymers having a controlled molecular weight distribution. Multilayer films and film layers derived from novel ethylene/α-olefin interpolymers are also disclosed.

20 Claims, 30 Drawing Sheets

U.S. PATENT DOCUMENTS

| | | |
|---|---|---|
| 4,146,492 A | 3/1979 | Cusano et al. |
| 4,299,931 A | 11/1981 | Coran et al. |
| 4,429,079 A | 1/1984 | Shibata et al. |
| 4,510,031 A | 4/1985 | Matsumura et al. |
| 4,780,228 A | 10/1988 | Gardiner et al. |
| 4,798,081 A | 1/1989 | Hazlitt et al. |
| 5,068,047 A | 11/1991 | Chung et al. |
| 5,266,626 A | 11/1993 | Hert et al. |
| 5,322,728 A | 6/1994 | Davey et al. |
| 5,344,691 A | 9/1994 | Hanschen et al. |
| 5,354,597 A | 10/1994 | Capik et al. |
| 5,376,430 A | 12/1994 | Swenson et al. |
| 5,391,629 A | 2/1995 | Turner et al. |
| 5,422,178 A | 6/1995 | Swenson et al. |
| 5,424,025 A | 6/1995 | Hanschen et al. |
| 5,429,856 A | 7/1995 | Krueger et al. |
| 5,462,708 A | 10/1995 | Swenson et al. |
| 5,468,428 A | 11/1995 | Hanschen et al. |
| 5,468,810 A | 11/1995 | Hayakawa et al. |
| 5,501,679 A | 3/1996 | Krueger et al. |
| 5,594,080 A | 1/1997 | Waymouth et al. |
| 5,597,881 A | 1/1997 | Winter et al. |
| 5,610,253 A | 3/1997 | Hatke et al. |
| 5,620,780 A | 4/1997 | Krueger et al. |
| 5,624,991 A | 4/1997 | Harada et al. |
| 5,691,034 A | 11/1997 | Krueger et al. |
| 5,733,980 A | 3/1998 | Cozewith et al. |
| 5,783,531 A | 7/1998 | Andrew et al. |
| 5,798,420 A | 8/1998 | Cozewith et al. |
| 5,800,903 A | 9/1998 | Wood et al. |
| 5,868,984 A | 2/1999 | Winter et al. |
| 5,892,076 A | 4/1999 | Nickias |
| 5,916,953 A | 6/1999 | Jacoby et al. |
| 5,969,070 A | 10/1999 | Waymouth et al. |
| 5,994,255 A | 11/1999 | Nickias et al. |
| 6,008,262 A | 12/1999 | McKay et al. |
| 6,025,448 A | 2/2000 | Swindoll et al. |
| 6,096,668 A | 8/2000 | Abuto et al. |
| 6,114,457 A | 9/2000 | Markel et al. |
| 6,121,402 A | 9/2000 | Machida et al. |
| 6,136,937 A | 10/2000 | Lai et al. |
| 6,147,180 A | 11/2000 | Markel et al. |
| 6,160,029 A | 12/2000 | Chaudhary et al. |
| 6,187,424 B1 | 2/2001 | Kjellqvist et al. |
| 6,197,404 B1 | 3/2001 | Varona |
| 6,262,174 B1 | 7/2001 | Cooper et al. |
| 6,262,203 B1 | 7/2001 | Chien et al. |
| 6,362,252 B1 | 3/2002 | Prutkin |
| 6,420,507 B1 | 7/2002 | Kale et al. |
| 6,455,638 B2 | 9/2002 | Laughner et al. |
| 6,482,895 B2 * | 11/2002 | Maugans et al. ............... 525/191 |
| 6,482,896 B2 * | 11/2002 | Maugans et al. ............... 525/191 |
| 6,537,472 B2 | 3/2003 | Masubuchi |
| 6,566,446 B1 | 5/2003 | Parikh et al. |
| 6,566,544 B1 | 5/2003 | Waymouth et al. |
| 6,656,601 B1 * | 12/2003 | Kawachi et al. ............... 428/483 |
| 6,815,023 B1 | 11/2004 | Tatarka et al. |
| 7,005,395 B2 | 2/2006 | Zafiroglu et al. |
| 7,355,089 B2 | 4/2008 | Chang et al. |
| 7,504,347 B2 | 3/2009 | Poon et al. |
| 7,514,517 B2 | 4/2009 | Hoenig et al. |
| 7,524,911 B2 | 4/2009 | Karjala et al. |
| 2002/0123580 A1 | 9/2002 | Wenzel et al. |
| 2002/0192437 A1 | 12/2002 | Takagi et al. |
| 2003/0027954 A1 | 2/2003 | Becke et al. |
| 2003/0060529 A1 * | 3/2003 | Ho et al. ............... 522/75 |
| 2003/0195128 A1 | 10/2003 | Deckman et al. |
| 2003/0216518 A1 | 11/2003 | Tau et al. |
| 2004/0082750 A1 | 4/2004 | Tau et al. |
| 2004/0092662 A1 | 5/2004 | Goto et al. |
| 2004/0158011 A1 | 8/2004 | Jain et al. |
| 2004/0192147 A1 | 9/2004 | Smith et al. |
| 2004/0220050 A1 | 11/2004 | Frazier et al. |
| 2005/0009993 A1 | 1/2005 | Morioka et al. |
| 2005/0085600 A1 | 4/2005 | Ehrman et al. |
| 2006/0030667 A1 | 2/2006 | Yalvac et al. |
| 2006/0198983 A1 | 9/2006 | Patel et al. |
| 2006/0199030 A1 | 9/2006 | Liang et al. |
| 2006/0199744 A1 | 9/2006 | Walton et al. |
| 2006/0199872 A1 | 9/2006 | Prieto et al. |
| 2006/0199887 A1 | 9/2006 | Liang et al. |
| 2006/0199896 A1 | 9/2006 | Walton et al. |
| 2006/0199905 A1 | 9/2006 | Hughes et al. |
| 2006/0199906 A1 | 9/2006 | Walton et al. |
| 2006/0199908 A1 | 9/2006 | Cheung et al. |
| 2006/0199910 A1 | 9/2006 | Walton et al. |
| 2006/0199911 A1 | 9/2006 | Markovich et al. |
| 2006/0199912 A1 | 9/2006 | Fuchs et al. |
| 2006/0199914 A1 | 9/2006 | Harris et al. |
| 2006/0199930 A1 | 9/2006 | Shan et al. |
| 2006/0199931 A1 | 9/2006 | Poon et al. |
| 2006/0205833 A1 | 9/2006 | Martinez et al. |
| 2006/0211819 A1 | 9/2006 | Hoenig et al. |
| 2007/0010616 A1 | 1/2007 | Kapur et al. |
| 2007/0275219 A1 * | 11/2007 | Patel et al. ............... 428/219 |
| 2008/0299857 A1 | 12/2008 | Harding et al. |

FOREIGN PATENT DOCUMENTS

| | | |
|---|---|---|
| EP | 0274906 | 7/1998 |
| EP | 0877050 | 11/1998 |
| EP | 1026184 | 8/2000 |
| EP | 0958313 | 9/2002 |
| EP | 1241175 | 9/2002 |
| EP | 1262498 | 12/2002 |
| JP | 2002206007 | 7/2002 |
| JP | 2004204058 | 7/2004 |
| WO | 9527745 | 10/1995 |
| WO | 9527746 | 10/1995 |
| WO | 9834970 | 8/1998 |
| WO | 9935171 | 7/1999 |
| WO | 0037514 | 6/2000 |
| WO | 0078859 | 12/2000 |
| WO | 0162847 | 8/2001 |
| WO | 0246249 | 6/2002 |
| WO | 02066540 | 8/2002 |
| WO | 02079322 | 10/2002 |
| WO | 03014046 | 2/2003 |
| WO | 03040202 | 5/2003 |
| WO | 2004016627 | 2/2004 |
| WO | 2004026925 | 4/2004 |
| WO | 2004041928 | 5/2004 |
| WO | 2004063270 | 7/2004 |
| WO | 2005090425 | 9/2005 |
| WO | 2005090426 | 9/2005 |
| WO | 2005090427 | 9/2005 |
| WO | 2006007094 | 1/2006 |
| WO | 2006009976 | 1/2006 |
| WO | 2006101597 | 9/2006 |
| WO | 2006101930 | 9/2006 |
| WO | 2006101966 | 9/2006 |
| WO | 2006101968 | 9/2006 |
| WO | 2006102149 | 9/2006 |
| WO | 2006102152 | 9/2006 |
| WO | 2007035485 | 3/2007 |
| WO | 2007037944 | 4/2007 |
| WO | 2007067965 | 6/2007 |

OTHER PUBLICATIONS

International Search Report and Written Opinion of the International Searching Authority, mailed Aug. 1, 2007 (PCT/US2006/061761).

Database Caplus [online], Chemical Abstracts Service, Columbus, OH, US; Matsuura, Sadahiko, et al: Manufacture of polyolefins with high molecular weight and narrow molecular weight distribution using post-metallocene cataylsts (XP002432182) retrieved from STN Database accession No. 2002:958650 abstract and JP 2002 363210A, Mitsui Chemicals Inc., Dec. 18, 2002.

Arriola, Daniel J., et al. Catalytic Production of Olefin Block Copolymers via Chain Shuttling Polymerization, Science (Washington, DC, United States), May 12, 2006, pp. 714-719, vol. 312, XP008068979.

Spencer, Liam P. et al., Synthesis and reactivity of zirconium and hafnium complexes incorporating chelating diamido-N-heterocylic-carbene ligands, Journal of Organometallic Chemistry, 690 (24-25), 5788-5803 Coden: Jorcai; ISSN: 0022-328X, 2005, XP005391781.

Kui, Steven C.F. et al., Observation of Intramolecular C-H . . . F-C Contacts in Non-Metallocene Polyolefin Catalysts: Model for Weak Attractive Interactions between Polymer Chain and Noninnocent Ligand, Angewandte Chem., International Edition, 42(14), 1628-1632 Coden: ACIEF5, ISSN: 1433-7851, 2003, XP008078468.

Shao, Pengcheng et al., Dibenzylzirconium Complexes of Chelating Aminodiolates, Synthesis, Structural Studies, Thermal Stability, and Insertion Chemistry, Oranometallics, 19(4), 509-520 Coden: ORGND7, ISSN: 0276-7333, 2000, XP001125766.

International Search Report (PCT/US2008/066735), dated Sep. 24, 2008.

* cited by examiner

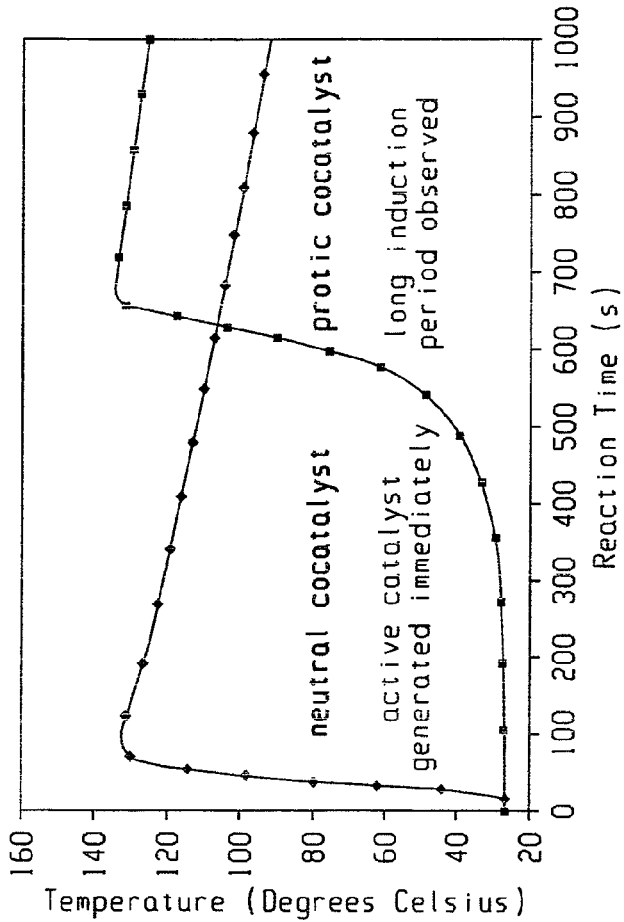
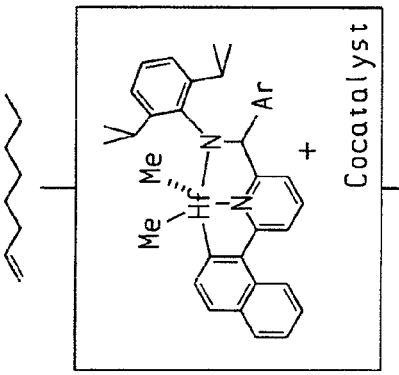
Fig. 3

A New Mechanism Proposed
To Account for Multi-Site Behavior
Conventional polymerization mechanism involves insertions into Hf-alkyl bond
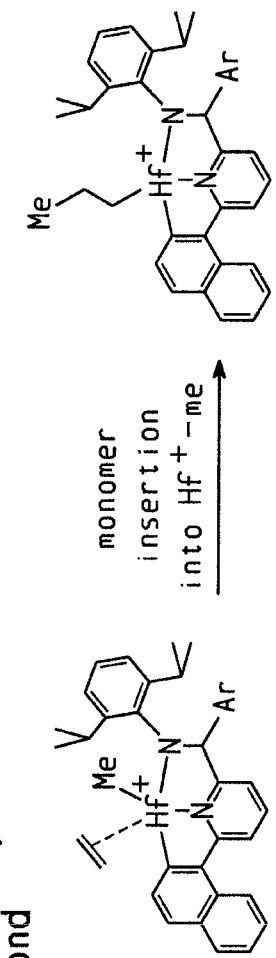
New mechanism proposed with initial insertion into Hf-aryl bond
- First insertion into aryl to generate new species
- Subsequent insertions and chain growth into alkyl in conventional fashion
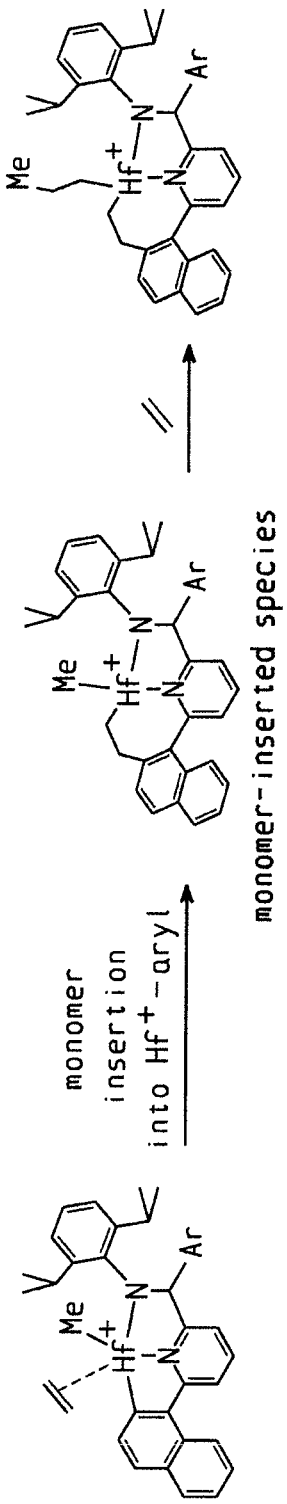
Fig. 4

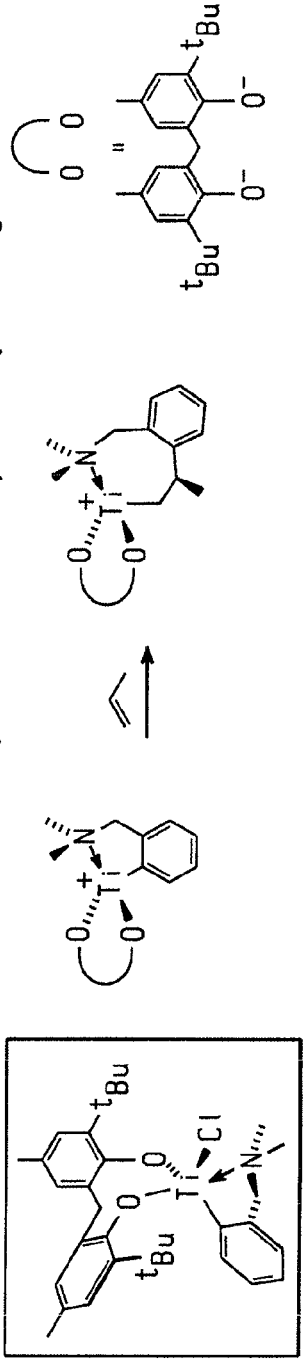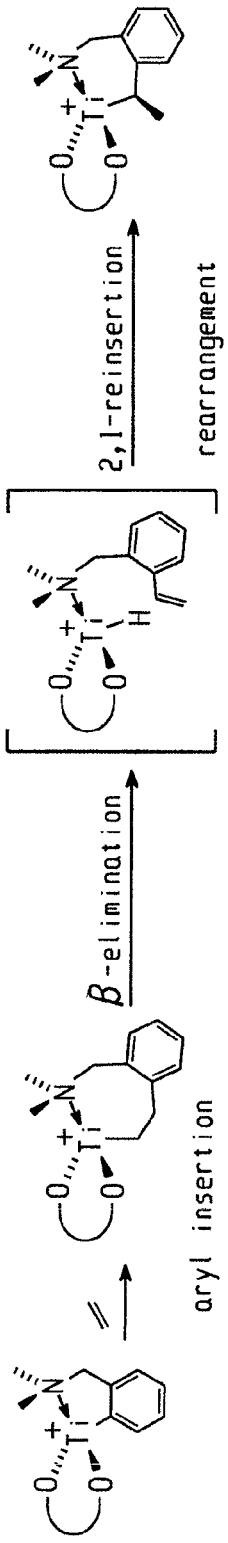
Fig. 5

Summary and Conclusions
From Pyridylamide Chemistry

Pyridylamide Catalysts ARE NOT Single Site in Copolymerizations
- Ethylene/octene copolymers have bimodal molecular weight distributions
- Activation chemistry complicated with protic cocatalysts, but does not explain the observed multi-site behavior

New Active Sites Proposed from Single Insertion into Hf-aryl bond
- Mechanism supported by DFT calculations
- Up to 10 active sites possible in ethylene/α-olefin copolymerization

Evidence Suggests Aryl-Inserted Species are the Active Catalysts
- Insertion of $^{13}$c-ethylene observed via low temperature NMR
- Ligand with appended 4MP1 isolated and characterized by X-ray
- Quench of "living" PE shows more monomer-inserted species in polymer
- Polymer bimodality strongly correlated to reactor monomer composition

Fig. 14

INTERPOLYMERS SUITABLE FOR MULTILAYER FILMS

CROSS-REFERENCE TO RELATED APPLICATIONS

This application is a Continuation of U.S. application Ser. No. 11/762, 643, filed on Jun. 13, 2007, now U.S. Pat. No. 8,153,243 which is a Continuation-In-Part Application of U.S. application Ser. No. 11/608,171, filed on Dec. 7, 2006, which claims the benefit under 35 U.S.C 119(e) of U.S. Provisional Application No. 60/749,308, filed Dec. 9, 2005, both of which are herein incorporated by reference in their entirety.

FIELD OF THE INVENTION

The present invention relates to ethylene/α-olefin interpolymer compositions having a controlled molecular weight distribution and methods of making and using the compositions. More particularly, the invention relates to using the ethylene/α-olefin interpolymer compositions in multilayer films.

BACKGROUND OF THE INVENTION

It is desirable to produce ethylene/α-olefin interpolymer compositions of controlled molecular weight distribution in a cost-effective manner. In particular ethylene/α-olefin interpolymer compositions having a multi-modal (two or more modes wherein the case of two may interchangeably be referred to as bimodal or multi-modal) molecular weight distribution are often desirable for some applications, for example, pipes for natural gas, sewers, mining, etc. Also, some applications may require compositions wherein a low molecular weight portion of the ethylene/α-olefin interpolymer composition has a higher density than a high molecular weight portion of the ethylene/α-olefin interpolymer composition. Unfortunately, to date the available processes do not effectively and efficiently control the distribution or result in compositions with the desired density and molecular weight combinations. Therefore, there is a need for processes that can control the molecular weight distribution or result in compositions with the desired density and molecular weight combinations. There is also a need for interpolymers having improved properties, e.g., heat seal and residual enthalpy, as well as, improved film layers and films having such properties.

SUMMARY OF THE INVENTION

New processes have been discovered which result in effective control of molecular weight distribution. Advantageously, the inventive processes may be designed to result in compositions wherein a low molecular weight portion of the ethylene/α-olefin interpolymer composition has a higher density than a high molecular weight portion of the ethylene/α-olefin interpolymer composition. Also, the ethylene/α-olefin interpolymer composition may be produced in a single polymerization reactor and/or using a single catalyst. Novel compositions often may result from the aforementioned processes. The novel compositions comprise an ethylene/α-olefin interpolymer composition with a multi-modal molecular weight distribution and one or more molecules having a gram molecular weight equal to about ((the molecular weight of an aryl or hydrocarbyl-ligand of a pre-catalyst)+28+14*X), wherein X represents an integer from zero to 10, preferably zero to 8.

Novel multilayer films have been discovered that comprise:
(A) a base layer comprising a first polymer;
(B) a tie layer comprising a second polymer; and
(C) a sealant layer comprising an ethylene/α-olefin interpolymer, wherein the tie layer is between the base layer and the sealant layer and wherein the ethylene/α-olefin interpolymer of the sealant layer has a DSC curve characterized by an area under the DSC curve from the melting peak temperature to the end of melting is at least about 17% and, in most cases at most about 50%, of the total area under the DSC melting curve from −20° C. to the end of melting. The interpolymer may have a B value of greater than 0.98. Novel film layers have also been discovered that comprise one or more novel ethylene/α-olefin interpolymers having a DSC curve characterized by an area under the DSC curve from the melting peak temperature to the end of melting is at least about 17%, preferably at least 18%, of the total area under the DSC melting curve from −20° C. to the end of melting. Novel ethylene/α-olefin interpolymers have been discovered that comprise the following characteristics: a density in g/cc, d, and a weight percent α-olefin, Wt. %, wherein the numerical values of d and Wt. % correspond to the relationship: d≦−0.0018 Wt. %+0.9297 and/or the relationship d≦−0.0019 Wt. %+0.933.

BRIEF DESCRIPTION OF THE DRAWINGS

FIGS. 1-14 are a series of slides explaining multi-site behavior in copolymerizations.

DETAILED DESCRIPTION OF THE INVENTION

General Definitions

Figure 1:
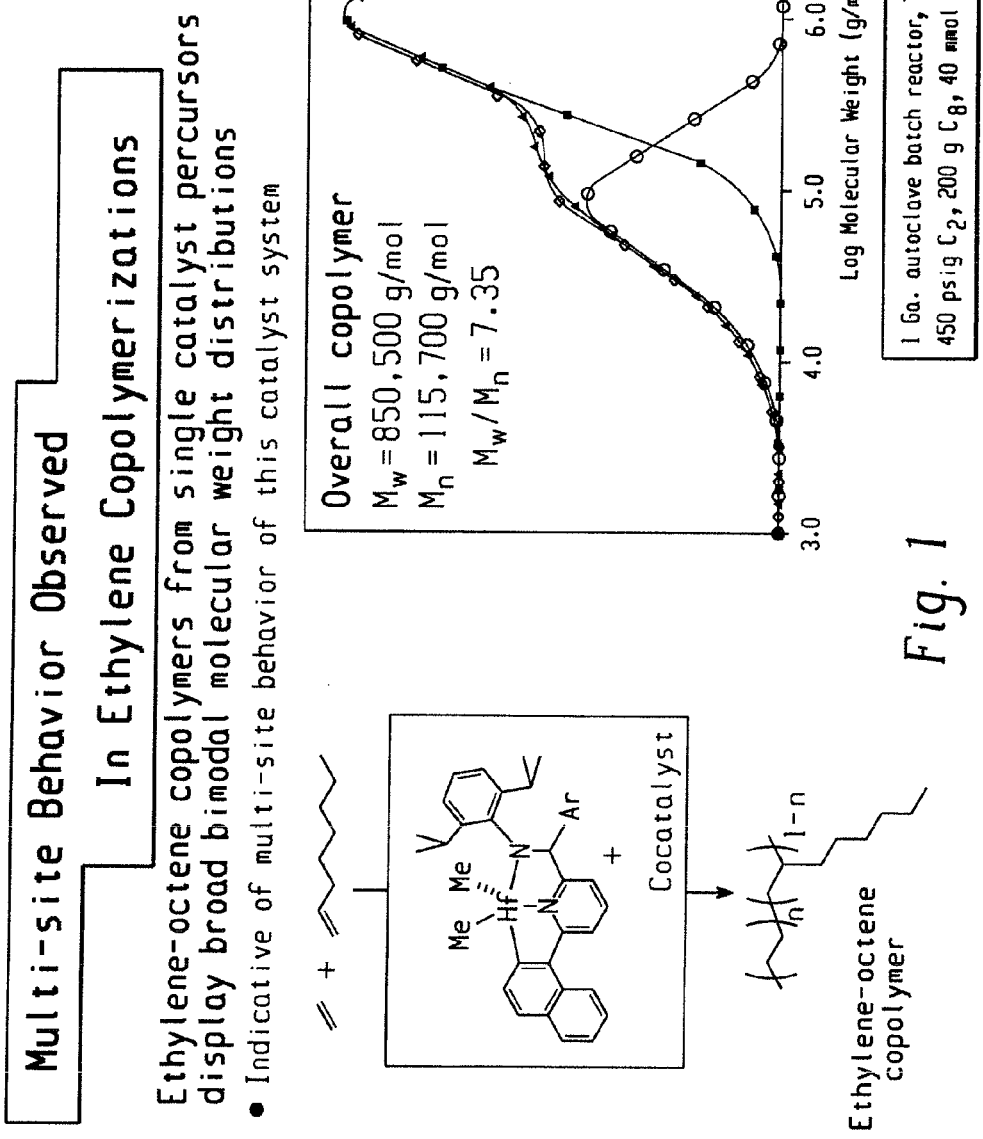
Figure 2:
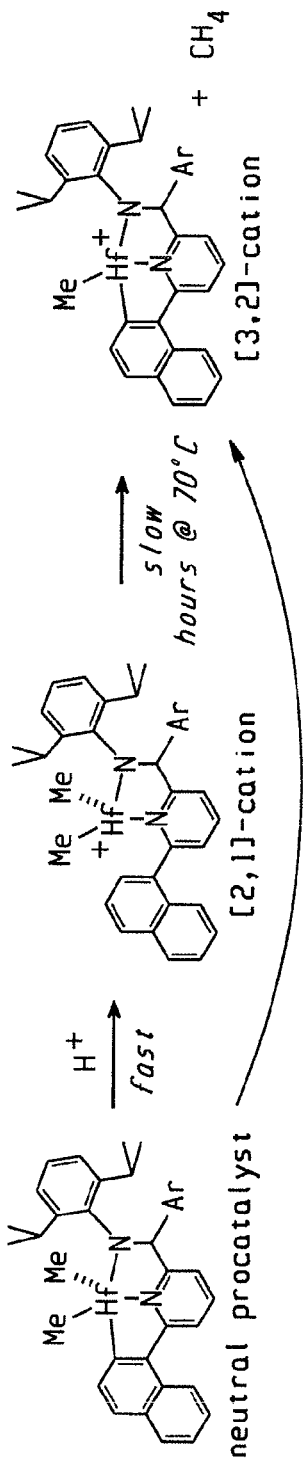
Figure 6:
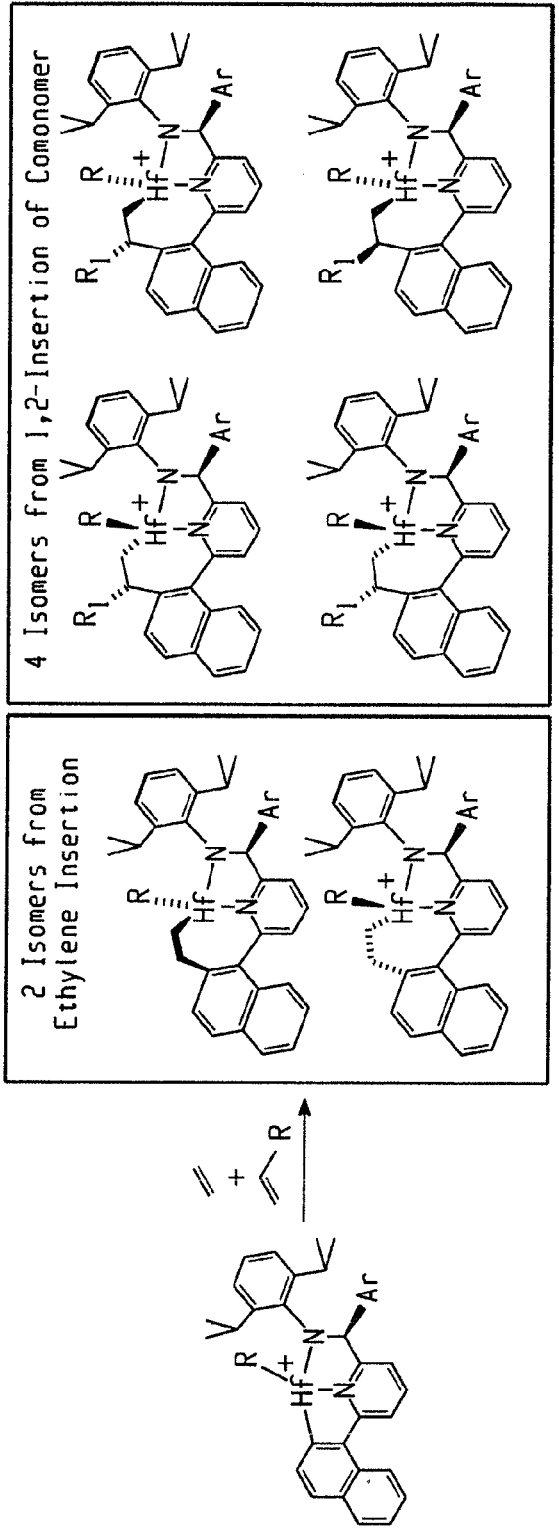
Figure 7:
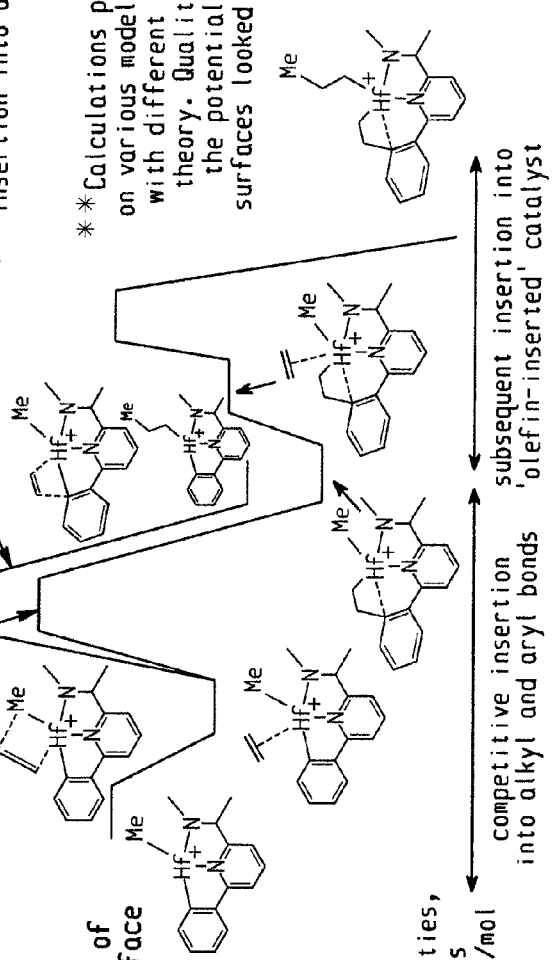
Figure 8:
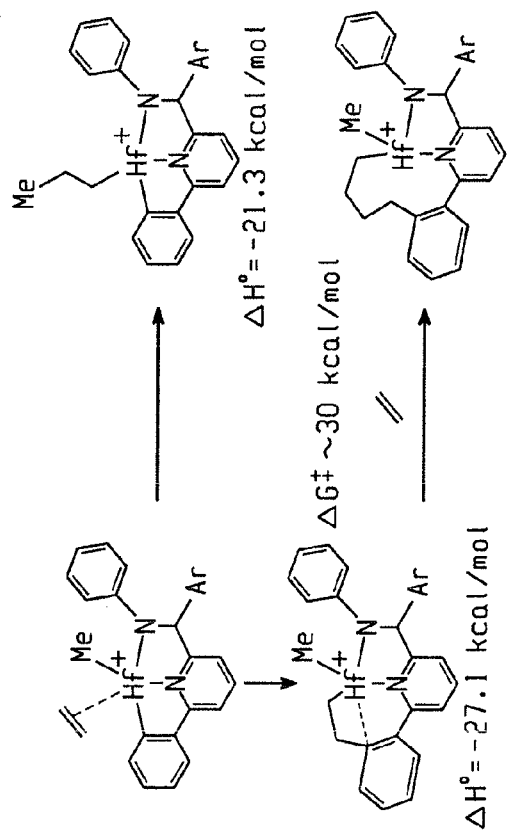
Figure 9:
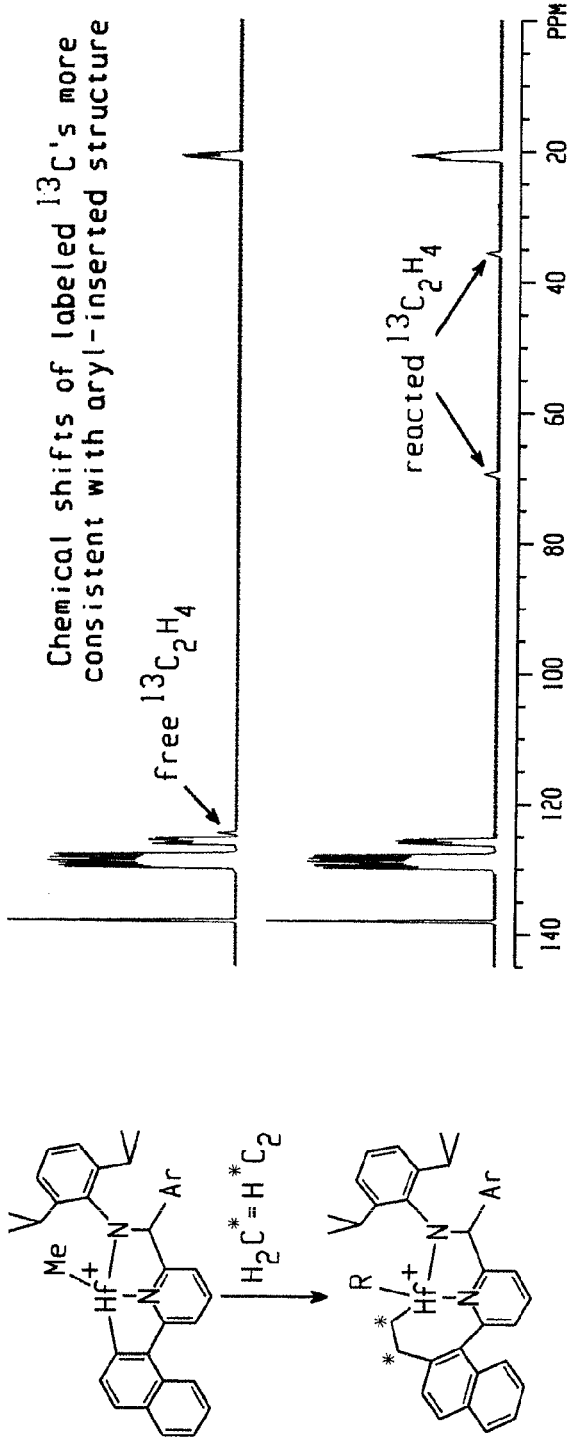
Figure 10:
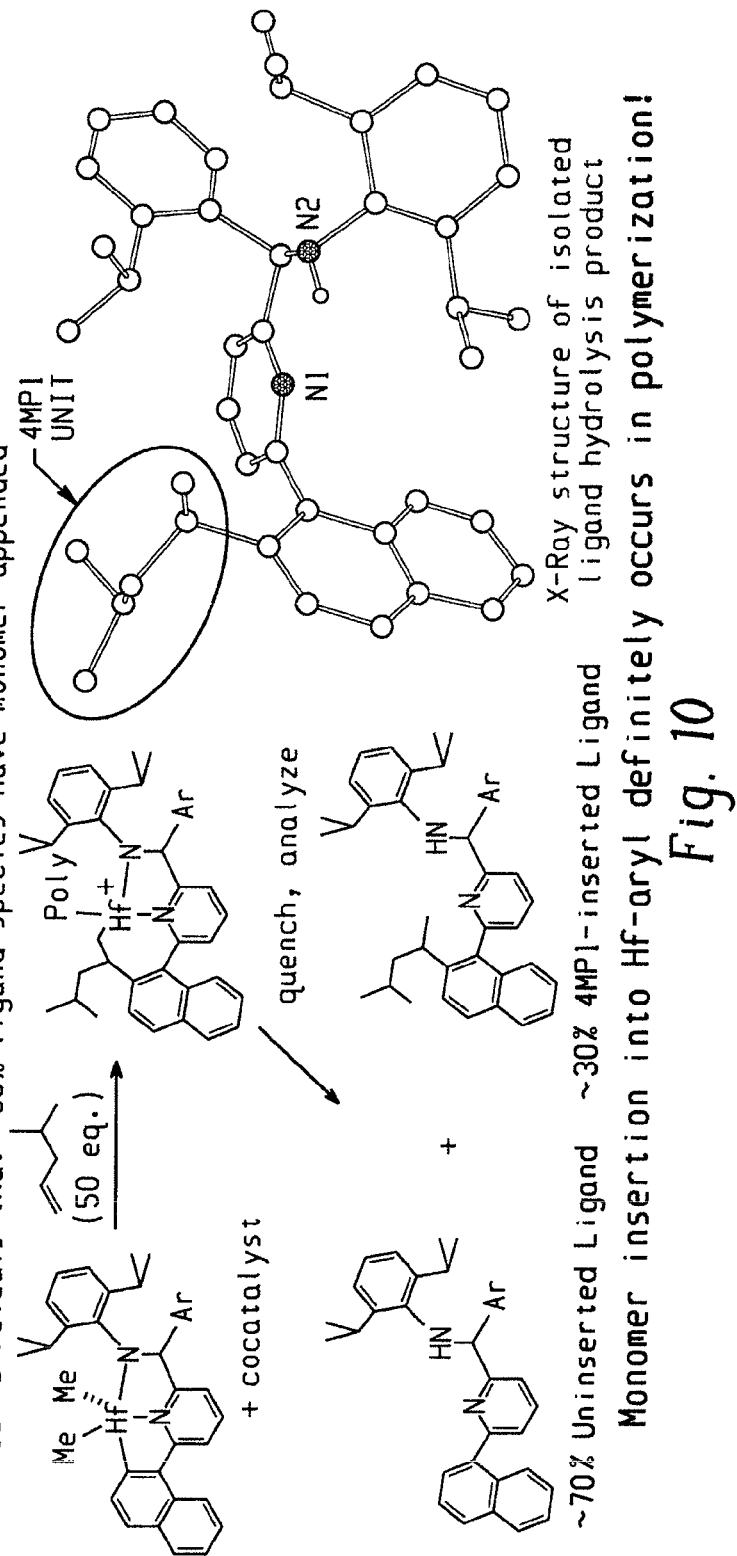
Figure 11:
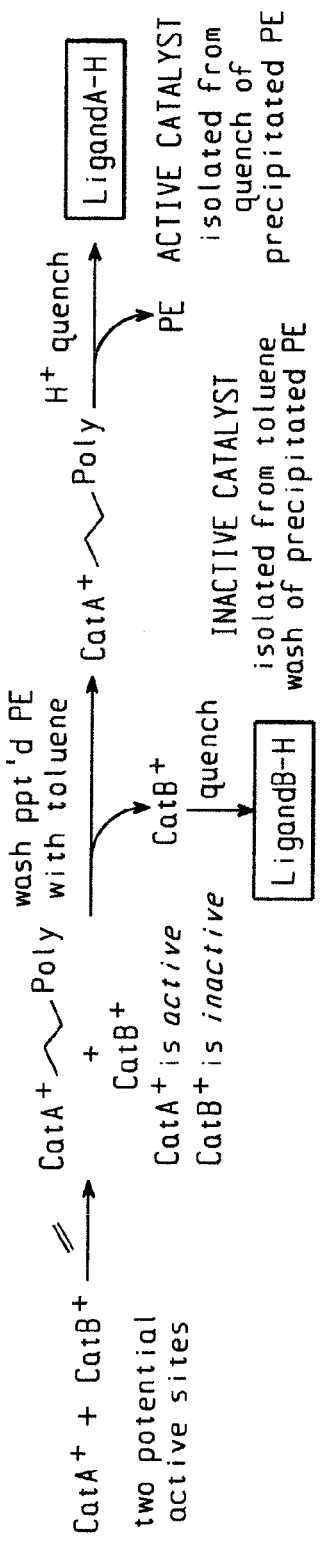
Figure 12:
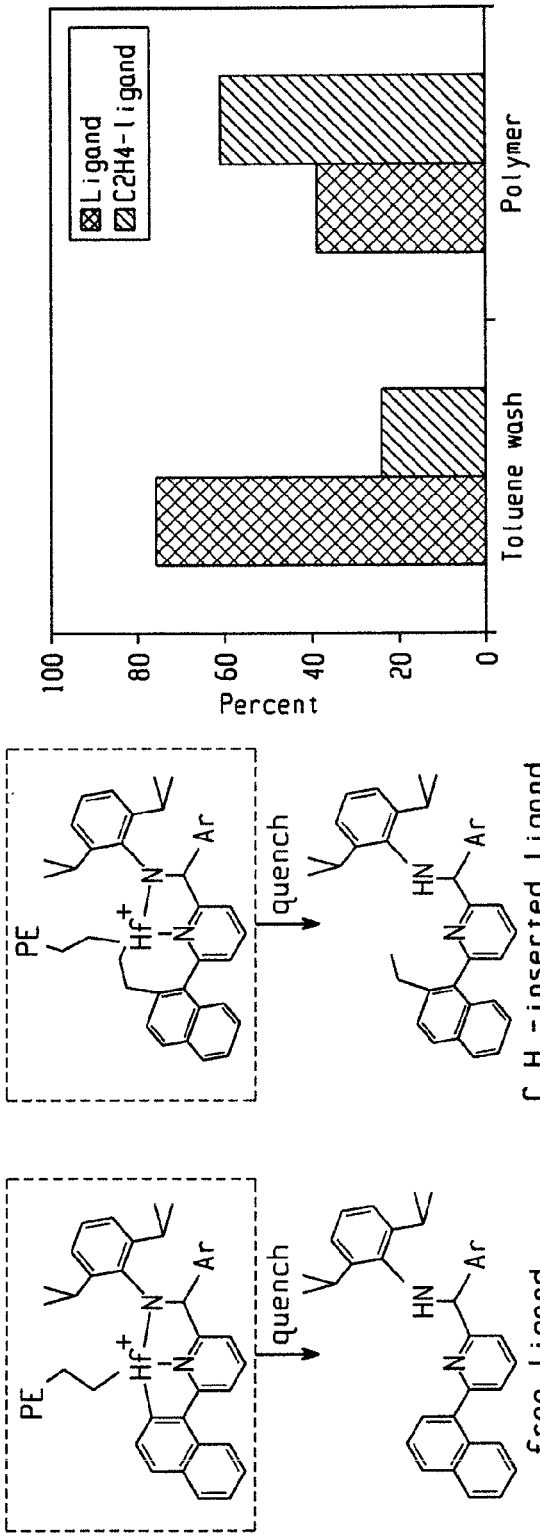
Figure 13:
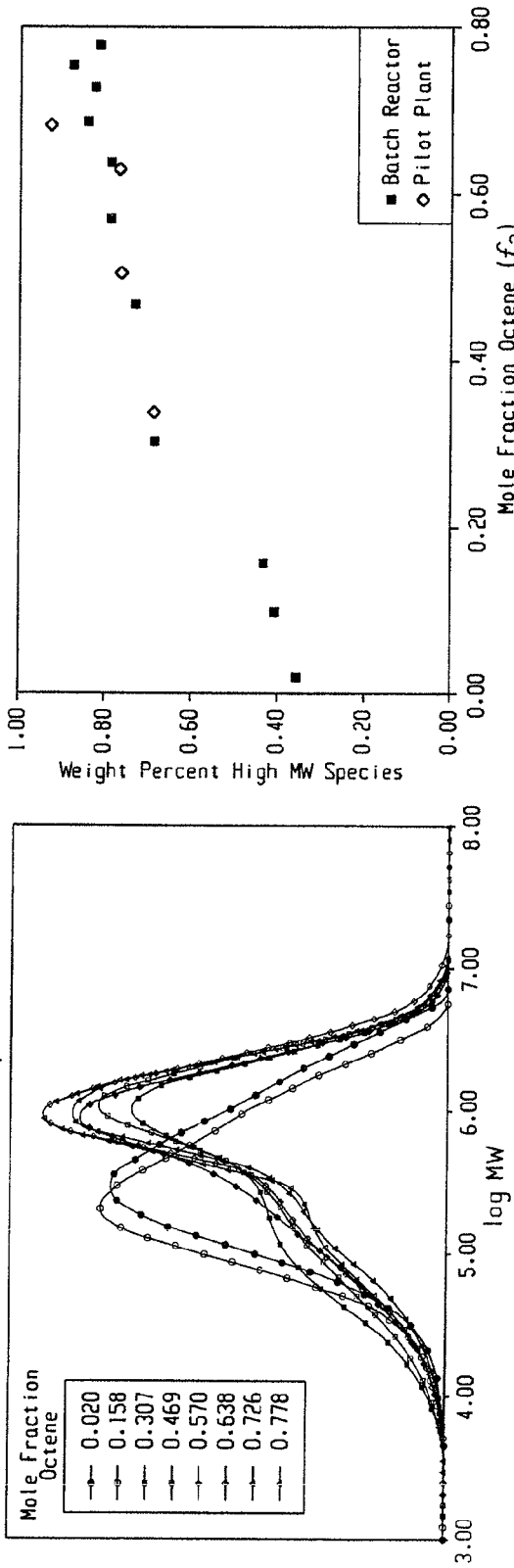
Figure 15:
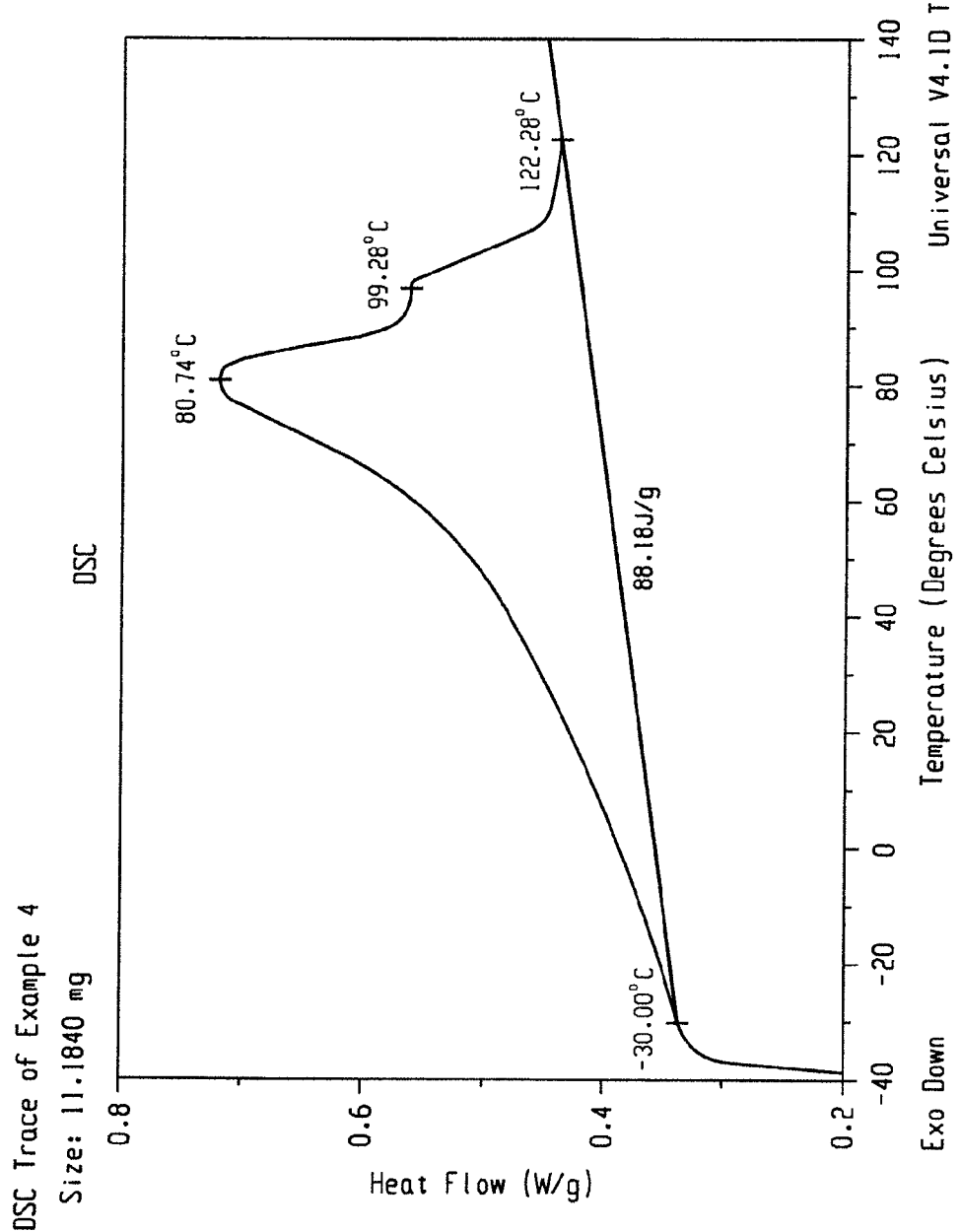
FIGS. 15-19 are differential scanning calorimetry (DSC) curves for polymer made from Examples 4, 6, 12, 14 and 15, respectively.
Figure 16:
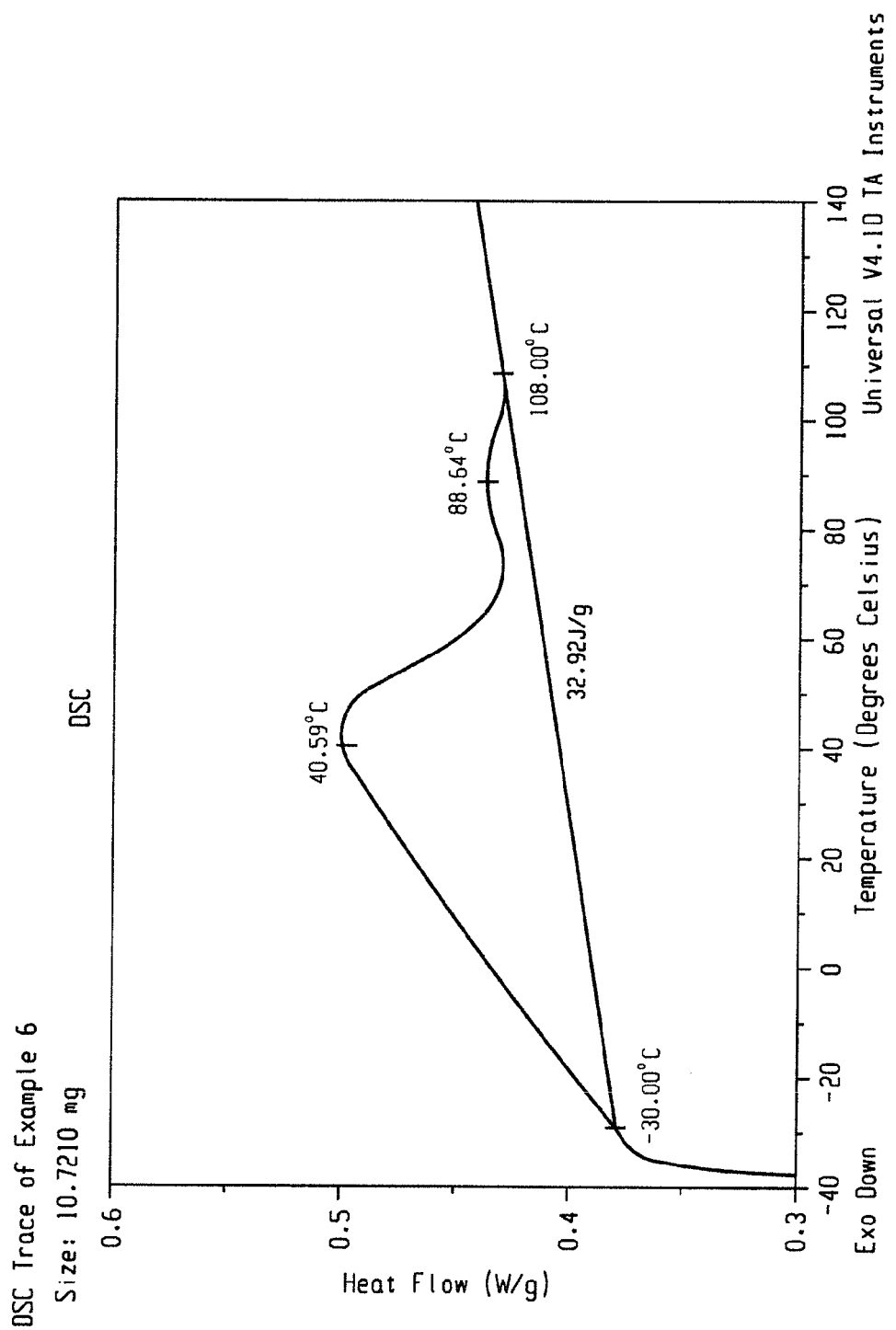
Figure 17:
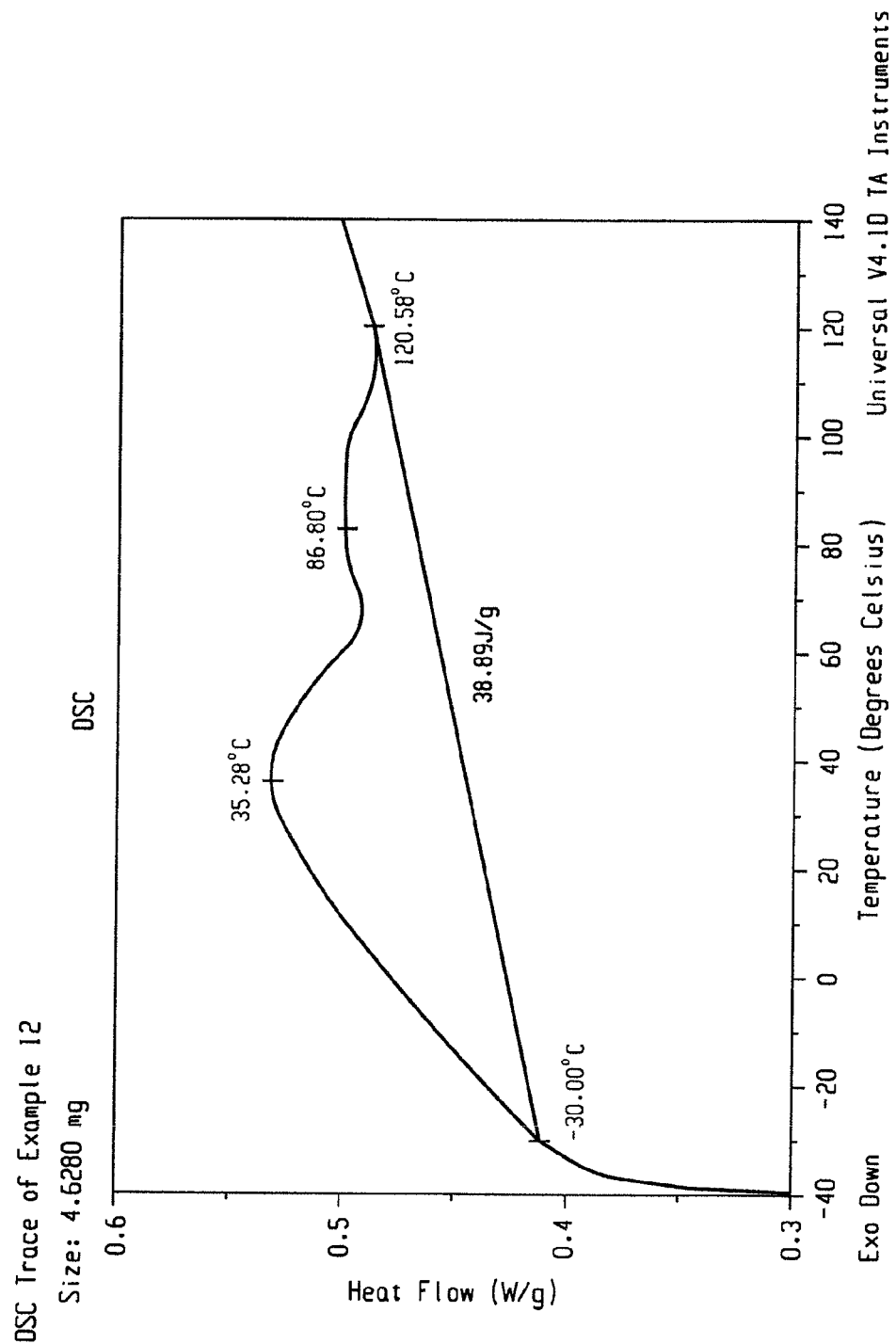
Figure 18:
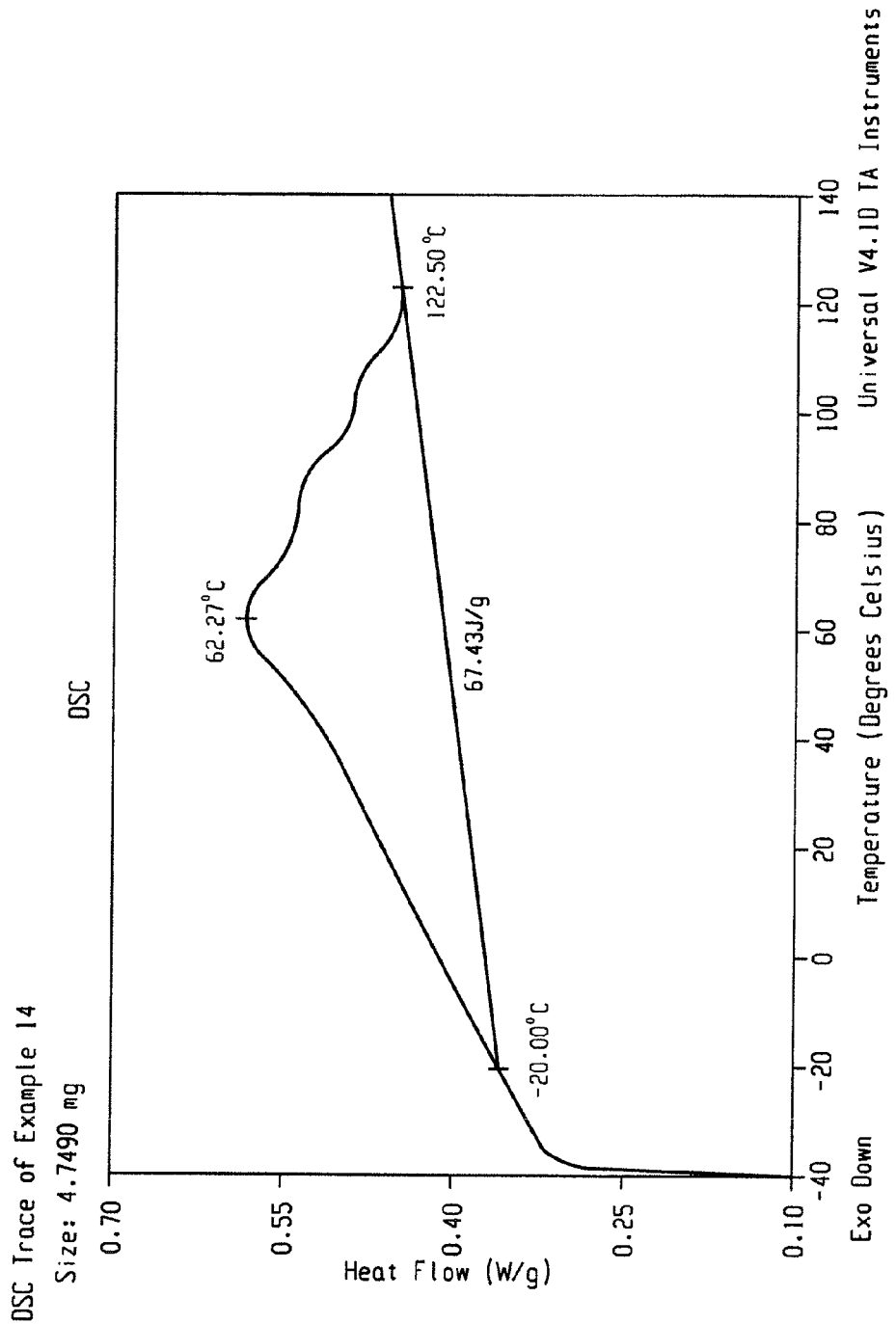
Figure 19:
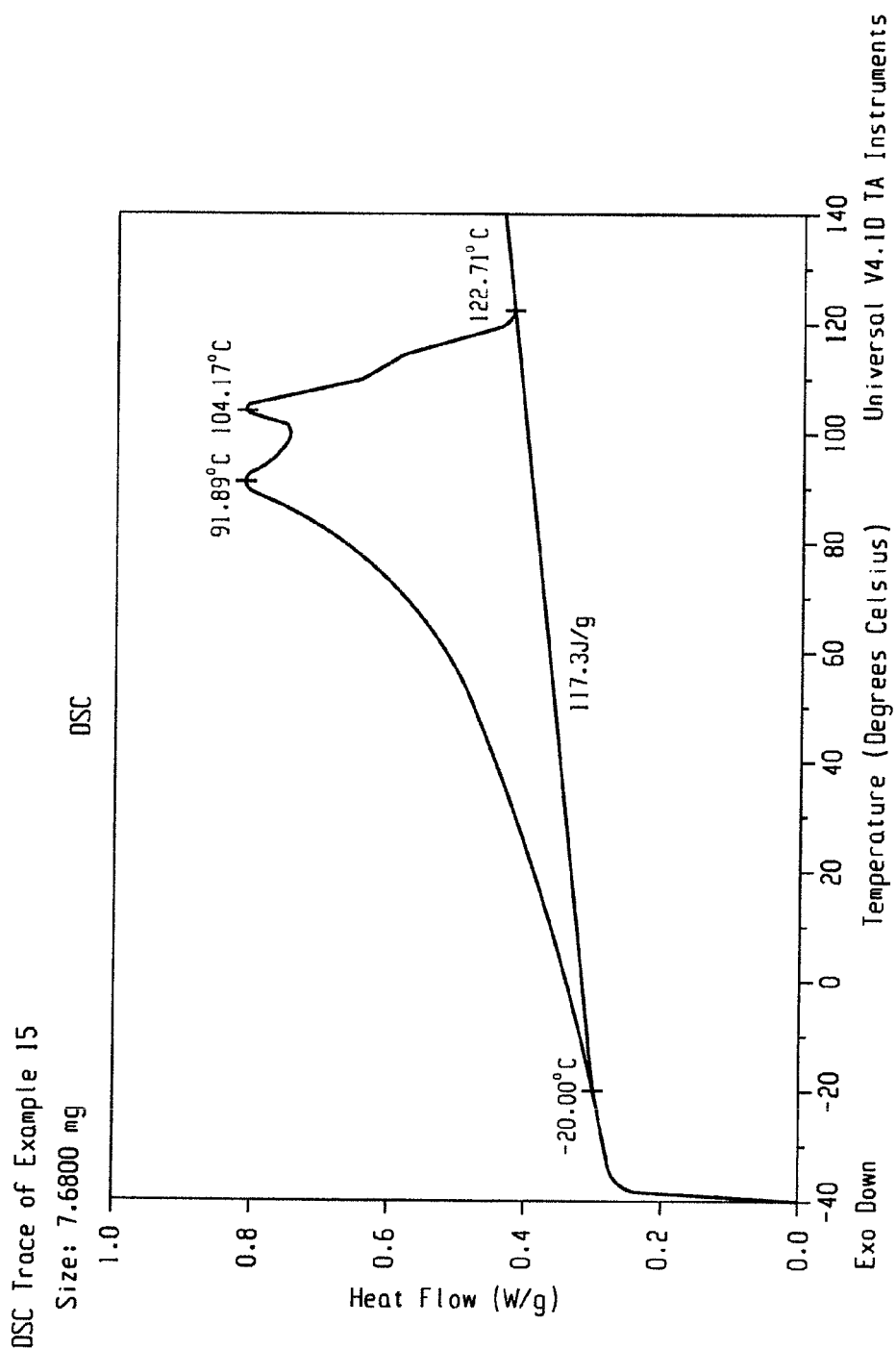

If and when employed herein, the following terms shall have the given meaning for the purposes of this invention:

"Polymer" refers to a polymeric compound prepared by polymerizing monomers, whether of the same or a different type. The generic term "polymer" embraces the terms "homopolymer," "copolymer," "terpolymer" as well as "interpolymer."

"Interpolymer" refers to a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

"Multi-block copolymer" or "multi-block interpolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of polydispersity index (PDI or $M_w/M_n$), block length distribution, and/or block number distribution due to the unique process of making the copolymers. More specifically, when produced in a continuous process, the multi-block polymers often possess PDI from about 1.7 to about 2.9, from about 1.8 to about 2.5, from about 1.8 to about 2.2, or from about 1.8 to about 2.1.

"Density" is tested in accordance with ASTM D792.

"Melt Index ($I_2$)" is determined according to ASTM D1238 using a weight of 2.16 kg at 190° C. for polymers comprising ethylene as the major component in the polymer.

"Melt Flow Rate (MFR)" is determined for according to ASTM D1238 using a weight of 2.16 kg at 230° C. for polymers comprising propylene as the major component in the polymer.

"Molecular weight distribution" or MWD is measured by conventional GPC per the procedure described by T. Williams and I. M. Ward, *Journal of Polymer Science, Polymer Letters Edition* (1968), 6(9), 621-624, wherein Coefficient B is 1 and Coefficient A is 0.4316.

"Multilayer film" refers to a film having at least two layers.

"Tie layer" refers to an intermediate layer of a multilayer film wherein the intermediate layer can promote the adhesion between two adjacent layers of the intermediate layer.

"Sealant layer" refers to a layer of a multilayer film wherein the layer comprises a material capable of sealing. Typically, such sealing may occur upon exposure to, for example, heat. In some embodiments, the sealant layer is an outermost layer of the multilayer film.

"Base layer" refers to a substrate of a multilayer film wherein the substrate forms the base of the film.

A layer or multilayer film that is "substantially free" of an additive or a compound refers to a layer or multilayer film containing less than 20 wt. %, less than 10 wt. %, less than 5 wt. %, less than 4 wt. %, less than 3 wt. %, less than 2 wt. %, less than 1 wt. %, less than 0.5 wt. %, less than 0.1 wt. %, or less than 0.01 wt. % of the additive or compound, based on the total weight of the layer or multilayer film.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Controlling Molecular Weight and Density

It has been discovered that the molecular weight distribution of a resulting polymer may be controlled. For example, using the proper reaction conditions (e.g., a well mixed homogeneous reaction environment, a steady-state concentration of two or more monomers such as ethylene and an α-olefin like octene, and a proper pre-catalyst or catalyst) the bimodal molecular weight "split" of the polymer may be controlled by the mole fractions (f) of the two or more monomers, n, such that the mole fraction of monomer m is defined as:

$$f_m = \frac{[Monomer_m]}{\sum_{i=1}^{n}[Monomer_i]}.$$

That is, the molecular weight split can be controlled so that it is basically a function of the relative monomer concentrations in solution. These same relative monomer concentrations also, depending upon the reaction conditions, may determine the overall composition (i.e. density) of the total polymer.

One aspect of controlling monomer purity useful herein is by utilizing a side stream of monomer in contact with a selected catalyst in a plug flow reactor. If the monomer is impure, then a lower than expected exotherm will be observed in the plug flow reactor. In this manner, monomer purity is monitored and adjusted if necessary.

While not wishing to be bound by any theory the Applicants have discovered that the reason that the monomer concentration:molecular weight split relationship can be made to occur is that a different catalyst species can be made from each monomer reactant. This means that a lower molecular weight polymer is formed by an "ethylene-inserted" form of the catalyst, while an "α-olefin-inserted" form of the catalyst gives a higher molecular weight polymer. Advantageously, this results in a molecular weight split which is controlled by controlling the relative amounts of the various catalyst species that are formed.

As an example it is believed that the Hafnium catalyst below can be made to form an ethylene-inserted cation and an octene-inserted cation in the presence of ethylene and octene and the proper reaction conditions including, for example, a well mixed homogeneous reaction environment.

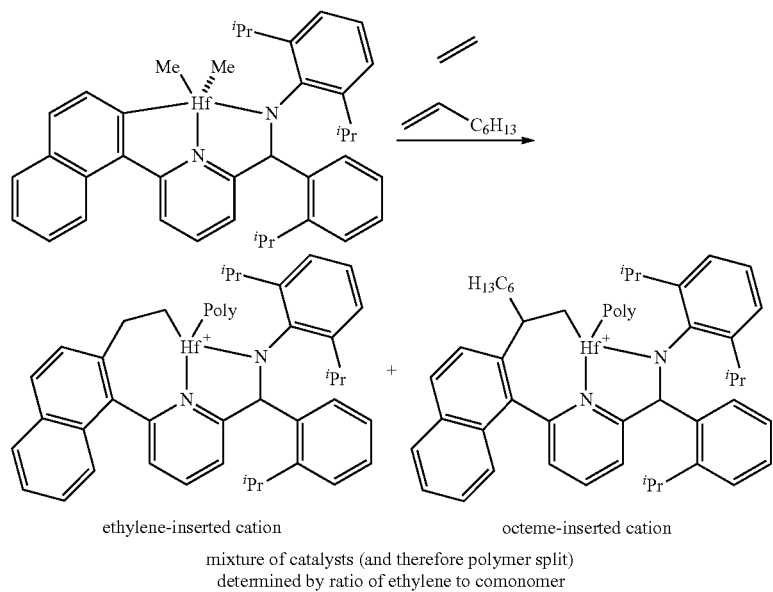

mixture of catalysts (and therefore polymer split)
determined by ratio of ethylene to comonomer Therefore, the present invention allows one to control the molecular weight split in numerous ways. One method of the present invention involves changing the ligand structure of a given catalyst to affect the resulting split for a given overall density copolymer. Thus, one may select suitable pre-catalyst(s) for the polymerization to control the concentrapre-polymerization of sorts, e.g., contacting a pre-catalyst with a single monomer to generate the desired catalyst species concentrations, then feeding part or all of this pre-reaction product to the reactor. This could optionally be done with the addition of pure pre-catalyst, providing a high degree of control over the resulting polymer bimodality.

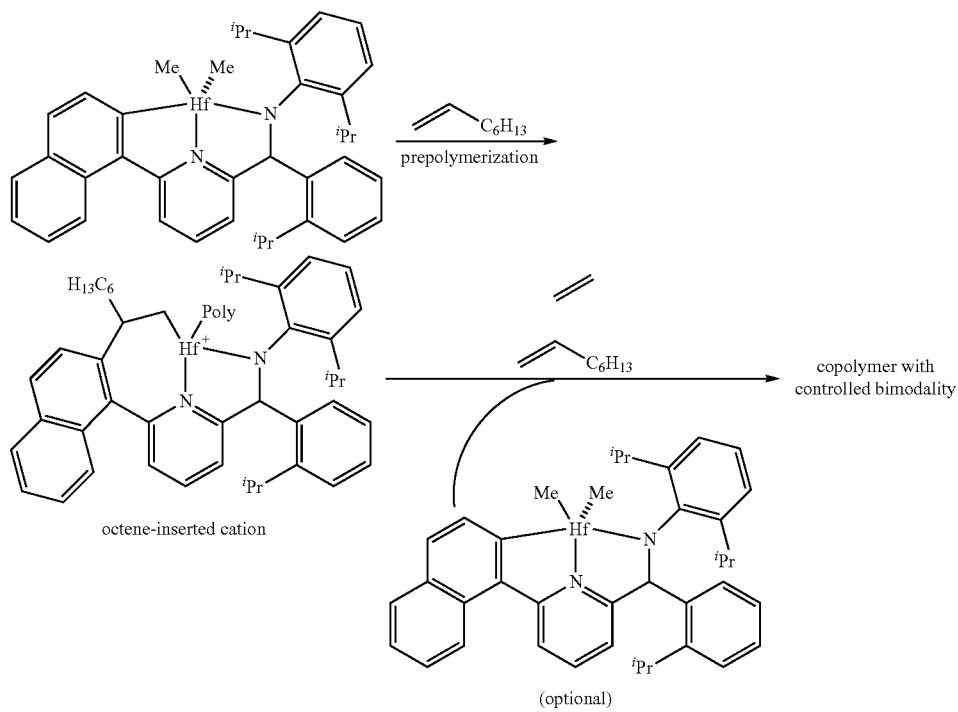

tions of an ethylene-inserted cation and/or an octene-inserted cation and thereby control the resulting molecular weight split. Alternatively, the present invention allows one to control the polymer split from a given catalyst precursor. For example, one such method would be to do a pre-reaction or In yet another alternative of the present invention, the polymer split can be modified by changing process variables. For example, one can control the amount of inserted catalyst by controlling composition gradients—especially in instances when the insertion occurs in the early stages of catalyst activation. In a solution loop reactor, for example, a gradient of monomer composition can be achieved by modifying the speed at which the reactor effluent circulates through the reactor. This can result in differences in the comonomer mole fraction at different places within the reactor. The reactor can be configured to take advantage of this by strategic placement of catalyst and monomer injection points and/or the timing of said catalyst and monomer contact.

In yet another alternative, one or more compounds can be synthesized directly so that the desired ratio of ethylene-inserted cation:α-olefin-inserted cation can be directly controlled.

General Processes of Using a Pre-Catalyst to Control Molecular Weight

As stated above, the Applicants have discovered a number of ways to control the molecular weight distribution in the production of an ethylene/α-olefin interpolymer composition. One process comprises:

(a) selecting at least one suitable pre-catalyst comprising at least one metal-aryl or metal-hydrocarbyl bond, wherein each pre-catalyst molecule is essentially the same as every other pre-catalyst molecule;
(b) contacting ethylene, at least one α-olefin, and said suitable pre-catalyst;
(c) selecting ethylene:alpha-olefin concentration ratios sufficient to activate the pre-catalyst, and
(d) forming an ethylene/α-olefin interpolymer composition under continuous reaction polymerization conditions; and, optionally,
(e) selecting a molecular weight split of the interpolymer as determined by the mole fractions (f) of the two or more monomers, n, such that the mole fraction of monomer m is defined as:

$$f_m = \frac{[Monomer_m]}{\sum_{i=1}^{n}[Monomer_i]}.$$

to produce an ethylene/α-olefin interpolymer composition with a controlled bimodal or multi-modal molecular weight distribution.

Another process comprises:

(a) selecting at least one suitable pre-catalyst comprising at least one metal-aryl or metal-hydrocarbyl bond, wherein each pre-catalyst molecule is essentially the same as every other pre-catalyst molecule;
(b) contacting at least one organic compound, and said suitable pre-catalyst;
(c) selecting at least one organic compound concentration sufficient to activate the pre-catalyst, and
(d) forming an ethylene/α-olefin interpolymer composition under continuous reaction polymerization conditions; and, optionally,
(e) selecting a molecular weight split of the interpolymer as determined by the concentration of the one or more organic compound(s) to produce an ethylene/α-olefin interpolymer composition with a controlled bimodal or multi-modal molecular weight distribution.

Suitable Pre-Catalyst Contact with (1) Ethylene and an α-Olefin or (2) Organic Compound The suitable pre-catalysts may be selected from any of those comprising at least one metal-aryl or metal-hydrocarbyl bond. The aryl may be any molecule or ligand which has the ring structure characteristic of, for example, phenyl, naphalenyl, phenanthrenyl, anthracenyl, etc. The hydrocarbyl may be any molecule or ligand comprising hydrogen and carbon such as benzyl. Additionally, a heteroatom such as nitrogen, oxygen, etc. may be substituted for one or more carbon atoms of the aryl or hydrocarbyl such that aryl includes heteroaryl and hydrocarbyl includes heterohydrocarbyl. Similarly, one or more hydrogens on the aryl or hydrocarbyl may be replaced with any substituent which does not substantially interfere with the desired activity of the pre-catalyst. Such substituents include, but are not limited to, substituted or unsubstituted alkyl, halo, nitro, amino, alkoxy, aryl, aliphatic, cycloaliphatic, hydroxy, and the like. Preferably each pre-catalyst molecule is essentially the same as every other pre-catalyst molecule. By this is meant that the chemical structures of the molecules are substantially the same. Also preferable are those structures in which ring strain is capable of being relieved from the metal-hydrocarbyl ligand when contacted with ethylene or an α-olefin.

Particularly suitable pre-catalysts are selected from the group consisting of hydrocarbylamine substituted heteroaryl compounds corresponding to the formula:

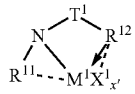

wherein:
R$^{11}$ is selected from alkyl, cycloalkyl, heteroalkyl, cycloheteroalkyl, aryl, and inertly substituted derivatives thereof containing from 1 to 30 atoms not counting hydrogen or a divalent derivative thereof;
T$^1$ is a divalent bridging group of from 1 to 41 atoms other than hydrogen, preferably 1 to 20 atoms atoms other than hydrogen, and most preferably a mono- or di-C$_{1-20}$ hydrocarbyl substituted methylene or silane group; and
R$^{12}$ is a C$_{5-20}$ heteroaryl group containing Lewis base functionality, especially a pyridin-2-yl- or substituted pyridin-2-yl group or a divalent derivative thereof;
M$^1$ comprises hafnium or other Group 4 metal;
X$^1$ is an anionic, neutral or dianionic ligand group;
x' is a number from 0 to 5 indicating the number of such X$^1$ groups; and
bonds, optional bonds and electron donative interactions are represented by lines, dotted lines and arrows respectively, or a mixture thereof, in contact with a suitable co-catalyst.

The pre-catalyst and optional catalysts if desired are contacted with either (1) ethylene and an α-olefin or (2) an organic compound such as, for example, acetone or a mixture of ketones or (3) mixtures thereof, in a manner and in amounts sufficient to activate the pre-catalyst. One skilled in the art will recognize that a cocatalyst such as the ones described below may be useful at this stage or a later stage. The conditions will generally vary depending upon the polymer desired and the equipment employed. However, one skilled in the art can readily determine the suitable conditions using the instant specification, background knowledge, the prior art, and routine experimentation. Guidance is given in, for example, U.S. Pat. Nos. 6,960,635; 6,946,535; 6,943,215; 6,927,256; 6,919,407; and 6,906,160 which are incorporated herein by reference. One advantage of the instant processes is that a single catalyst may be employed in a single reactor.

The ethylene, α-olefin, and/or organic compound concentrations are typically selected so as to be sufficient to activate the pre-catalyst, and form the desired ethylene/α-olefin interpolymer composition having the desired molecular weight distribution. These activation conditions vary depending on the reactants and equipment employed and may be the same but are preferably different than the continuous polymerization reaction conditions used to form the interpolymer. More specifically, the initial monomer ratio used during activation may be the same but is preferably different than the monomer ratio used during the interpolymer polymerization. While these ratios often vary according the reaction conditions and the product desired, the molecular weight split of the interpolymer may usually be controlled by selecting the mole fractions (f) of the two or more monomers, n, such that the mole fraction of monomer m is defined as:

$$f_m = \frac{[Monomer_m]}{\sum_{i=1}^{n}[Monomer_i]}.$$

Advantageously, the resulting polymer often has a low molecular weight portion that has a higher density than the high molecular weight portion. While batch or continuous polymerization reaction conditions may be employed, it is preferable to employ continuous polymerization reaction conditions during the formation of the interpolymer. However, continuous polymerization reaction conditions can still be employed even if the pre-catalyst is activated separately from the main polymerization.

General Processes of Using a Synthesized Catalyst to Control Molecular Weight Distribution Another process of controlling molecular weight comprises contacting ethylene, an α-olefin, and a suitable catalyst under reaction conditions sufficient to form an ethylene/α-olefin interpolymer composition wherein the catalyst comprises a catalytic amount of a molecule having the structure:

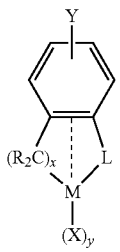

Wherein:
M=group 2-8 metal, preferably group 4 as a neutral or charged moiety;
Y=any substituent including fused rings;
L=any ligating group, especially a pyridyl or pyridylamide;
X=alkyl, aryl, substituted alkyl, H or hydride, halide, or other anionic moiety;
y=an integer from 0 to the complete valence of M;
R=alkyl, aryl, haloalkyl, haloaryl, hydrogen, etc;
x=1-6, especially 2;
Dashed line=optional bond, especially a weak bond; and
X and $(CR_2)_x$ may be tethered or part of a ring.

Use of various forms of the aforementioned catalyst structure allows one skilled in the art to directly control the concentrations of an "ethylene-inserted" form of the catalyst and an "α-olefin-inserted" form of the catalyst. By directly controlling these concentrations the molecular weight split of the interpolymer may be controlled. This allows one skilled in the art to employ a much wider range of reaction conditions yet still control the molecular weight distribution. For example, it is then possible to control the molecular weight distribution over a wider range of monomer concentrations.

The above catalyst may be synthesized by any convenient method.

Catalyst Structures

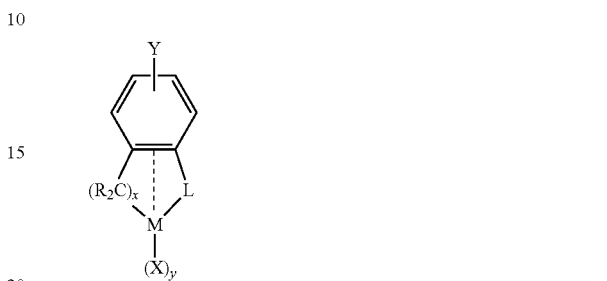

Possible synthesis methods include coupling such as

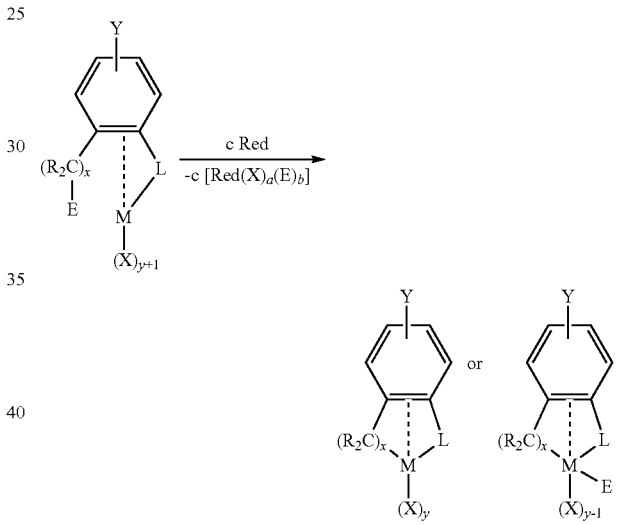

Insertion such as

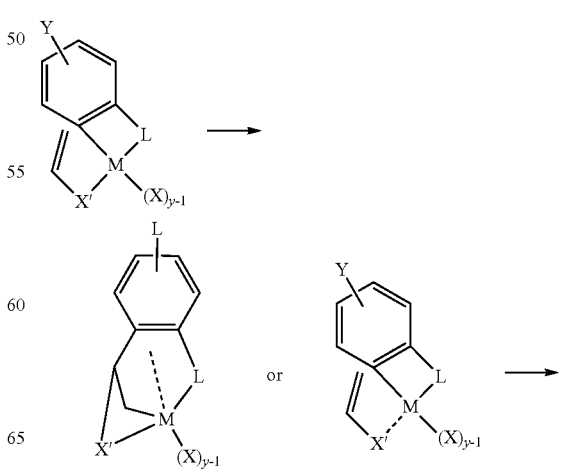

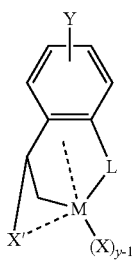

or by cyclometalation such as

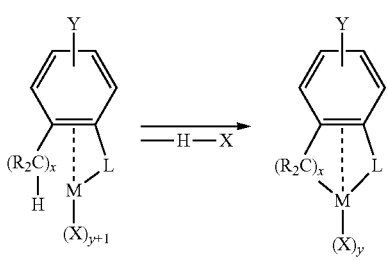

wherein:
M=group 2-8 metal, preferably group 4 as a neutral or charged moiety.
Y=any substituent including fused rings.
L=any ligating group, especially a pyridyl or pyridylamide.
X=alkyl, aryl, substituted alkyl, H or hydride, halide, or other anionic moiety.
y=number to complete valence of M.
R=aklyl, aryl, haloalkyl, haloaryl, hydrogen, etc.
x=1-6, especially 2.
Dashed line=optional bond, especially a weak bond.
X and $(CR_2)_x$ may be tethered or part of a ring.
E=any anionic moiety, (including alkyl or aryl) or H of a C—H unit
Red=reducing agent.
a+b=number to complete the valence of Red when oxidized
c=number of equivalents of Red required to join $(CR_2)_x$ to M As one skilled in the art can appreciate it may also be desirable in some situations to use an in-situ synthesis method such that the catalyst is formed during the polymerization reaction.

Cocatalysts

As one skilled in the art will appreciate it may be useful to combine the pre-catalyst or synthesized catalyst with a suitable cocatalyst, preferably a cation forming cocatalyst, a strong Lewis acid, or a combination thereof. In a preferred embodiment, the shuttling agent, if employed, is employed both for purposes of chain shuttling and as the cocatalyst component of the catalyst composition.

The metal complexes desirably are rendered catalytically active by combination with a cation forming cocatalyst, such as those previously known in the art for use with Group 4 metal olefin polymerization complexes. Suitable cation forming cocatalysts for use herein include neutral Lewis acids, such as $C_{1-30}$ hydrocarbyl substituted Group 13 compounds, especially tri(hydrocarbyl)aluminum or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl)boron compounds, and most especially tris(pentafluoro-phenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium-salts of compatible, noncoordinating anions, or ferrocenium-, lead- or silver salts of compatible, noncoordinating anions; and combinations of the foregoing cation forming cocatalysts and techniques. The foregoing activating cocatalysts and activating techniques have been previously taught with respect to different metal complexes for olefin polymerizations in the following references: EP Patent Publication No. 277,003; U.S. Pat. Nos. 5,153,157, 5,064,802, 5,321,106, 5,721,185, 5,350,723, 5,425,872, 5,625,087, 5,883,204, 5,919,983 and 5,783,512; and International Patent Publication Nos. WO 99/15534 and WO 99/42467, all of which are incorporated herein by reference.

Combinations of neutral Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris(pentafluorophenyl)borane with a polymeric or oligomeric alumoxane may be used as activating cocatalysts. Preferred molar ratios of metal complex:tris(pentafluorophenyl-borane:alumoxane are from 1:1:1 to 1:5:20, more preferably from 1:1:1.5 to 1:5:10.

Suitable ion forming compounds useful as cocatalysts in one embodiment of the present invention comprise a cation which is a Bronsted acid capable of donating a proton, and a compatible, noncoordinating anion, $A^-$. As used herein, the term "noncoordinating" means an anion or substance which either does not coordinate to the Group 4 metal containing precursor complex and the catalytic derivative derived therefrom, or which is only weakly coordinated to such complexes thereby remaining sufficiently labile to be displaced by a neutral Lewis base. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles.

Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

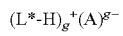

wherein:
L* is a neutral Lewis base;
(L*-H)+ is a conjugate Bronsted acid of L*;
$A^{g-}$ is a noncoordinating, compatible anion having a charge of g−, and
g is an integer from 1 to 3.

More preferably $A^{g-}$ corresponds to the formula: $[M'Q_4]^-$; wherein:
M' is boron or aluminum in the +3 formal oxidation state; and
Q independently each occurrence is selected from hydride, dialkylamido, halide, hydrocarbyl, hydrocarbyloxide, halosubstituted-hydrocarbyl, halosubstituted hydrocarbyloxy, and halo-substituted silylhydrocarbyl radicals (including perhalogenated hydrocarbyl-perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is $A^-$. Activating cocatalysts comprising boron which are particularly useful in the preparation of catalysts of this invention may be represented by the following general formula:

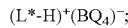

wherein:
L* is as previously defined;
B is boron in a formal oxidation state of 3; and
Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Preferred Lewis base salts are ammonium salts, more preferably trialkylammonium salts containing one or more $C_{12-40}$ alkyl groups. Most preferably, Q is each occurrence a fluorinated aryl group, especially, a pentafluorophenyl group.

Illustrative, but not limiting, examples of boron compounds which may be used as an activating cocatalyst in the preparation of the improved catalysts of this invention are tri-substituted ammonium salts such as:
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-dimethylanilinium n-butyltris(pentafluorophenyl)borate,
N,N-dimethylanilinium benzyltris(pentafluorophenyl)borate,
N,N-dimethylanilinium tetrakis(4-(t-butyldimethylsilyl)-2,3,5,6-tetrafluorophenyl)borate,
N,N-dimethylanilinium tetrakis(4-(triisopropylsilyl)-2,3,5,6-tetrafluorophenyl)borate,
N,N-dimethylanilinium pentafluorophenoxytris(pentafluorophenyl)borate,
N,N-diethylanilinium tetrakis(pentafluorophenyl)borate,
N,N-dimethyl-2,4,6-trimethylanilinium tetrakis(pentafluorophenyl)borate,
dimethyloctadecylammonium tetrakis(pentafluorophenyl)borate,
methyldioctadecylammonium tetrakis(pentafluorophenyl)borate,
dialkyl ammonium salts such as:
di-(i-propyl)ammonium tetrakis(pentafluorophenyl)borate,
methyloctadecylammonium tetrakis(pentafluorophenyl)borate,
methyloctadodecylammonium tetrakis(pentafluorophenyl)borate, and
dioctadecylammonium tetrakis(pentafluorophenyl)borate;
tri-substituted phosphonium salts such as:
triphenylphosphonium tetrakis(pentafluorophenyl)borate,
methyldioctadecylphosphonium tetrakis(pentafluorophenyl)borate, and
tri(2,6-dimethylphenyl)phosphonium tetrakis(pentafluorophenyl)borate;
di-substituted oxonium salts such as:
diphenyloxonium tetrakis(pentafluorophenyl)borate,
di(o-tolyl)oxonium tetrakis(pentafluorophenyl)borate, and
di(octadecyl)oxonium tetrakis(pentafluorophenyl)borate;
di-substituted sulfonium salts such as:
di(o-tolyl)sulfonium tetrakis(pentafluorophenyl)borate, and
methylcotadecylsulfonium tetrakis(pentafluorophenyl)borate.

Preferred (L*-H)+ cations are methyldioctadecylammonium cations, dimethyloctadecylammonium cations, and ammonium cations derived from mixtures of trialkyl amines containing one or 2 $C_{14-18}$ alkyl groups.

Another suitable ion forming, activating cocatalyst comprises a salt of a cationic oxidizing agent and a noncoordinating, compatible anion represented by the formula:

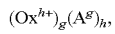

wherein:
$Ox^{h+}$ is a cationic oxidizing agent having a charge of h+;
h is an integer from 1 to 3; and
$A^{g-}$ and g are as previously defined.

Examples of cationic oxidizing agents include: ferrocenium, hydrocarbyl-substituted ferrocenium, $Ag^+$, or $Pb^{+2}$. Preferred embodiments of $A^{g-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula:

wherein:
[C]+ is a $C_{1-20}$ carbenium ion; and
$A^-$ is a noncoordinating, compatible anion having a charge of −1. A preferred carbenium ion is the trityl cation, that is triphenylmethylium.

A further suitable ion forming, activating cocatalyst comprises a compound which is a salt of a silylium ion and a noncoordinating, compatible anion represented by the formula:

wherein:
$Q^1$ is $C_{1-10}$ hydrocarbyl, and $A^-$ is as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem Soc. Chem. Comm.*, 1993, 383-

384, as well as Lambert, J. B., et al., *Organometallics*, 1994, 13, 2430-2443. The use of the above silylium salts as activating cocatalysts for addition polymerization catalysts is disclosed in U.S. Pat. No. 5,625,087.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433.

Suitable activating cocatalysts for use herein also include polymeric or oligomeric alumoxanes, especially methylalumoxane (MAO), triisobutyl aluminum modified methylalumoxane (MMAO), or isobutylalumoxane; Lewis acid modified alumoxanes, especially perhalogenated tri(hydrocarbyl) aluminum- or perhalogenated tri(hydrocarbyl)boron modified alumoxanes, having from 1 to 10 carbons in each hydrocarbyl or halogenated hydrocarbyl group, and most especially tris(pentafluorophenyl)borane modified alumoxanes. Such cocatalysts are previously disclosed in U.S. Pat. Nos. 6,214,760, 6,160,146, 6,140,521, and 6,696,379.

A class of cocatalysts comprising non-coordinating anions generically referred to as expanded anions, further disclosed in U.S. Pat. No. 6,395,671, may be suitably employed to activate the metal complexes of the present invention for olefin polymerization. Generally, these cocatalysts (illustrated by those having imidazolide, substituted imidazolide, imidazolinide, substituted imidazolinide, benzimidazolide, or substituted benzimidazolide anions) may be depicted as follows:

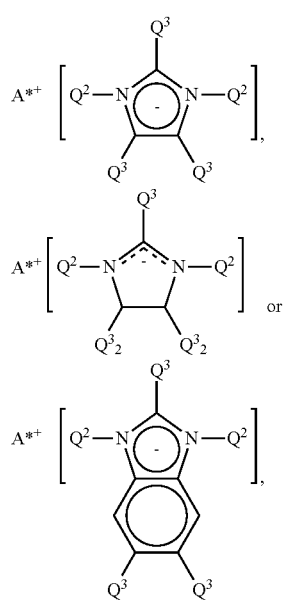

wherein:
$A^{*+}$ is a cation, especially a proton containing cation, and preferably is a trihydrocarbyl ammonium cation containing one or two $C_{10-40}$ alkyl groups, especially a methyldi ($C_{14-20}$alkyl)ammonium cation,
$Q^3$, independently each occurrence, is hydrogen or a halo, hydrocarbyl, halocarbyl, halohydrocarbyl, silylhydrocarbyl, or silyl, (including mono-, di- and tri(hydrocarbyl)silyl) group of up to 30 atoms not counting hydrogen, preferably $C_{1-20}$ alkyl, and
$Q^2$ is tris(pentafluorophenyl)borane or tris(pentafluorophenyl)alumane).

Examples of these catalyst activators include trihydrocarbylammonium-salts, especially, methyldi($C_{14-20}$alkyl)ammonium-salts of:
bis(tris(pentafluorophenyl)borane)imidazolide,
bis(tris(pentafluorophenyl)borane)-2-undecylimidazolide,
bis(tris(pentafluorophenyl)borane)-2-heptadecylimidazolide,
bis(tris(pentafluorophenyl)borane)-4,5-bis(undecyl)imidazolide,
bis(tris(pentafluorophenyl)borane)-4,5-bis(heptadecyl)imidazolide,
bis(tris(pentafluorophenyl)borane)imidazolinide,
bis(tris(pentafluorophenyl)borane)-2-undecylimidazolinide,
bis(tris(pentafluorophenyl)borane)-2-heptadecylimidazolinide,
bis(tris(pentafluorophenyl)borane)-4,5-bis(undecyl)imidazolinide,
bis(tris(pentafluorophenyl)borane)-4,5-bis(heptadecyl)imidazolinide,
bis(tris(pentafluorophenyl)borane)-5,6-dimethylbenzimidazolide,
bis(tris(pentafluorophenyl)borane)-5,6-bis(undecyl)benzimidazolide,
bis(tris(pentafluorophenyl)alumane)imidazolide,
bis(tris(pentafluorophenyl)alumane)-2-undecylimidazolide,
bis(tris(pentafluorophenyl)alumane)-2-heptadecylimidazolide,
bis(tris(pentafluorophenyl)alumane)-4,5-bis(undecyl)imidazolide,
bis(tris(pentafluorophenyl)alumane)-4,5-bis(heptadecyl) imidazolide,
bis(tris(pentafluorophenyl)alumane)imidazolinide,
bis(tris(pentafluorophenyl)alumane)-2-undecylimidazolinide,
bis(tris(pentafluorophenyl)alumane)-2-heptadecylimidazolinide,
bis(tris(pentafluorophenyl)alumane)-4,5-bis(undecyl)imidazolinide,
bis(tris(pentafluorophenyl)alumane)-4,5-bis(heptadecyl) imidazolinide,
bis(tris(pentafluorophenyl)alumane)-5,6-dimethylbenzimidazolide, and
bis(tris(pentafluorophenyl)alumane)-5,6-bis(undecyl)benzimidazolide.

Other activators include those described in PCT publication WO 98/07515 such as tris(2,2',2"-nonafluorobiphenyl) fluoroaluminate. Combinations of activators are also contemplated by the invention, for example, alumoxanes and ionizing activators in combinations, see for example, EP-A-0 573120, PCT publications WO 94/07928 and WO 95/14044 and U.S. Pat. Nos. 5,153,157 and 5,453,410. WO 98/09996 describes activating catalyst compounds with perchlorates, periodates and iodates, including their hydrates. WO 99/18135 describes the use of organoboroaluminum activators. WO 03/10171 discloses catalyst activators that are adducts of Bronsted acids with Lewis acids. Other activators or methods for activating a catalyst compound are described in for example, U.S. Pat. Nos. 5,849,852, 5,859,653, 5,869, 723, EP-A-615981, and PCT publication WO 98/32775. All of the foregoing catalyst activators as well as any other know activator for transition metal complex catalysts may be employed alone or in combination according to the present invention, however, for best results alumoxane containing cocatalysts are avoided.

The molar ratio of catalyst/cocatalyst employed preferably ranges from 1:10,000 to 100:1, more preferably from 1:5000 to 10:1, most preferably from 1:1000 to 1:1. Alumoxane, when used by itself as an activating cocatalyst, is employed in large quantity, generally at least 100 times the quantity of metal complex on a molar basis. Tris(pentafluorophenyl)borane, where used as an activating cocatalyst is employed in a molar ratio to the metal complex of from 0.5:1 to 10:1, more preferably from 1:1 to 6:1 most preferably from 1:1 to 5:1. The remaining activating cocatalysts are generally employed in approximately equimolar quantity with the metal complex.

Novel Compositions of the Present Invention

Advantageously, novel compositions of the present invention comprise an ethylene/alpha-olefin interpolymer composition with a multi-modal molecular weight distribution and one or more molecules having a gram molecular weight equal to about ((the molecular weight of an aryl or hydrocarbyl-ligand of a pre-catalyst)+28+14*X), wherein X represents an integer from zero to 10, preferably zero to 8. The aryl or hydrocarbyl ligand may be any of those described herein. The molecule may be observed in the composition by extracting the interpolymer with a solvent such as methylene chloride, adding another solvent such as an alcohol, e.g. ethanol, and decanting. The decantate can then be analyzed by any convenient analytical method such as gas chromatography coupled with mass spectroscopy. Said composition may also contain ethylene, an α-olefin, a reaction product or a mixture thereof.

Other novel compositions of the present invention include the catalyst which may be synthesized as described above optionally mixed with ethylene, an α-olefin, a reaction product or a mixture thereof.

Ethylene/α-Olefin Multi-Block Interpolymer Component(s)

The general processes described above may also be used to produce an ethylene/α-olefin multi-block interpolymer such as those describe in, for example, copending U.S. application Ser. No. 11/376,835 filed on Mar. 15, 2006 and PCT Publication No. WO 2005/090427, filed on Mar. 17, 2005, which in turn claims priority to U.S. Provisional Application No. 60/553,906, filed Mar. 17, 2004. For purposes of United States patent practice, the contents of the aforementioned applications are herein incorporated by reference in their entirety. If such a multi-block polymer is desired then the processes described above will also generally include a catalyst such as one comprising zinc which is different than any pre-catalyst that may be employed. In addition, a shuttling agent such as diethyl zinc or others described in PCT Publication No. WO 2005/090427 may be employed. Such processes may result in a polymer wherein the polymer has one or more of the following characteristics:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1; or (3) an Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2,$$

preferably $$T_m \geq 858.91 - 1825.3(d) + 1112.8(d)^2; \text{ or}$$

(4) an Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (5) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ or}$$

(6) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (7) a storage modulus at 25° C., G'(25° C.), and a storage modulus at 100° C., G'(100° C.), wherein the ratio of G'(25° C.) to G'(100° C.) is in the range of about 1:1 to about 9:1; or (8) has a DSC melting curve characterized by an area under the DSC melting curve from the melting peak temperature to the end of melting is at least about 17%, at least about 18%, at least about 19%, at least about 21%, at least about 23%, at least about 25%, at least about 27%, at least about 29%, at least about 31%, at least about 33%, to at most 25, preferably 35% of the total area under the DSC melting curve from −20° C. to the end of melting or (9) has a B value of greater than about 0.98, greater than about 0.99, greater than about 1.0 or greater than about 1.02.

It has been found that when a cocatalyst shuttling agent, e.g. diethyl zinc, is employed interpolymers having improved residual enthalpy and hot tack are often made. In addition, it has also been observed that the interpolymers may be manufactured to have little or no long chain branching. When a shuttling agent is not employed, improved properties, e.g., Dart impact, tear, puncture resistance may be observed.

The interpolymers of and used in the present invention preferably have a density in the range of from about 0.875 g/cc to about 0.915 g/cc, preferably from about 0.895 g/cc to about 0.910 g/cc; a molecular weight distribution in the range from about 2.0 to about 3.8, from about 2.2 to about 3.5, from about 2.2 to about 3.3, or from about 2.2 to about 3.8; an $I_{10}/I_2$ in the range from about 5.5 to about 6.5, preferably from about 5.6 to about 6.3; an $I_2$ melt index in the range from about 0.2 to about 20.

The B-values of the interpolymers of the present invention often have a B value of greater than about 0.98, greater than about 0.99, greater than about 1.0 or greater than about 1.02. "B-value" and similar terms mean the ethylene units of an ethylene/α-olefin interpolymer are distributed across the polymer chain in a nonrandom manner. B-values range from 0 to 2. The higher the B-value, the more alternating the comonomer distribution in the copolymer. The lower the B-value, the more blocky or clustered the comonomer distribution in the copolymer.

There are several ways to calculate B-value; the method described below utilizes the method of Koenig, J. L., where a B-value of 1 designates a perfectly random distribution of comonomer units. The B-value as described by Koenig is calculated as follows. B is defined for an ethylene/α-olefin interpolymer as an index of composition distribution of constituent units derived from each monomer in the interpolymer chain, and can be calculated from the following formula:

$$B = \frac{P_{EO}}{2P_O \cdot P_E}$$

wherein $P_E$ and $P_O$ are respectively a molar fraction of the ethylene component and a molar fraction of the α-olefin (e.g., octene) component contained in the ethylene/α-olefin interpolymer such as ethylene/octene interpolymer; and $P_{EO}$ is a molar fraction of the ethylene/α-olefin chain such as ethylene/octene chain in all the dyad chains.

In some embodiments, the values of $P_O$, $P_B$ and $P_{EO}$ for an ethylene/α-olefin interpolymer such as ethylene/octene interpolymer can be obtained in the following manner. In a sample tube having a diameter of 10 mm, about 200 mg of the ethylene/α-olefin interpolymer is homogeneously dissolved in 1 ml of hexachlorobutadiene to give a sample, and a $^{13}$C-NMR spectrum of the sample is measured according to literature references, such as G. J. Ray (*Macromolecules*, 10, 773, 1977) and J. C. Randall (*Macromolecules*, 15, 353, 1982; *J. Polymer Science, Polymer Physics Ed.*, 11, 275, 1973), and K. Kimura (*Polymer*, 25, 441, 1984). B values are also discussed in the publication WO 2006/069205 A1 published Jun. 29, 2006 and incorporated herein by reference. The B value is 2 when the ethylene/α-olefin interpolymer such as ethylene/octene interpolymer is a perfectly alternating interpolymer, while the B value is 0 when the interpolymer is a perfectly block interpolymer.

Figure 29:
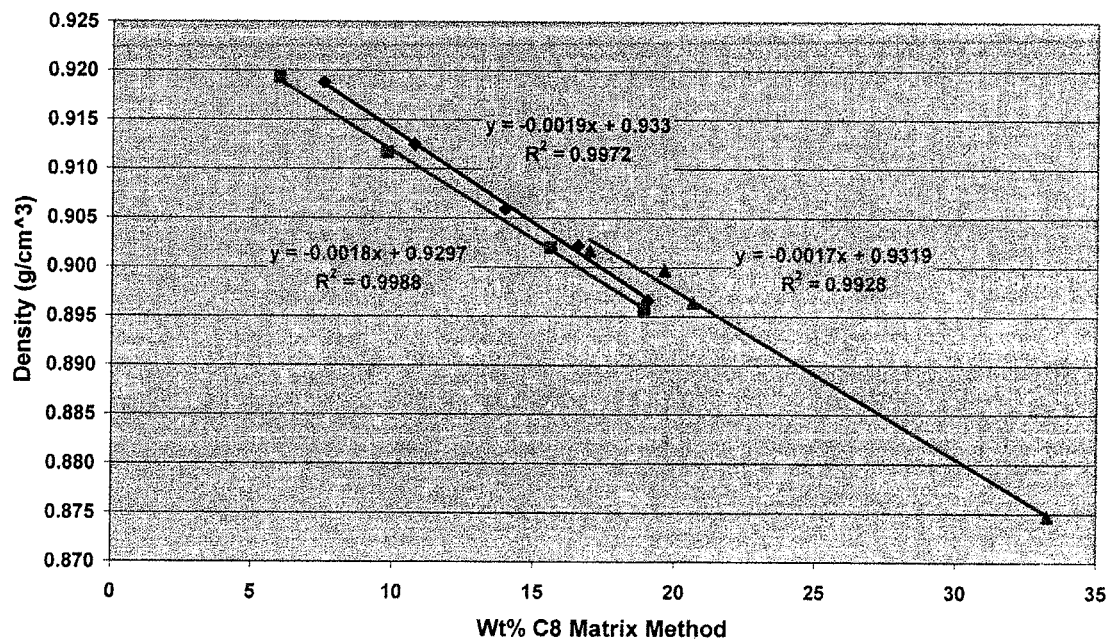
FIG. 29 is a plot showing the density of an ethylene/α-olefin interpolymer as a function of the weight percentage of 1-octene for inventive polymers made using diethyl zinc (DEZ) and inventive polymers made without using DEZ.

The ethylene/α-olefin interpolymers of the present invention, e.g. ethylene-octene, advantageously can be made using less α-olefin, e.g. octene, than prior polymers yet the interpolymers of the present invention have approximately the same or higher density. This is shown in, for example, FIG. 29 which shows that the ethylene/α-olefin interpolymers of the present invention often comprise one or more of the following characteristics: a density in g/cc, d, and a weight percent α-olefin, Wt. %, wherein the numerical values of d and Wt. % correspond to the relationship: d≦−0.0018 Wt. %+0.9297 and/or d≦−0.0019 Wt. %+0.933. This is a surprising and unexpected relationship in that typically the density will decrease more with decreasing amounts of α-olefin. It has been discovered that the use of a shuttling agent may affect the aforementioned relationships. For example, the interpolymers made with a shuttling agent such as diethyl zinc often exhibit the relationship: d≦−0.0018 Wt. %+0.9297 whereas interpolymers made without a shuttling agent such as diethyl zinc often exhibit the relationship: d≦−0.0019 Wt. %+0.933. FIG. 29 is a plot showing the density of an ethylene/α-olefin interpolymer as a function of the weight percentage of 1-octene for inventive polymers made using diethyl zinc (DEZ) and inventive polymers made without using DEZ.

Applications and End Uses

The polymers of the present invention can be used in a variety of conventional thermoplastic fabrication processes to produce useful articles. Such articles include objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or non-woven fabrics.

Due to the surprising and unexpected hot tack properties, as well as, the puncture and Dart impact properties the polymers and compositions of the present invention are particularly suited for food applications such as form, fill and seal applications. Film layers of the present invention may often be made wherein the average hot tack (ASTM F 1921, Method B, dwell time of 500 ms, seal pressure of 27.5 N/cm$^2$) is at least 10 N over a temperature range of at least 20° C., preferably 25° C., more preferably 28° C. Heat sealable films made with the composition of the present invention may be employed in either monolayer or multilayer film structures or as laminates. Regardless of how the film is utilized, it may be prepared by a variety of processes that are well known to those of skill in the art.

Film structures may be made by conventional fabrication techniques, e.g. simple bubble extrusion, biaxial orientation processes (such as tenter frames or double bubble processes), simple cast/sheet extrusion, coextrusion, lamination, etc. Conventional simple bubble extrusion processes (also known as hot blown film processes) are described, for example, in The Encyclopedia of Chemical Technology, Kirk-Othmer, Third Edition, John Wiley & Sons, New York, 1981, Vol. 16, pp. 416-417 and Vol. 18, pp. 191-192, the disclosures of which are incorporated herein by reference. Biaxial orientation film manufacturing processes such as described in the "double bubble" process of U.S. Pat. No. 3,456,044 (Pahlke), and the processes described in U.S. Pat. No. 4,352,849 (Mueller), U.S. Pat. Nos. 4,820,557 and 4,837,084 (both to Warren), U.S. Pat. No. 4,865,902 (Golike et al.), U.S. Pat. No. 4,927,708 (Herran et al.), U.S. Pat. No. 4,952,451 (Mueller), and U.S. Pat. Nos. 4,963,419 and 5,059,481 (both to Lustig et al.), the disclosures of which are incorporated herein by reference, can also be used to make the novel film structures of this invention. Biaxially oriented film structures can also be made by a tenter-frame technique, such as that used for oriented polypropylene.

Other multilayer film manufacturing techniques for food packaging applications are described in Packaging Foods With Plastics by Wilmer A. Jenkins and James P. Harrington (1991), pp. 19-27, and in "Coextrusion Basics" by Thomas I. Butler, Film Extrusion Manual: Process, Materials, Properties. pp. 31-80 (published by TAPPI Press (1992)) the disclosures of which are incorporated herein by reference.

In certain embodiments of this invention, at least one heat sealable, innermost or outermost layer (i.e., sealing or skin layer) of a film structure comprises the polymers of the present invention. This heat sealable layer can be coextruded with other layer(s) or the heat sealable layer can be laminated onto another layer(s) or substrate in a secondary operation, such as that described in Packaging Foods With Plastics, ibid, or that described in "Coextrusion For Barrier Packaging" by W. J. Schrenk and C. R. Finch, Society of Plastics Engineers RETEC Proceedings Jun. 15-17, 1981, pp. 211-229, the disclosures of which are incorporated herein by reference. Preferable substrates include papers, foils, oriented polypropylenes, polyamides, polyesters, polyethylenes, polyethylene terephthalate, and, metallized substrates.

Should a multilayer film be desired, such may be obtained from a monolayer film which has been previously produced via tubular film (i.e., blown film techniques) or flat die (i.e. cast film) as described by K. R. Osborn and W. A. Jenkins in "Plastic Films, Technology and Packaging Applications"

(Technomic Publishing Co., Inc. (1992)), the disclosures of which are incorporated herein by reference, wherein the sealant film must go through an additional post-extrusion step of adhesive or extrusion lamination to other packaging material layers. If the sealant film is a coextrusion of two or more layers (also described by Osborn and Jenkins), the film may still be laminated to additional layers of packaging materials, depending on the other physical requirements of the final packaging film. "Laminations vs. Coextrusions" by D. Dumbleton (Converting Magazine, September 1992), the disclosure of which is incorporated herein by reference, also discusses lamination versus coextrusion. Monolayer and coextruded films can also go through other post-extrusion techniques, such as a biaxial orientation process and irradiation. With respect to irradiation, this technique can also precede extrusion by irradiating the pellets from which the film is to be fabricated prior to feeding the pellets into the extruder, which increases the melt tension of the extruded polymer film and enhances processability.

Extrusion coating is yet another technique for producing packaging materials. Similar to cast film, extrusion coating is a flat die technique. A heat-sealable film comprised of the compositions of the present invention can be extrusion coated onto a substrate either in the form of a monolayer or a coextruded extrudate according to, for example, the processes described in U.S. Pat. No. 4,339,507 incorporated herein by reference. Utilizing multiple extruders or by passing the various substrates through the extrusion coating system several times can result in multiple polymer layers each providing some sort of performance attribute whether it be barrier, toughness, or improved hot tack or heat sealability. Some typical end use applications for multi-layered/multi-substrate systems are for cheese packages. Other end use applications include, but are not limited to moist pet foods, snacks, chips, frozen foods, meats, hot dogs, and numerous other applications.

In those embodiments in which the film comprises one or more of the polymers of the present invention, other layers of the multilayer structure may be included to provide a variety of performance attributes. These layers can be constructed from various materials, including blends of homogeneous linear or substantially linear ethylene polymers with polypropylene polymers, and some layers can be constructed of the same materials, e.g some films can have the structure A/B/C/B/A wherein each different letter represents a different composition. Representative, nonlimiting examples of materials in other layers are: poly(ethylene terephthalate) (PET), ethylene/vinyl acetate (EVA) copolymers, ethylene/acrylic acid (BAA) copolymers, ethylene/methacrylic acid (EMAA) copolymers, LLDPE, HDPE, LDPE, graft-modified ethylene polymers (e.g maleic anhydride grafted polyethylene), styrene-butadiene polymers (such as K-resins, available from Phillips Petroleum), etc. Generally, multilayer film structures comprise from 2 to about 7 layers.

The thickness of the multilayer structures is typically from about 1 mil to about 4 mils (total thickness). The heat sealable film layer varies in thickness depending on whether it is produced via coextrusion or lamination of a monolayer or coextruded film to other packaging materials. In a coextrusion, the heat sealable film layer is typically from about 0.1 to about 3 mils, preferably from about 0.4 to about 2 mils. In a laminated structure, the monolayer or coextruded heat sealable film layer is typically from about 0.5 to about 2 mils, preferably from about 1 to 2 mils. For a monolayer film, the thickness is typically between about 0.4 mil to about 4 mils, preferably between about 0.8 to about 2.5 mils.

The heat sealable films of the invention can be made into packaging structures such as form-fill-seal structures or bag-in-box structures. For example, one such form-fill-seal operation is described in Packaging Foods With Plastics, ibid, pp. 78-83. Packages can also be formed from multilayer packaging roll stock by vertical or horizontal form-fill-seal packaging and thermoform-fill-seal packaging, as described in "Packaging Machinery Operations: No. 8, Form-Fill-Sealing, A Self-Instructional Course" by C. G. Davis, Packaging Machinery Manufacturers Institute (April 1982); The Wiley Encyclopedia of Packaging Technology by M. Bakker (Editor), John Wiley & Sons (1986), pp. 334, 364-369; and Packaging: An Introduction by S. Sacharow and A. L. Brody, Harcourt Brace Javanovich Publications, Inc. (1987), pp. 322-326. The disclosures of all of the preceding publications are incorporated herein by reference. A particularly useful device for form-fill-seal operations is the Hayssen Ultima Super CMB Vertical Form-Fill-Seal Machine. Other manufacturers of pouch thermoforming and evacuating equipment include Cryovac and Koch. A process for making a pouch with a vertical form-fill-seal machine is described generally in U.S. Pat. Nos. 4,503,102 and 4,521,437, both of which are incorporated herein by reference. Film structures containing one or more layers comprising a heat sealable film of the present invention are well suited for the packaging of potable water, wine, cheese, potatoes, condiments, and similar food products in such form-fill-seal structures.

The films of the invention can be cross-linked, before or after orientation, by any means known in the art, including, but not limited to, electron-beam irradiation, beta irradiation, gamma irradiation, corona irradiation, silanes, peroxides, allyl compounds and UV radiation with or without crosslinking catalyst. U.S. Pat. Nos. 6,803,014 and 6,667,351 disclose electron-beam irradiation methods that can be used in embodiments of the invention.

Irradiation may be accomplished by the use of high energy, ionizing electrons, ultra violet rays, X-rays, gamma rays, beta particles and the like and combination thereof. Preferably, electrons are employed up to 70 megarads dosages. The irradiation source can be any electron beam generator operating in a range of about 150 kilovolts to about 6 megavolts with a power output capable of supplying the desired dosage. The voltage can be adjusted to appropriate levels which may be, for example, 100,000, 300,000, 1,000,000 or 2,000,000 or 3,000,000 or 6,000,000 or higher or lower. Many other apparati for irradiating polymeric materials are known in the art. The irradiation is usually carried out at a dosage between about 3 megarads to about 35 megarads, preferably between about 8 to about 20 megarads. Further, the irradiation can be carried out conveniently at room temperature, although higher and lower temperatures, for example 0° C. to about 60° C., may also be employed. Preferably, the irradiation is carried out after shaping or fabrication of the article, such as a film. Also, in a preferred embodiment, the ethylene interpolymer which has been incorporated with a pro-rad additive is irradiated with electron beam radiation at about 8 to about 20 megarads.

Crosslinking can be promoted with a crosslinking catalyst, and any catalyst that will provide this function can be used. Suitable catalysts generally include organic bases, carboxylic acids, and organometallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylate, especially dibutyltindilaurate and dioctyltinmaleate, are particularly effective. The catalyst (or mixture of catalysts) is present in a catalytic amount, typically between about 0.015 and about 0.035 phr.

Representative pro-rad additives include, but are not limited to, azo compounds, organic peroxides and polyfunctional vinyl or allyl compounds such as, for example, triallyl cyanurate, triallyl isocyanurate, pentaerthritol tetramethacrylate, glutaraldehyde, ethylene glycol dimethacrylate, diallyl maleate, dipropargyl maleate, dipropargyl monoallyl cyanurate, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, tert-butyl peracetate, azobisisobutyl nitrite and the like and combination thereof. Preferred pro-rad additives for use in some embodiments of the invention are compounds which have poly-functional (i.e. at least two) moieties such as C=C, C=N or C=O.

At least one pro-rad additive can be introduced to the ethylene interpolymer by any method known in the art. However, preferably the pro-rad additive(s) is introduced via a masterbatch concentrate comprising the same or different base resin as the ethylene interpolymer. Preferably, the pro-rad additive concentration for the masterbatch is relatively high e.g., about 25 weight percent (based on the total weight of the concentrate).

The at least one pro-rad additive is introduced to the ethylene polymer in any effective amount. Preferably, the at least one pro-rad additive introduction amount is from about 0.001 to about 5 weight percent, more preferably from about 0.005 to about 2.5 weight percent and most preferably from about 0.015 to about 1 weight percent (based on the total weight of the ethylene interpolymer).

In addition to electron-beam irradiation, crosslinking can also be effected by UV irradiation. U.S. Pat. No. 6,709,742 discloses a cross-linking method by UV irradiation which can be used in embodiments of the invention. The method comprises mixing a photoinitiator, with or without a photocrosslinker, with a polymer before, during, or after a fiber is formed and then exposing the fiber with the photoinitiator to sufficient UV radiation to crosslink the polymer to the desired level. The photoinitiators used in the practice of the invention are aromatic ketones, e.g., benzophenones or monoacetals of 1,2-diketones. The primary photoreaction of the monacetals is the homolytic cleavage of the a-bond to give acyl and dialkoxyalkyl radicals. This type of a-cleavage is known as a Norrish Type I reaction which is more fully described in W. Horspool and D. Armesto, Organic Photochemistry: A Comprehensive Treatment, Ellis Horwood Limited, Chichester, England, 1992; J. Kopecky, Organic Photochemistry: A Visual Approach, VCH Publishers, Inc., New York, N.Y. 1992; N. J. Turro, et al., Acc. Chem. Res., 1972, 5, 92; and J. T. Banks, et al., J. Am. Chem. Soc., 1993, 115, 2473. The synthesis of monoacetals of aromatic 1,2 diketones, Ar—CO—C(OR)$_2$—Ar' is described in U.S. Pat. No. 4,190,602 and Ger. Offen. 2,337,813. The preferred compound from this class is 2,2-dimethoxy-2-phenylacetophenone, $C_6H_5$—CO—$C(OCH_3)_2$—$C_6H_5$, which is commercially available from Ciba-Geigy as Irgacure 651. Examples of other aromatic ketones useful as photoinitiators are Irgacure 184, 369, 819, 907 and 2959, all available from Ciba-Geigy.

In one embodiment of the invention, the photoinitiator is used in combination with a photocrosslinker. Any photocrosslinker that will upon the generation of free radicals, link two or more olefin polymer backbones together through the formation of covalent bonds with the backbones can be used. Preferably these photocrosslinkers are polyfunctional, i.e., they comprise two or more sites that upon activation will form a covalent bond with a site on the backbone of the copolymer. Representative photocrosslinkers include, but are not limited to polyfunctional vinyl or allyl compounds such as, for example, triallyl cyanurate, triallyl isocyanurate, pentaerythritol tetramethacrylate, ethylene glycol dimethacrylate, diallyl maleate, dipropargyl maleate, dipropargyl monoallyl cyanurate and the like. Preferred photocrosslinkers for use in some embodiments of the invention are compounds which have polyfunctional (i.e. at least two) moieties. Particularly preferred photocrosslinkers are triallycyanurate (TAC) and triallylisocyanurate (TAIC).

Certain compounds act as both a photoinitiator and a photocrosslinker. These compounds are characterized by the ability to generate two or more reactive species (e.g., free radicals, carbenes, nitrenes, etc.) upon exposure to UV-light and to subsequently covalently bond with two polymer chains. Any compound that can preform these two functions can be used in some embodiments of the invention, and representative compounds include the sulfonyl azides described in U.S. Pat. Nos. 6,211,302 and 6,284,842.

In another embodiment of this invention, the copolymer is subjected to secondary crosslinking, i.e., crosslinking other than and in addition to photocrosslinking. In this embodiment, the photoinitiator is used either in combination with a nonphotocrosslinker, e.g., a silane, or the copolymer is subjected to a secondary crosslinking procedure, e.g, exposure to E-beam radiation. Representative examples of silane crosslinkers are described in U.S. Pat. No. 5,824,718, and crosslinking through exposure to E-beam radiation is described in U.S. Pat. Nos. 5,525,257 and 5,324,576. The use of a photocrosslinker in this embodiment is optional.

At least one photoadditive, i.e., photoinitiator and optional photocrosslinker, can be introduced to the copolymer by any method known in the art. However, preferably the photoadditive(s) is (are) introduced via a masterbatch concentrate comprising the same or different base resin as the copolymer. Preferably, the photoadditive concentration for the masterbatch is relatively high e.g., about 25 weight percent (based on the total weight of the concentrate).

The at least one photoadditive is introduced to the copolymer in any effective amount. Preferably, the at least one photoadditive introduction amount is from about 0.001 to about 5, more preferably from about 0.005 to about 2.5 and most preferably from about 0.015 to about 1, wt % (based on the total weight of the copolymer).

The photoinitiator(s) and optional photocrosslinker(s) can be added during different stages of the film manufacturing process. If photoadditives can withstand the extrusion temperature, an olefin polymer resin can be mixed with additives before being fed into the extruder, e.g., via a masterbatch addition. Alternatively, additives can be introduced into the extruder just prior the slot die, but in this case the efficient mixing of components before extrusion is important. In another approach, olefin polymer films can be oriented without photoadditives, and a photoinitiator and/or photocrosslinker can be applied to the extruded film via a kiss-roll, spray, dipping into a solution with additives, or by using other industrial methods for post-treatment. The resulting film with photoadditive(s) is then cured via electromagnetic radiation in a continuous or batch process. The photo additives can be blended with an olefin polymer using conventional compounding equipment, including single and twin-screw extruders.

The power of the electromagnetic radiation and the irradiation time are chosen so as to allow efficient crosslinking without polymer degradation and/or dimensional defects. The preferred process is described in EP 0 490 854 B1. Photoadditive(s) with sufficient thermal stability is (are) premixed with an olefin polymer resin, extruded into a film, and irradiated in a continuous process using one energy source or several units linked in a series. There are several advantages to using a continuous process compared with a batch process to cure a film.

Irradiation may be accomplished by the use of UV-radiation. Preferably, UV-radiation is employed up to the intensity of 100 J/cm$^2$. The irradiation source can be any UV-light generator operating in a range of about 50 watts to about 25000 watts with a power output capable of supplying the desired dosage. The wattage can be adjusted to appropriate levels which may be, for example, 1000 watts or 4800 watts or 6000 watts or higher or lower. Many other apparati for UV-irradiating polymeric materials are known in the art. The irradiation is usually carried out at a dosage between about 3 J/cm² to about 500 J/scm², preferably between about 5 J/cm² to about 100 J/cm². Further, the irradiation can be carried out conveniently at room temperature, although higher and lower temperatures, for example 0° C. to about 60° C., may also be employed. The photocrosslinking process is faster at higher temperatures. Preferably, the irradiation is carried out after shaping or fabrication of the article. In a preferred embodiment, the copolymer which has been incorporated with a photoadditive is irradiated with UV-radiation at about 10 J/cm² to about 50 J/cm².

The polymers described herein are also useful for wire and cable coating operations, as well as in sheet extrusion for vacuum forming operations, and forming molded articles, including the use of injection molding, blow molding process, or rotomolding processes. Compositions comprising the olefin polymers can also be formed into fabricated articles such as those previously mentioned using conventional polyolefin processing techniques which are well known to those skilled in the art of polyolefin processing. Dispersions, both aqueous and non-aqueous, can also be formed using the polymers or formulations comprising the same. Frothed foams comprising the invented polymers can also be formed, as disclosed in PCT application No. PCT/US2004/027593, filed Aug. 25, 2004, and published as WO2005/021622. The polymers may also be crosslinked by any known means, such as the use of peroxide, electron beam, silane, azide, or other cross-linking technique. The polymers can also be chemically modified, such as by grafting (for example by use of maleic anhydride (MAH), silanes, or other grafting agent), halogenation, amination, sulfonation, or other chemical modification.

Suitable end uses for the foregoing products include elastic films and fibers; soft touch goods, such as tooth brush handles and appliance handles; antiblocking compositions; cap liners, gaskets and profiles; adhesives (including hot melt adhesives and pressure sensitive adhesives); footwear (including shoe soles and shoe liners); auto interior parts and profiles; foam goods (both open and closed cell); impact modifiers for other thermoplastic polymers; coated fabrics; hoses; tubing; weather stripping; cap liners; flooring; and viscosity index modifiers, also known as pour point modifiers, for lubricants.

EXAMPLES

As stated above, the bimodal molecular weight "split" of the polymer may be selected by controlling the mole fractions (f) of the two or more monomers, n, such that the mole fraction of monomer m is defined as:

$$f_m = \frac{[Momomer_m]}{\sum_{i=1}^{n}[Monomer_i]}.$$

Figure 20:
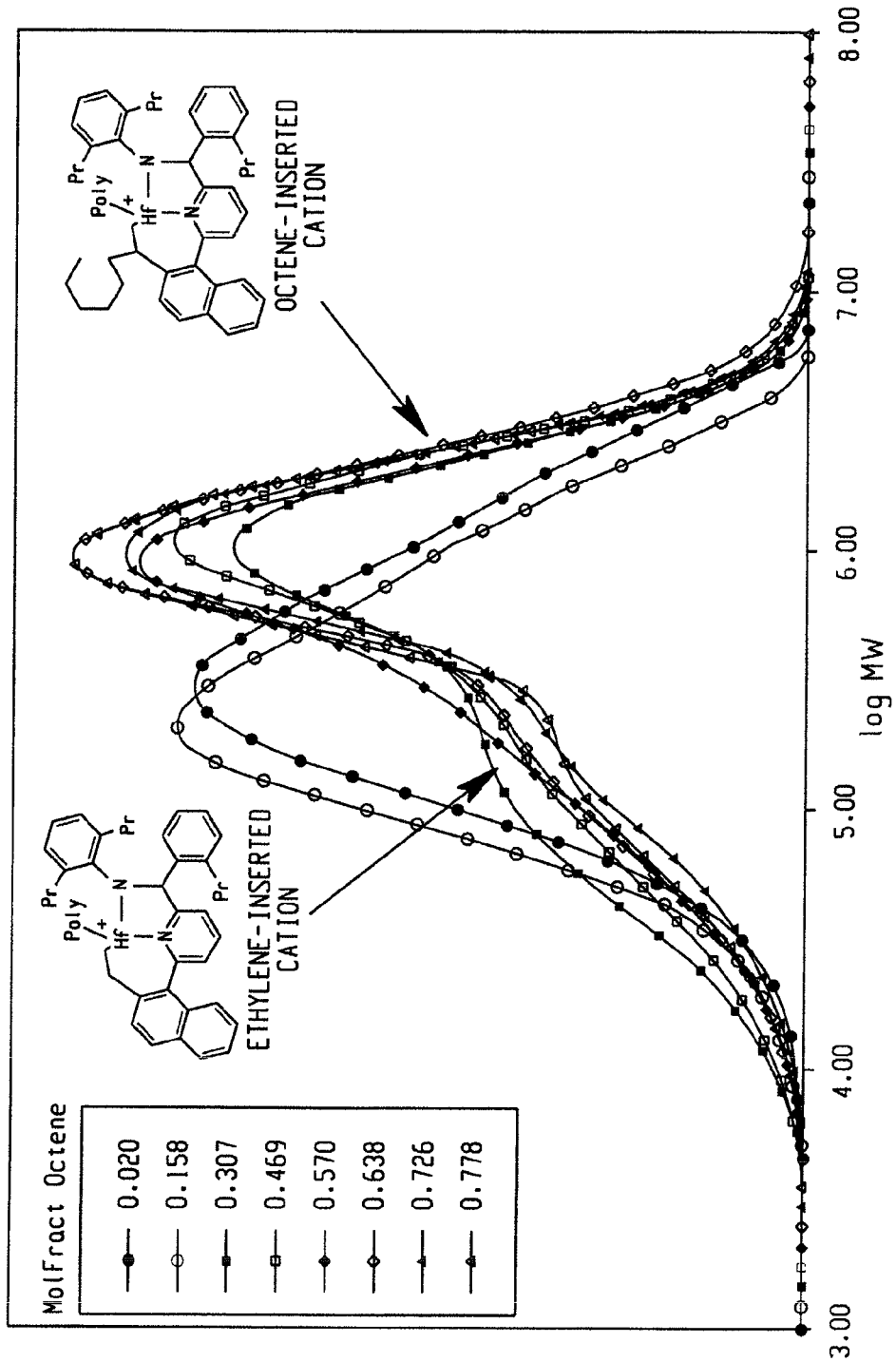
FIG. 20 depicts molecular weight distributions of ethylene-octene copolymers.
Figure 21:
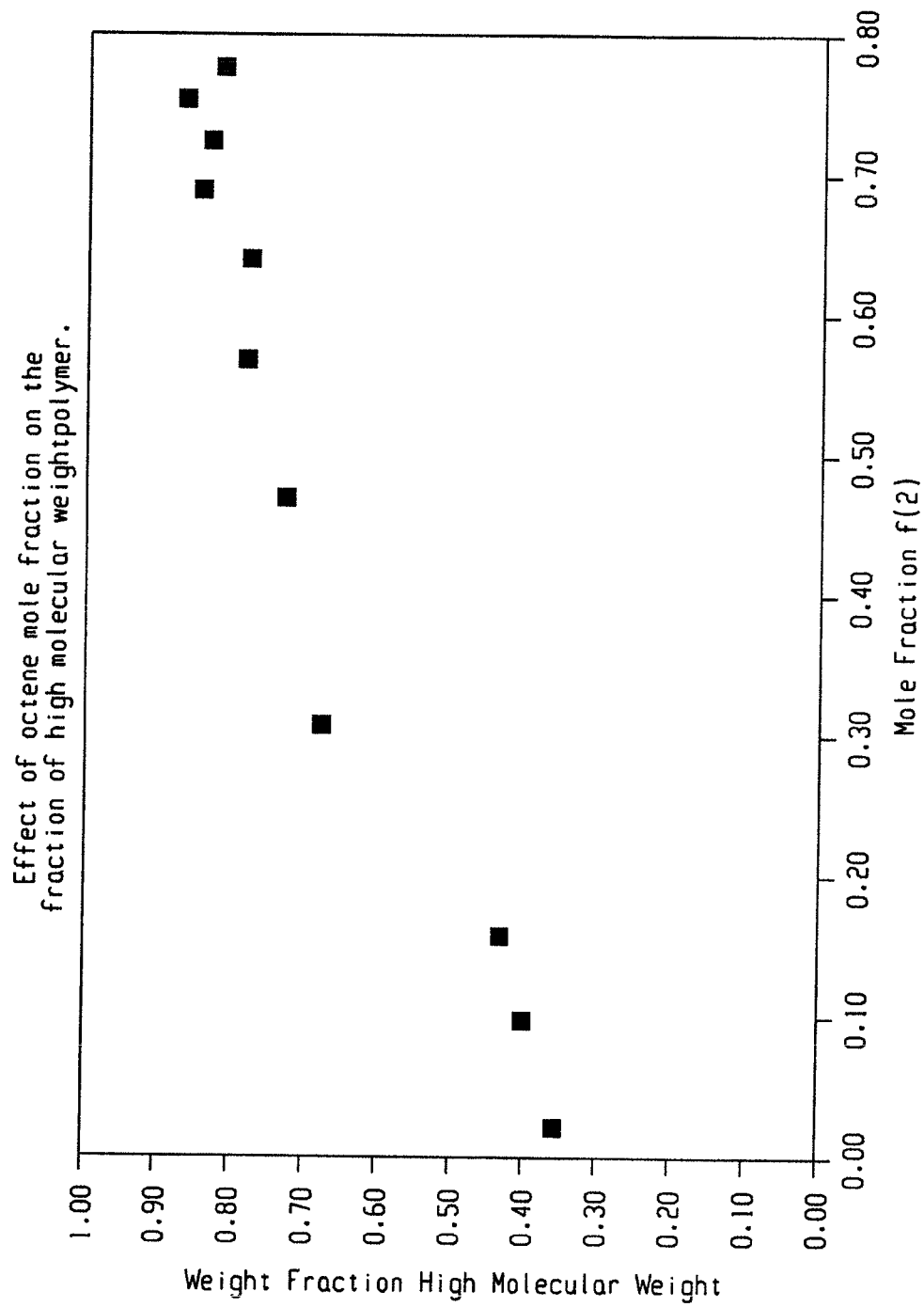
FIG. 21 depicts the effect of octene mole fraction on the fraction of high molecular weight polymer.
Figure 22:
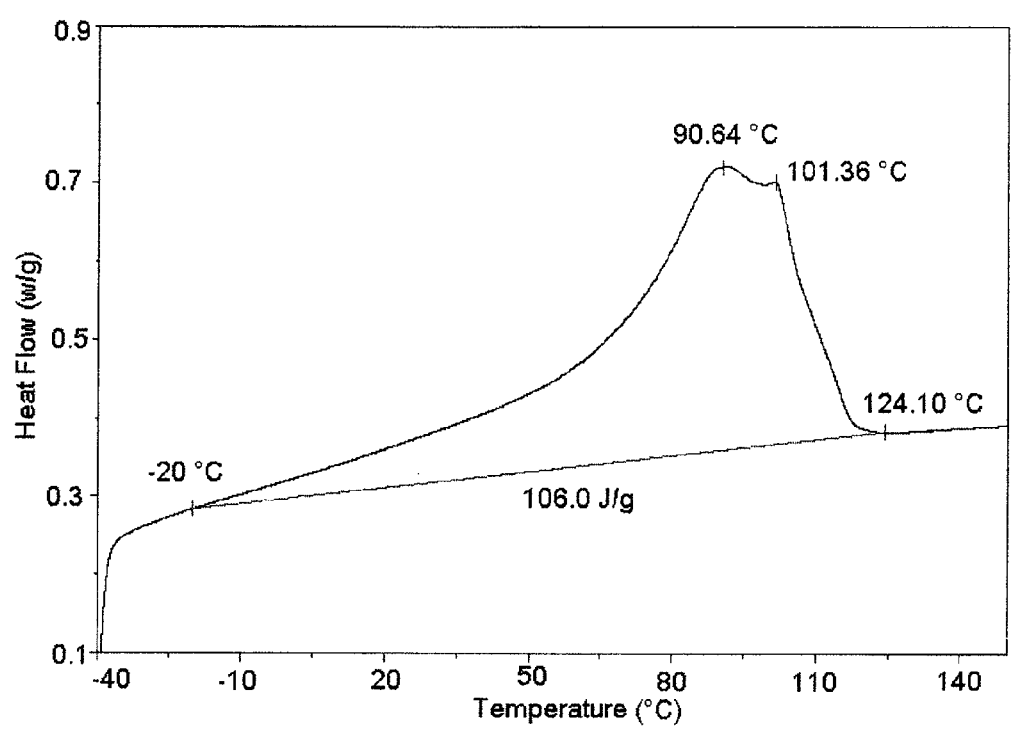
FIGS. 22, 23, 24, and 25 show the DSC curves and melting peak temperature obtained using a TA Instruments model Q1000 DSC for interpolymers of Examples 16, 17, 20, and 21 respectively.

This may be quantified for an ethylene-octene copolymer as depicted in FIGS. 20 and 21. At low $f_2$, the low molecular weight fraction predominates, but at higher $f_2$, the higher molecular weight species is more prevalent.

General Experimental Considerations

Unless specified otherwise, all reagents are handled under anaerobic conditions using standard procedures for the handling of extremely air- and water-sensitive materials. Solvents are used without further purification. All other chemicals are commercial materials and are used as received.

General Reactor Polymerization Procedure

A one-gallon AE autoclave is purged at high temperature with $N_2$. ISOPAR® E was added, and the reactor is heated to 120° C. 1-Octene and hydrogen are added batchwise to the reactor and are not regulated during the run. The reactor is then pressurized with ethylene (450 psi). Solutions of the pre-catalyst, cocatalyst (1.2 equivalents to pre-catalyst), and a scavenger (5 equivalents to pre-catalyst) are mixed and then added to the reactor using a flush of high pressure ISOPAR® E. Polymer yield is kept low to minimize monomer composition drift during the experiment. After the prescribed reaction time, reactor contents are dumped into a resin kettle and mixed with IRGANOX® 1010/IRGAFOS® 168 stabilizer mixture (1 g). The polymer is recovered by evaporating the majority of the solvent at room temperature and then dried further in a vacuum oven overnight at 90° C. Following the run, the reactor is hot-flushed with ISOPAR® E to prevent polymer contamination from run to run.

TABLE 1

Batch reactor ethylene/octene copolymerization with Pre-catalyst.

| Example | Pre-catalyst* (mol) | ISOPAR® E feed (g) | Ethylene feed (g) | Octene feed (g) | $f_2$ | Yield (g) |
| --- | --- | --- | --- | --- | --- | --- |
| 1 | 2.0 | 1591 | 153 | 11 | 0.02 | 44 |
| 2 | 2.0 | 1550 | 151 | 56 | 0.10 | 41 |
| 3 | 2.0 | 1506 | 153 | 100 | 0.16 | 46 |
| 4 | 2.5 | 1402 | 167 | 203 | 0.31 | 26 |
| 5 | 2.5 | 1201 | 168 | 400 | 0.47 | 36 |
| 6 | 2.5 | 1009 | 170 | 605 | 0.57 | 44 |
| 7 | 3.0 | 812 | 169 | 801 | 0.64 | 66 |
| 8 | 3.0 | 611 | 165 | 1003 | 0.69 | 60 |
| 9 | 3.0 | 401 | 166 | 1202 | 0.73 | 64 |
| 10 | 3.0 | 204 | 166 | 1402 | 0.75 | 52 |
| 11 | 3.5 | 10 | 168 | 1603 | 0.78 | 84 |

| Example | $M_w$ (kg/mol) | $M_n$ (kg/mol) | $M_w/M_n$ |
| --- | --- | --- | --- |
| 1 | 671 | 174 | 3.86 |
| 2 | 588 | 164 | 3.59 |
| 3 | 517 | 139 | 3.71 |
| 4 | 851 | 116 | 7.35 |
| 5 | 972 | 137 | 7.10 |
| 6 | 906 | 164 | 5.51 |
| 7 | 1015 | 169 | 6.02 |
| 8 | 1108 | 232 | 4.78 |
| 9 | 1135 | 202 | 5.62 |
| 10 | 1148 | 239 | 4.81 |
| 11 | 1013 | 177 | 5.74 |

$^a$ Polymerization conditions: 1.2 equiv. co-catalyst, T = 120° C., 460 psig reactor pressure, 40 mmol hydrogen, t = 10 min.
*Pre-catalyst = [N-(2,6-di(1-methylethyl)phenyl)amido)(2-isopropylphenyl)(α-naphthalen-2-diyl(6-pyridin-2-diyl)methane)]hafnium dimethyl (as disclosed in U.S. Application No. 20040220050) and a co-catalyst of methyldi($C_{14-18}$alkyl) ammonium salts of tetrakis (pentafluorophenyl)borate (as disclosed in U.S. Pat. No. 5,919,983).

Examples 12-15

Continuous Solution Polymerization, Catalyst A1

Continuous solution polymerizations are carried out in a computer controlled autoclave reactor equipped with an internal stirrer. Purified mixed alkanes solvent (ISOPAR® E available from ExxonMobil, Inc.), ethylene, 1-octene, and hydrogen (where used) are supplied to a reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

The ethylene-octene copolymers in FIGS. 20-21 may be made in a similar manner.

Examples 16-22

Comparative Polymers A-F

Comparative polymer A was AFFINITY® PL 1880G polymer obtained from The Dow Chemical Company, Midland, Mich. Comparative polymer B was ATTANE™ 4203 polymer obtained from The Dow Chemical Company. Comparative polymer C was EXACT™ 3132, which is an ethylene-based hexene plastomer obtained from ExxonMobil Chemical, Houston, Tex. Comparative polymer D was a conventionally made ethylene-octene polymer. Comparative polymer E was Dow ATTANE™ 4201 G obtained from The Dow Chemical Company. Comparative polymer F was EXCEED™ 1012 obtained from ExxonMobil Chemical.

TABLE 2

| Ex. | $C_2H_4$ kg/hr | $C_8H_{16}$ kg/hr | Solv. kg/hr | $H_2$ sccm[1] | T °C. | Pre-cat $Al^{[2]}$ ppm | Pre-cat Al Flow Kg/hr | Cocat Conc. ppm | Cocat Flow kg/hr | MMAO Conc. ppm | MMAO Flow kg/hr | Poly Rate[3] kg/hr | $f_2$ | Conv %[4] | Solids % | Eff.[5] |
|---|---|---|---|---|---|---|---|---|---|---|---|---|---|---|---|---|
| 12 | 53.6 | 31.4 | 354 | 4,470 | 120 | 600 | 0.49 | 5000 | 0.49 | 600 | 0.45 | 82.5 | 0.63 | 89.6 | 19.3 | 281 |
| 13 | 38.6 | 32.4 | 288 | 2,303 | " | " | 0.38 | " | 0.38 | " | 0.40 | 66.7 | 0.68 | 89.1 | 20.6 | 303 |
| 14 | 62.1 | 18.8 | 425 | 4,768 | " | " | 0.63 | " | 0.62 | " | 0.65 | 79.0 | 0.51 | 90.1 | 16.9 | 202 |
| 15 | 65.5 | 13.4 | 345 | 3,951 | 130 | " | 0.86 | " | 0.85 | " | 0.44 | 73.4 | 0.34 | 92.2 | 19.0 | 145 |

[1] standard cm³/min
[2] [N-(2,6-di(1-methylethyl)phenyl)amido)(2-isopropylphenyl)(α-naphthalen-2-diyl(6-pyridin-2-diyl)methane)]hafnium dimethyl
[3] polymer production rate
[4] percent ethylene conversion in reactor
[5] efficiency, kg polymer/g M where g M = g Hf

TABLE 3

| Ex. | Density (g/cm³) | $I_2$ | $I_{10}/I_2$ | Mw (g/mol) | Mn (g/mol) | Mw/Mn |
|---|---|---|---|---|---|---|
| 12 | 0.8650 | 1.06 | 8.36 | 130 | 26.6 | 4.90 |
| 13 | 0.8560 | 0.92 | 8.00 | 142 | 49.6 | 2.87 |
| 14 | 0.8800 | 0.76 | 7.26 | 127 | 30.3 | 4.18 |
| 15 | 0.9030 | 0.97 | 7.00 | 107 | 24.3 | 4.40 |

Comparative polymer G was a Ziegler-Natta Ethylene Octene Copolymer having a Melt Index of 0.5 and a density of 0.903 g/cc having the designation XUS 61520.15L obtained from The Dow Chemical Company.

Examples 16-22 were prepared in manner similar to the procedure described for Examples 12-15 except that the process parameters of Table 4 below were employed. The properties of the resulting polymers of Examples 16-22 are shown in Tables 5 and 6 below.

TABLE 4

| Ex. | $C_2H_4$ kg/hr | $C_8H_{16}$ Kg/hr | Solv. kg/hr | $H_2$ Sccm[1] | T (°C.) | Pre-cat $Al^{[2]}$ ppm | Pre-cat Al Flow Kg/hr | Cocat Conc. ppm | Cocat Flow kg/hr | MMAO Conc. ppm | MMAO Flow kg/hr | Diethyl Zinc/Ethylene Ratio (1/1000) | Diethyl Zinc concentration in polymer (ppm) | Poly Rat[3] kg/hr | Conv %[4] | Solids % | Catalyst Efficiency (MM# Poly/ #Hf) |
|---|---|---|---|---|---|---|---|---|---|---|---|---|---|---|---|---|---|
| 16 | 182 | 72.1 | 1056 | 16911 | 120.1 | 500 | 1.59 | 6449 | 0.99 | 275 | 1.31 | 0.000 | 0 | 202 | 89.86 | 16.29 | 0.115 |
| 17 | 182 | 67.0 | 1056 | 7369 | 120.1 | 500 | 1.60 | 6449 | 1.08 | 275 | 1.32 | 0.142 | 125 | 199 | 89.90 | 16.07 | 0.113 |
| 18 | 206 | 99.2 | 1194 | 29974 | 120.0 | 600 | 1.11 | 6449 | 0.90 | 299 | 1.01 | 0.000 | 0 | 201 | 79.64 | 14.38 | 0.136 |
| 19 | 206 | 99.2 | 1194 | 16323 | 120.1 | 500 | 1.58 | 6449 | 1.07 | 299 | 1.20 | 0.127 | 125 | 200 | 79.74 | 14.29 | 0.115 |
| 20 | 195 | 47.5 | 1126 | 14939 | 125.1 | 594 | 1.25 | 6449 | 0.93 | 299 | 1.13 | 0.000 | 0 | 202 | 89.98 | 15.29 | 0.123 |
| 21 | 195 | 43.5 | 1126 | 5510 | 125.1 | 559 | 1.24 | 6963 | 0.80 | 386 | 0.85 | 0.134 | 125 | 199 | 89.96 | 15.11 | 0.130 |
| 22 | 172 | 26.8 | 1208 | 6947 | 130.1 | 456 | 1.33 | 5752 | 0.85 | 541 | 1.02 | 0.000 | 0 | 187 | 90.27 | 13.62 | 0.139 |

[1] standard cm³/min
[2] [N-(2,6-di(1-methylethyl)phenyl)amido)(2-isopropylphenyl)(α-naphthalen-2-diyl(6-pyridin-2-diyl)methane)]hafnium dimethyl
[3] polymer production rate
[4] percent ethylene conversion in reactor

TABLE 5

| Ex. | Density (g/cm3) | $I_2$ | $I_{10}/I_2$ | Mw (g/mol) | Mn (g/mol) | Mw/Mn | B value | Wt. % octene using matrix method |
|---|---|---|---|---|---|---|---|---|
| 16 | 0.9022 | 0.94 | 6.35 | 106400 | 28670 | 3.71 | 1.03 | 16.54 |
| 17 | 0.9020 | 0.95 | 5.66 | 106100 | 43920 | 2.42 | 1.03 | 15.57 |
| 18 | 0.9029 | 0.93 | 5.86 | 108300 | 31580 | 3.43 | | |
| 19 | 0.9023 | 0.97 | 5.63 | 105000 | 45900 | 2.29 | | |
| 20 | 0.9125 | 0.93 | 6.16 | 107700 | 30120 | 3.58 | 1.02 | 10.73 |
| 21 | 0.9117 | 0.93 | 5.59 | 105200 | 43560 | 2.42 | 1.02 | 9.76 |
| 22 | 0.9059 | 0.44 | 6.53 | 125500 | 37300 | 3.36 | 1.024 | 13.95 |

Figure 23:
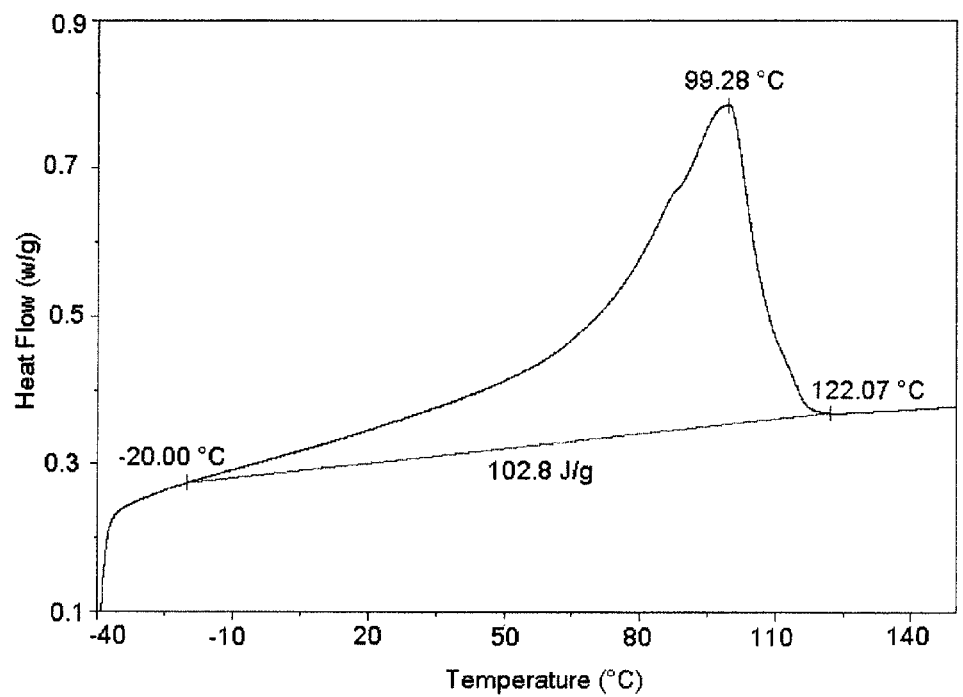
Figure 24:
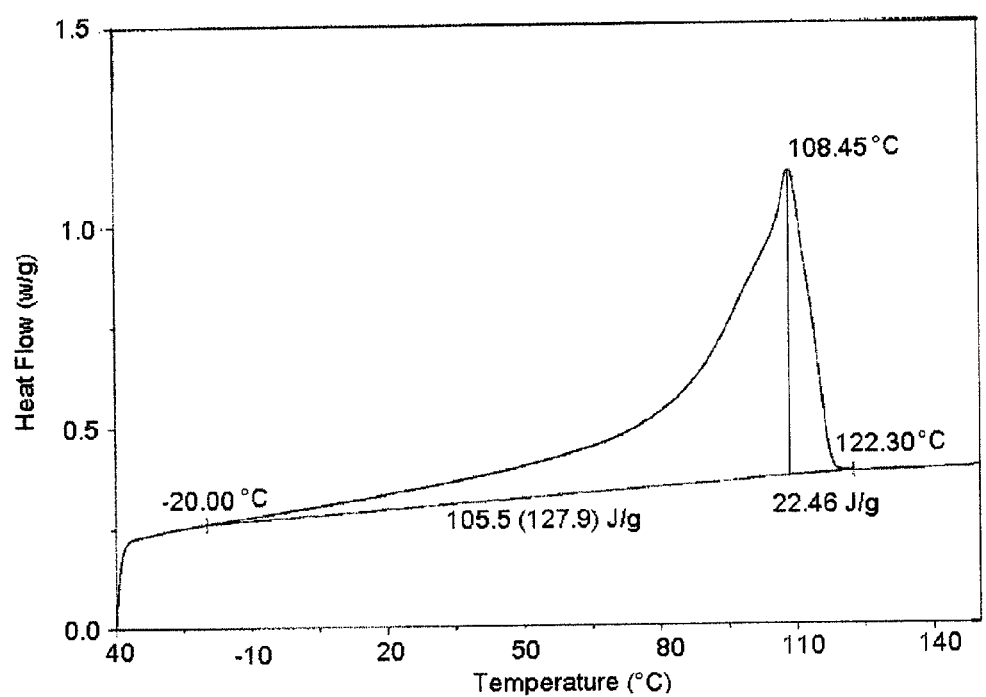
Figure 25:
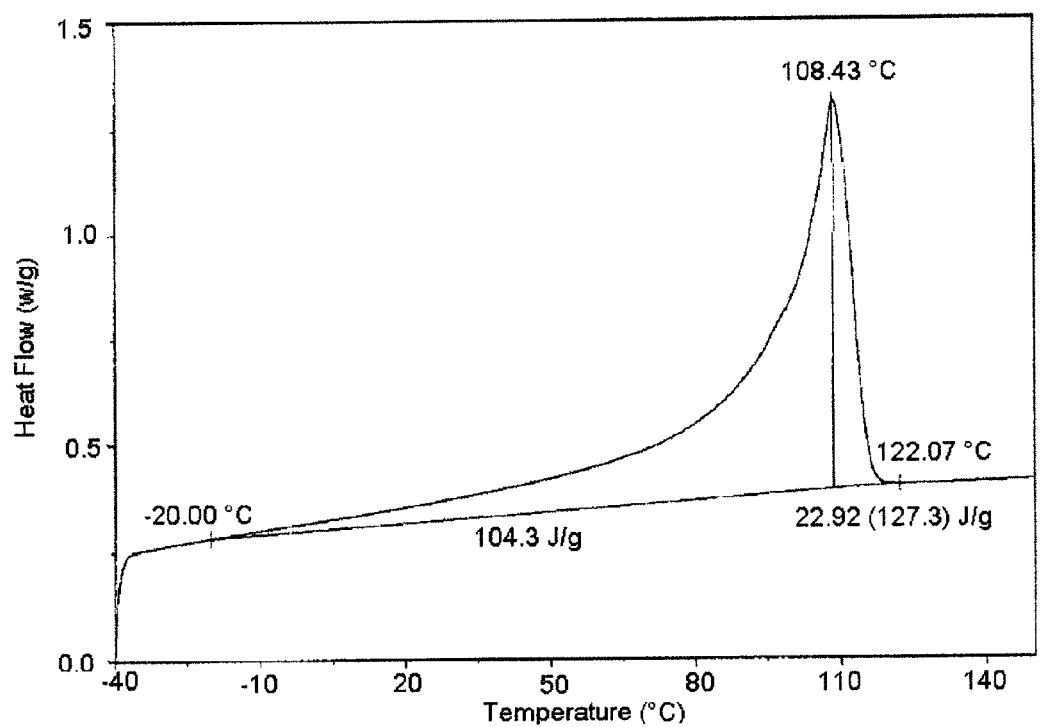
Figure 28:
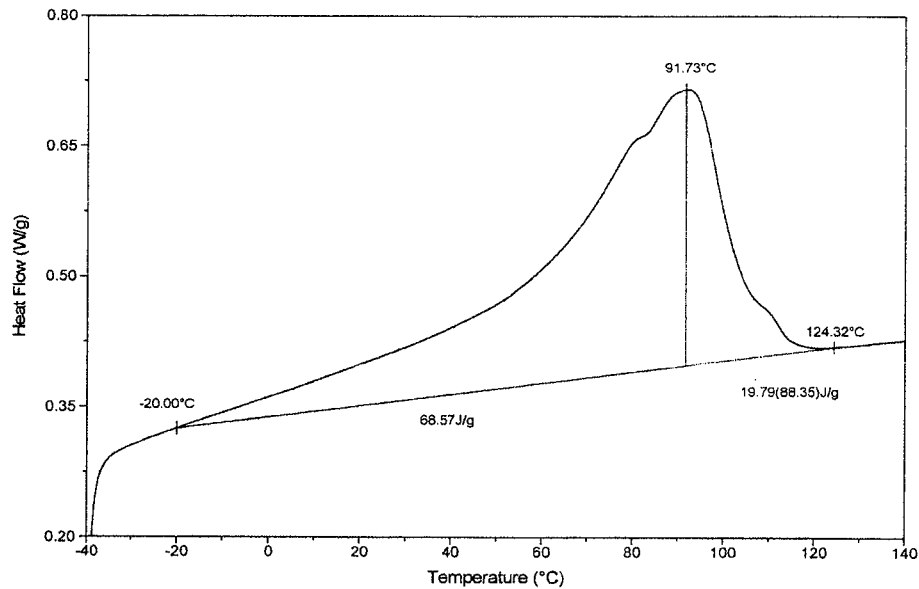
FIG. 28 shows the DSC curve obtained using a TA Instruments model Q1000 DSC for interpolymer of Example 22.

The Differential Scanning Calorimetry (DSC) curves of Examples 16-21 and Comparative Examples A-F were measured according to the procedure below. A TA Instruments model Q1000 DSC equipped with an RCS cooling accessory and an autosampler was used. A nitrogen purge gas flow of 50 ml/minute was used. The sample was pressed and melted in a press at about 175° C. and then air-cooled to room temperature (25° C.) to form a thin film. A disk of about 4-8 mg and 6 mm in diameter was cut from the thin film, accurately weighed, placed in a light aluminum pan (ca 50 mg), and then crimped shut. Thermal behavior of the sample was investigated with the following temperature profile. The sample was rapidly heated to 180° C. and held isothermal for 3 minutes in order to remove any previous thermal history. The sample was then cooled to −40° C. at 10° C./minute cooling rate and held at −40° C. for 3 minutes. The sample was then heated to 190° C. at 10° C./minute heating rate. The area under the melting curve was measured from −20° C. to the end of the melting. The DSC curves of Examples 16, 17, 20, and 21 are shown in FIGS. 22, 23, 24 and 25 respectively. The DSC curve of Example 22 is shown in FIG. 28. The melting peak temperature is chosen as the temperature at the maximum in heat flow with respect to a linear baseline. For example, the melting peak temperature for Example 17 shown in FIG. 23 is 99.28° C., not 122.07° C. The melting peak temperatures are reported in Table 6 below. The area under the DSC curve from the melting peak temperature to the end of the melting is reported as the melting peak residual area. Similarly, the enthalpy corresponding to the melting peak residual area is the residual enthalpy at melting peak. The melting peak residual area as a percentage of the total enthalpy or heat of fusion is also reported. The DSC results are listed in Table 6 below.

TABLE 6

| Samples | | Melting Peak (° C.) | Residual Enthalpy at melting peak (J/g) | Total Enthalpy (J/gm) | Melting Peak Residual Area (%) |
|---|---|---|---|---|---|
| Example 16 | | 90.64 | 37.66 | 106 | 35.53 |
| Example 17 | | 99.28 | 19.48 | 102.8 | 18.95 |
| Example 18 | | 93.01 | 35.72 | 107 | 33.38 |
| Example 19 | | 99.85 | 19.26 | 105 | 18.34 |
| Example 20 | | 108.45 | 22.46 | 127.9 | 17.56 |
| Example 21 | | 108.43 | 22.92 | 127.3 | 18.00 |
| Example 22 | | 91.73 | 19.79 | 88.35 | 22.40 |
| Comparative | 1st run | 100.17 | 14.60 | 106.7 | 13.68 |
| Polymer A | 2nd run | 100.02 | 14.53 | 104.9 | |
| Comparative Polymer B | | 123.01 | 5.95 | 113.3 | 5.25 |
| Comparative Polymer C | | 95.42 | 16.60 | 103.8 | 15.99 |
| Comparative Polymer D | | 109.77 | 14.43 | 130.6 | 11.05 |
| Comparative Polymer E | | 121.87 | 5.816 | 125.6 | 4.63 |
| Comparative Polymer F | | 114.84 | 12.77 | 128.5 | 9.94 |
| Comparative Polymer G | | 122.04 | 5.69 | 112.4 | 5.06 |

Figure 26:
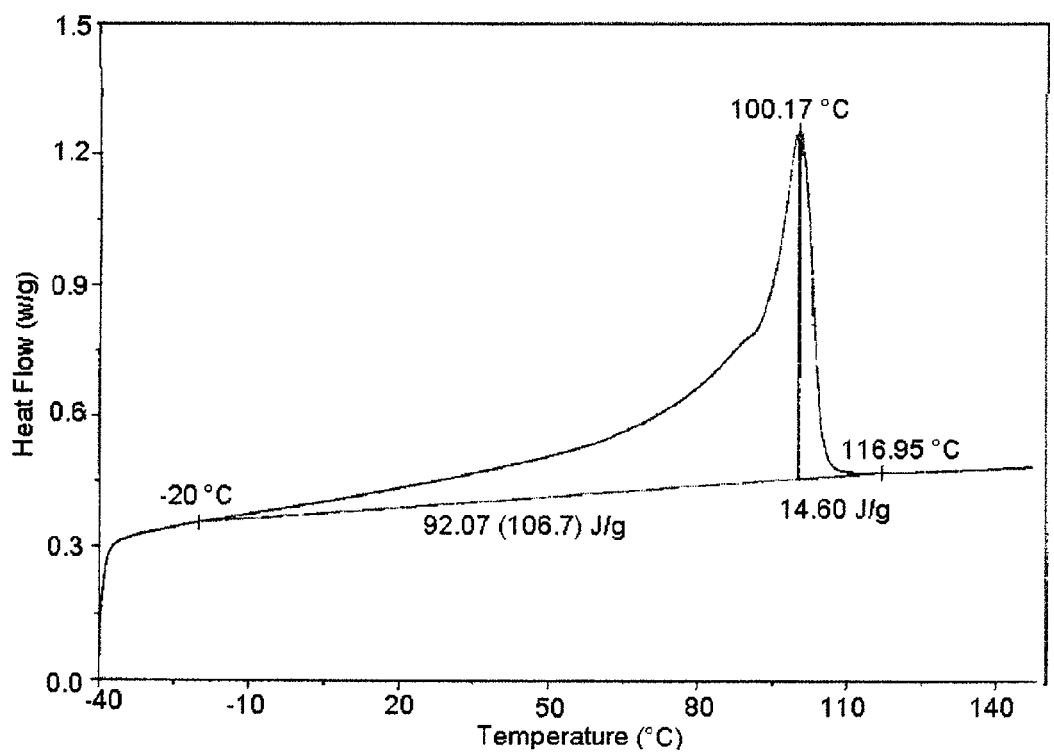
FIG. 26 shows the DSC curve and melting peak temperature obtained using a TA Instruments model Q1000 DSC for polymer of Comparative Polymer A.
Figure 27:
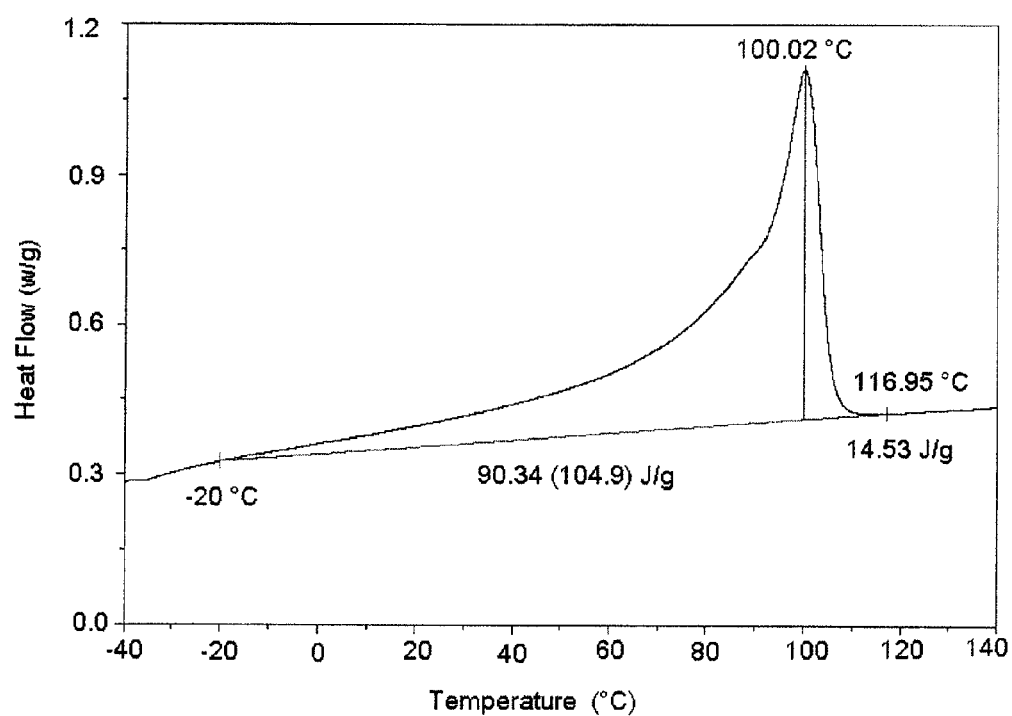
FIG. 27 shows a DSC curve and melting peak temperature obtained using a TA Instruments model 2920 DSC for polymer of Comparative Polymer A.

Two DSC curves for Comparative Polymer A were run using different DSC instruments. FIGS. 26 and 27 show DSC curves of Comparative Polymer A obtained using a TA Instruments model Q1000 DSC and a TA Instruments model 2920 DSC respectively. The DSC curves of Examples 16 and 17 are bimodal and broader than that of Comparative Polymer A.

Long Chain Branching (LCB)

The LCB results shown in Table 7 may be obtained using the techniques described in, for example, Randall (Rev. Macromol. Chem. Phys., C29 (2&3), p. 285-297), the disclosure of which is incorporated herein by reference, or the techniques described by A. Willem deGroot and P. Steve Chum Oct. 4, 1994 conference of the Federation of Analytical Chemistry and Spectroscopy Society (FACSS) in St. Louis, Mo., U.S.A., the disclosure of which is incorporated herein by reference.

TABLE 7

| Example | LCB in 1000 carbon atoms |
|---|---|
| 16 | <0.01 |
| 17 | <0.01 |
| 18 | <0.01 |
| 19 | <0.01 |
| 20 | <0.01 |
| 21 | <0.01 |
| 22 | <0.01 |

Multilayer Film

The inventive interpolymers disclosed herein can be used in any multilayer film known to a skilled artisan. In some embodiments, the multilayer film comprises a base layer and a sealant layer. In other embodiments, the multilayer film comprises a base layer, a sealant layer, and a tie layer between the base layer and the sealant layer.

In some embodiments, the base layer is a heat resistant layer having a melting point higher than that of the sealant layer. The heat resistant layer can comprise a single polymer or a blend of two or more polymers. Some non-limiting examples of suitable polymers for the heat resistant layer include polyethylene, polypropylene, polybutadiene, polystyrene, polyesters, polycarbonates, polyamides and combinations thereof. Any other polymer that has a melting point higher than that of the sealant layer disclosed herein can also be used. In a further embodiment, the base layer comprises a polyamide.

In certain embodiments, the base layer is a non-heat resistant layer having a melting point lower than that of the sealant layer. The non-heat resistant layer can comprise a single polymer or a blend of two more polymers. Some non-limiting examples of suitable polymers for the non-heat resistant layer include low-density polyethylene, polypropylene, poly(3-hydroxybutyrate) (PHB), polydimethylsiloxane and combinations thereof. Any other polymer that has a melting point lower than that of the sealant layer disclosed herein can also be used. In further embodiments, the base layer has about the same melting point as the sealant layer and comprises any of the polymers mentioned above or a combination thereof.

In some embodiments, the thickness of the base layer can be from about 1% to about 90%, from about 3% to about 80%, from about 5% to about 70%, from about 10% to about 60%, from about 15% to about 50%, or from about 20% to about 40% of the total thickness of the multilayer film. In other embodiments, the thickness of the base layer is from about 10% to about 40%, from about 15% to about 35%, from about 20% to about 30%, or from about 22.5% to about 27.5% of the total thickness of the multilayer film. In further embodiments, the total thickness of the base layer is about 25% of the total thickness of the multilayer film.

The sealant layer may comprise at least an ethylene/α-olefin interpolymer disclosed herein. In some embodiments, the sealant layer may further comprise one or more polymers comprising repeating units derived from ethylene, for example, low density polyethylene, other ethylene/α-olefin copolymers, ethylene/vinyl acetate copolymers, ethylene/alkyl acrylate copolymers, ethylene/acrylic acid copolymers, as well as the metal salts of ethylene/acrylic acid, commonly referred to as inomers.

In some embodiments, the thickness of the sealant layer is from about 1% to about 90%, from about 3% to about 80%, from about 5% to about 70%, from about 10% to about 60%, from about 15% to about 50%, or from about 20% to about 40% of the total thickness of multilayer film. In other embodiments, the thickness of the sealant layer is from about 10% to about 40%, from about 15% to about 35%, from about 20% to about 30%, or from about 22.5% to about 27.5% of the total thickness of the multilayer film. In further embodiments, the total thickness of the sealant layer is about 25% of the total thickness of the multi layer film.

The tie layer can be any layer that can promote the adhesion between its two adjacent layers. In some embodiments, the tie layer is between or adjacent to the base layer and the sealant layer. Some non-limiting examples of suitable polymers for the tie layer include ethylene/vinyl acetate copolymers, ethylene/methyl acrylate copolymers, ethylene/butyl acrylate copolymers, very low density polyethylene (VLDPE), ultralow density polyethylene (ULDPE), TAFMER™ resins, as well as metallocene catalyzed ethylene/α-olefin copolymers of lower densities. Generally, some resins suitable for use in the sealant layer can serve as tie layer resins. In some embodiments, the thickness of the sealant layer is from about 1% to about 99%, from about 10% to about 90%, from about 20% to about 80%, from about 30% to about 70%, or from about 40% to about 60% of the total thickness of multilayer film. In other embodiments, the thickness of the sealant layer is from about 45% to about 55% of the total thickness of the multilayer film. In further embodiments, the total thickness of the sealant layer is about 50% of the total thickness of the multilayer film.

In some embodiments, the multilayer film comprises at least two layers. For example, the multilayer film may comprise 2, 3, 4, 5, 6, 7, 8, 9, 10, 11, 12, 13, 14, 15 or more layers of films.

Optionally, each layer of the multilayer film, such as the base layer, tie layer and sealant layer, may independently comprise or be substantially free of at least an additive. Some non-limiting example of suitable additive include plasticizers, oils, waxes, antioxidants, UV stabilizers, colorants or pigments, fillers, flow aids, coupling agents, crosslinking agents, surfactants, solvents, slip agents, anti-blocking agents, lubricants, antifogging agents, nucleating agents, flame retardants, antistatic agents and combinations thereof. The total amount of the additives can range from about greater than 0 to about 80%, from about 0.001% to about 70%, from about 0.01% to about 60%, from about 0.1% to about 50%, from about 1% to about 40%, or from about 10% to about 50% of the total weight of the multilayer film. Some polymer additives have been described in Zweifel Hans et al., "*Plastics Additives Handbook*," Hanser Gardner Publications, Cincinnati, Ohio, 5th edition (2001), which is incorporated herein by reference in its entirety. In some embodiments, the multilayer films disclosed herein do not comprise an additive such as those disclosed herein.

In some embodiments, one or more layers of the multilayer film optionally comprise a slip agent. Slip is the sliding of film surfaces over each other or over some other substrates. The slip performance of films can be measured by ASTM D 1894, *Static and Kinetic Coefficients of Friction of Plastic Film and Sheeting*, which is incorporated herein by reference. In general, the slip agent can convey slip properties by modifying the surface properties of films; and reducing the friction between layers of the films and between the films and other surfaces with which they come into contact.

Any slip agent known to a person of ordinary skill in the art may be added to at least an outer layer of the multilayer film disclosed herein. Non-limiting examples of the slip agents include primary amides having about 12 to about 40 carbon atoms (e.g., erucamide, oleamide, stearamide and behenamide); secondary amides having about 18 to about 80 carbon atoms (e.g., stearyl erucamide, behenyl erucamide, methyl erucamide and ethyl erucamide); secondary-bis-amides having about 18 to about 80 carbon atoms (e.g., ethylene-bis-stearamide and ethylene-bis-oleamide); and combinations thereof.

Optionally, one or more layers of the multilayer film disclosed herein can comprise an anti-blocking agent. In some embodiments, the multilayer film disclosed herein do not comprise an anti-blocking agent. The anti-blocking agent can be used to prevent the undesirable adhesion between touching layers of the multilayer film, particularly under moderate pressure and heat during storage, manufacture or use. Any anti-blocking agent known to a person of ordinary skill in the art may be added to the multilayer film disclosed herein. Non-limiting examples of anti-blocking agents include minerals (e.g., clays, chalk, and calcium carbonate), synthetic silica gel (e.g., SYLOBLOC® from Grace Davison, Columbia, Md.), natural silica (e.g., SUPER FLOSS® from Celite Corporation, Santa Barbara, Calif.), talc (e.g., OPTIBLOC® from Luzenac, Centennial, Colo.), zeolites (e.g., SIPERNAT® from Degussa, Parsippany, N.J.), aluminosilicates (e.g., SILTON® from Mizusawa Industrial Chemicals, Tokyo, Japan), limestone (e.g., CARBOREX® from Omya, Atlanta, Ga.), spherical polymeric particles (e.g., EPOSTAR®, poly(methyl methacrylate) particles from Nippon Shokubai, Tokyo, Japan and TOSPEARL®, silicone particles from GE Silicones, Wilton, Conn.), waxes, amides (e.g. erucamide, oleamide, stearamide, behenamide, ethylene-bis-stearamide, ethylene-bis-oleamide, stearyl erucamide and other slip agents), molecular sieves, and combinations thereof. The mineral particles can lower blocking by creating a physical gap between articles, while the organic anti-blocking agents can migrate to the surface to limit surface adhesion. Where used, the amount of the anti-blocking agent in the multilayer film can be from about greater than 0 to about 3 wt %, from about 0.0001 to about 2 wt %, from about 0.001 to about 1 wt %, or from about 0.001 to about 0.5 wt % of the total weight of the multilayer film. Some anti-blocking agents have been described in Zweifel Hans et al., "*Plastics Additives Handbook*," Hanser Gardner Publications, Cincinnati, Ohio, 5th edition, Chapter 7, pages 585-600 (2001), which is incorporated herein by reference.

Optionally, one or more layers of the multilayer film disclosed herein can comprise a plasticizer. In general, a plasticizer is a chemical that can increase the flexibility and lower the glass transition temperature of polymers. Any plasticizer known to a person of ordinary skill in the art may be added to the multilayer film disclosed herein. Non-limiting examples of plasticizers include mineral oils, abietates, adipates, alkyl sulfonates, azelates, benzoates, chlorinated paraffins, citrates, epoxides, glycol ethers and their esters, glutarates, hydrocarbon oils, isobutyrates, oleates, pentaerythritol derivatives, phosphates, phthalates, esters, polybutenes, ricinoleates, sebacates, sulfonamides, tri- and pyromellitates, biphenyl derivatives, stearates, difuran diesters, fluorine-containing plasticizers, hydroxybenzoic acid esters, isocyanate adducts, multi-ring aromatic compounds, natural product derivatives, nitriles, siloxane-based plasticizers, tar-based products, thioeters and combinations thereof. Where used, the amount of the plasticizer in the multilayer film can be from greater than 0 to about 15 wt %, from about 0.5 to about 10 wt %, or from about 1 to about 5 wt % of the total weight of the multilayer film. Some plasticizers have been described in George Wypych, "*Handbook of Plasticizers*," ChemTec Publishing, Toronto-Scarborough, Ontario (2004), which is incorporated herein by reference.

In some embodiments, one or more layers of the multilayer film optionally comprise an antioxidant that can prevent the oxidation of polymer components and organic additives in the multilayer film. Any antioxidant known to a person of ordinary skill in the art may be added to the multilayer film disclosed herein. Non-limiting examples of suitable antioxidants include aromatic or hindered amines such as alkyl diphenylamines, phenyl-α-naphthylamine, alkyl or aralkyl substituted phenyl-α-naphthylamine, alkylated p-phenylene diamines, tetramethyl-diaminodiphenylamine and the like (e.g. CHIMASSORB 2020); phenols such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, New York); acryloyl modified phenols; octadecyl-3,5-di-t-butyl-4-hydroxycinnamate (e.g., IRGANOX™ 1076, commercially available from Ciba Geigy); phosphites and phosphonites; hydroxylamines; benzofuranone derivatives; and combinations thereof. Where used, the amount of the antioxidant in the multilayer film can be from about greater than 0 to about 5 wt %, from about 0.0001 to about 2.5 wt %, from about 0.001 to about 1 wt %, or from about 0.001 to about 0.5 wt % of the total weight of the multilayer film. Some antioxidants have been described in Zweifel Hans et al., "*Plastics Additives Handbook*," Hanser Gardner Publications, Cincinnati, Ohio, 5th edition, Chapter 1, pages 1-140 (2001), which is incorporated herein by reference.

In other embodiments, one or more layers of the multilayer film disclosed herein optionally comprise an UV stabilizer that may prevent or reduce the degradation of the multilayer film by UV radiations. Any UV stabilizer known to a person of ordinary skill in the art may be added to the multilayer film disclosed herein. Non-limiting examples of suitable UV stabilizers include benzophenones, benzotriazoles, aryl esters, oxanilides, acrylic esters, formamidines, carbon black, hindered amines, nickel quenchers, hindered amines, phenolic antioxidants, metallic salts, zinc compounds and combinations thereof. Where used, the amount of the UV stabilizer in the multilayer film can be from about greater than 0 to about 5 wt %, from about 0.01 to about 3 wt %, from about 0.1 to about 2 wt %, or from about 0.1 to about 1 wt % of the total weight of the multilayer film. Some UV stabilizers have been described in Zweifel Hans et al., "*Plastics Additives Handbook*," Hanser Gardner Publications, Cincinnati, Ohio, 5th edition, Chapter 2, pages 141-426 (2001), which is incorporated herein by reference.

In further embodiments, one or more layers of the multilayer film disclosed herein optionally comprise a colorant or pigment that can change the look of the multilayer film to human eyes. Any colorant or pigment known to a person of ordinary skill in the art may be added to the multilayer film disclosed herein. Non-limiting examples of suitable colorants or pigments include inorganic pigments such as metal oxides such as iron oxide, zinc oxide, and titanium dioxide, mixed metal oxides, carbon black, organic pigments such as anthraquinones, anthanthrones, azo and monoazo compounds, arylamides, benzimidazolones, BONA lakes, diketopyrrolo-pyrroles, dioxazines, disazo compounds, diarylide compounds, flavanthrones, indanthrones, isoindolinones, isoindolines, metal complexes, monoazo salts, naphthols, b-naphthols, naphthol AS, naphthol lakes, perylenes, perinones, phthalocyanines, pyranthrones, quinacridones, and quinophthalones, and combinations thereof. Where used, the amount of the colorant or pigment in the multilayer film can be from about greater than 0 to about 10 wt %, from about 0.1 to about 5 wt %, or from about 0.25 to about 2 wt % of the total weight of the multilayer film. Some colorants have been described in Zweifel Hans et al., "*Plastics Additives Handbook*," Hanser Gardner Publications, Cincinnati, Ohio, 5th edition, Chapter 15, pages 813-882 (2001), which is incorporated herein by reference.

Optionally, one or more layers of the multilayer film disclosed herein can comprise a filler which can be used to adjust, inter alia, volume, weight, costs, and/or technical performance. Any filler known to a person of ordinary skill in the art may be added to the multilayer film disclosed herein. Non-limiting examples of suitable fillers include talc, calcium carbonate, chalk, calcium sulfate, clay, kaolin, silica, glass, fumed silica, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, titanates and combinations thereof. In some embodiments, the filler is barium sulfate, talc, calcium carbonate, silica, glass, glass fiber, alumina, titanium dioxide, or a mixture thereof. In other embodiments, the filler is talc, calcium carbonate, barium sulfate, glass fiber or a mixture thereof. Where used, the amount of the filler in the multilayer film can be from about greater than 0 to about 80 wt %, from about 0.1 to about 60 wt %, from about 0.5 to about 40 wt %, from about 1 to about 30 wt %, or from about 10 to about 40 wt % of the total weight of the multilayer film. Some fillers have been disclosed in U.S. Pat. No. 6,103,803 and Zweifel Hans et al., "*Plastics Additives Handbook*," Hanser Gardner Publications, Cincinnati, Ohio, 5th edition, Chapter 17, pages 901-948 (2001), both of which are incorporated herein by reference.

Optionally, one or more layers of the multilayer film disclosed herein can comprise a lubricant. In general, the lubricant can be used, inter alia, to modify the rheology of the molten multilayer film, to improve the surface finish of molded articles, and/or to facilitate the dispersion of fillers or pigments. Any lubricant known to a person of ordinary skill in the art may be added to the multilayer film disclosed herein. Non-limiting examples of suitable lubricants include fatty alcohols and their dicarboxylic acid esters, fatty acid esters of short-chain alcohols, fatty acids, fatty acid amides, metal soaps, oligomeric fatty acid esters, fatty acid esters of long-chain alcohols, montan waxes, polyethylene waxes, polypropylene waxes, natural and synthetic paraffin waxes, fluoropolymers and combinations thereof. Where used, the amount of the lubricant in the multilayer film can be from about greater than 0 to about 5 wt %, from about 0.1 to about 4 wt %, or from about 0.1 to about 3 wt % of the total weight of the multilayer film. Some suitable lubricants have been disclosed in Zweifel Hans et al., "*Plastics Additives Hand-*

*book*," Hanser Gardner Publications, Cincinnati, Ohio, 5th edition, Chapter 5, pages 511-552 (2001), both of which are incorporated herein by reference.

Optionally, one or more layers of the multilayer film disclosed herein can comprise an antistatic agent. Generally, the antistatic agent can increase the conductivity of the multilayer film and to prevent static charge accumulation. Any antistatic agent known to a person of ordinary skill in the art may be added to the multilayer film disclosed herein. Non-limiting examples of suitable antistatic agents include conductive fillers (e.g., carbon black, metal particles and other conductive particles), fatty acid esters (e.g., glycerol monostearate), ethoxylated alkylamines, diethanolamides, ethoxylated alcohols, alkylsulfonates, alkylphosphates, quaternary ammonium salts, alkylbetaines and combinations thereof. Where used, the amount of the antistatic agent in the multilayer film can be from about greater than 0 to about 5 wt %, from about 0.01 to about 3 wt %, or from about 0.1 to about 2 wt % of the total weight of the multilayer film. Some suitable antistatic agents have been disclosed in Zweifel Hans et al., "*Plastics Additives Handbook*," Hanser Gardner Publications, Cincinnati, Ohio, 5th edition, Chapter 10, pages 627-646 (2001), both of which are incorporated herein by reference.

In further embodiments, one or more layers of the multilayer film disclosed herein optionally comprise a cross-linking agent that can be used to increase the cross-linking density of the multilayer film. Any cross-linking agent known to a person of ordinary skill in the art may be added to the multilayer film disclosed herein. Non-limiting examples of suitable cross-linking agents include organic peroxides (e.g., alkyl peroxides, aryl peroxides, peroxyesters, peroxycarbonates, diacylperoxides, peroxyketals, and cyclic peroxides) and silanes (e.g., vinyltrimethoxysilane, vinyltriethoxysilane, vinyltris(2-methoxyethoxy)silane, vinyltriacetoxysilane, vinylmethyldimethoxysilane, and 3-methacryloyloxypropyltrimethoxysilane). Where used, the amount of the cross-linking agent in the multilayer film can be from about greater than 0 to about 20 wt %, from about 0.1 to about 15 wt %, or from about 1 to about 10 wt % of the total weight of the multilayer film. Some suitable cross-linking agents have been disclosed in Zweifel Hans et al., "*Plastics Additives Handbook*," Hanser Gardner Publications, Cincinnati, Ohio, 5th edition, Chapter 14, pages 725-812 (2001), both of which are incorporated herein by reference.

In certain embodiments, one or more layers of the multilayer film optionally comprise a wax, such as a petroleum wax, a low molecular weight polyethylene or polypropylene, a synthetic wax, a polyolefin wax, a beeswax, a vegetable wax, a soy wax, a palm wax, a candle wax or an ethylene/α-olefin interpolymer having a melting point of greater than 25° C. In certain embodiments, the wax is a low molecular weight polyethylene or polypropylene having a number average molecular weight of about 400 to about 6,000 g/mole. The wax can be present in the range from about 10% to about 50% or 20% to about 40% by weight of the total composition.

The ethylene/α-olefin interpolymer disclosed herein can be used to prepare the multilayer films by any known film processes. In some embodiments, the ethylene/α-olefin interpolymer is used in the sealant layers of the multilayer films. Some non-limiting example of suitable film processes include blown film extrusion, cast film process, and the laminate film process.

Blown Film Extrusion Process

In general, extrusion is a process by which a polymer is propelled continuously along a screw through regions of high temperature and pressure where it is melted and compacted, and finally forced through a die. The extruder can be a single screw extruder, a multiple screw extruder, a disk extruder or a ram extruder. Several types of screw can be used. For example, a single-flighted screw, double-flighted screw, triple-flighted screw, or other multi-flighted screw can be used. The die can be a film die, blown film die, sheet die, pipe die, tubing die or profile extrusion die. In a blown film extrusion process, a blown film die for monolayer or multilayer film can be used. The extrusion of polymers has been described in C. Rauwendaal, "*Polymer Extrusion*", Hanser Publishers, New York, N.Y. (1986); and M. J. Stevens, "*Extruder Principals and Operation,*" Ellsevier Applied Science Publishers, New York, N.Y., (1985), both of which are incorporated herein by reference in their entirety.

In a blown film extrusion process, one or more polymers can be first fed into a heated barrel containing a rotating screw through a hopper, and conveyed forward by the rotating screw and melted by both friction and heat generated by the rotation of the screw. The polymer melt can travel through the barrel from the hopper end to the other end of the barrel connected with a blown film die. Generally, an adapter may be installed at the end of the barrel to provide a transition between the blown film die and the barrel before the polymer melt is extruded through the slit of the blown film die. To produce multilayer films, an equipment with multiple extruders joined with a common blown film die can be used. Each extruder is responsible for producing one component layer, in which the polymer of each layer can be melted in the respective barrel and extruded through the slit of the blown film die. After forced through the blown film die, the extrudate can be blown up by air from the center of the blown film die like a balloon tube. Mounted on top of the die, a high-speed air ring can blow air onto the hot film to cool it. The cooled film tube can then pass through nip rolls where the film tube can be flattened to form a flat film. The flat film can be then either kept as such or the edges of the lay-flat can be slit off to produce two flat film sheets and wound up onto reels for further use. The volume of air inside the tube, the speed of the nip rollers and the extruders output rate generally play a role in determining the thickness and size of the film.

In some embodiments, the barrel has a diameter of about 1 inch to about 10 inches, from about 2 inches to about 8 inches, from about 3 inches to about 7 inches, from about 4 inches to about 6 inches, or about 5 inches. In other embodiments, the barrel has a diameter from about 1 inch to about 4 inches, from about 2 inches to about 3 inches or about 2.5 inches. In certain embodiments, the barrel has a length to diameter (L/D) ratio from about 10:1 to about 30:1, from about 15:1 to about 25:1, or from about 20:1 to about 25:1. In further embodiments, the L/D ratio is from about 22:1 to about 26:1, or from about 24:1 to about 25:1.

The barrel can be divided into several temperature zones. The zone that is closest to the hopper end of the barrel is usually referred to as Zone 1. The zone number increases sequentially towards the other end of the barrel. In some embodiments, there are 1, 2, 3, 4, 5, 6, 7, 8, 9, or 10 temperature zones in a barrel. In other embodiments, there are more than 10, more than 15, more than 20 temperature zones in a barrel. The temperature of each temperature zone in the barrel can range from about 50° F. to about 1000° F., from about 80° F. to about 800° F., from about 100° F. to about 700° F. from about 150° F. to about 600° F., from about 200° F. to about 500° F., or from about 250° F. to about 450° F. In some embodiments, the barrel temperature increases sequentially from the first Zone to the last Zone. In other embodiments, the barrel temperature remains substantially the same throughout the barrel. In other embodiments, the barrel temperature decreases from the first Zone to the last Zone. In further embodiments, the barrel temperature changes randomly from one zone to another.

In some embodiments, the die can also be heated to a specific temperature, ranging from about 250° F. to about 700° F., from about 300° F. to about 600° F., from about 350° F. to about 550° F., from about 400° F. to about 500° F. In other embodiments, the die temperature ranges from about 425° F. to about 475° F. or from 430° F. to about 450° F.

The adapter temperature can be between the die temperature and the temperature of the last zone. In some embodiments, the adapter temperature is from about 200° F. to about 650° F., from about 250° F. to about 600° F., from about 300° F. to about 550° F., from about 350° F. to about 500° F., and from about 400° F. to about 450° F.

Cast Film Process

The cast film process involves the extrusion of polymers melted through a slot or flat die to form a thin, molten sheet or film. This film can then be "pinned" to the surface of a chill roll by a blast of air from an air knife or vacuum box. The chill roll can be water-cooled and chrome-plated. The film generally quenches immediately on the chill roll and can subsequently have its edges slit prior to winding.

Because of the fast quench capabilities, a cast film generally is more glassy and therefore has a higher optic transmission than a blown film. Further, cast films generally can be produced at higher line speeds than blown films. Further, the cast film process may produce higher scrap due to edge-trim, and may provide films with very little film orientation in the cross-direction.

As in blown film, co-extrusion can be used to provide multilayer films disclosed herein. In some embodiments, the multilayer films may have additional functional, protective, and decorative properties than monolayer films. Cast films can be used in a variety of markets and applications, including stretch/cling films, personal care films, bakery films, and high clarity films.

In some embodiments, a cast film line may comprise an extrusion system, a casting machine, and a winder. Optionally, the cast film line may further comprise a gauging system, a surface treatment system and/or an oscillation stand. The cast film die can be generally positioned vertically above the main casting roll and the melt can be pinned against the casting roll with the use of an air knife and/or vacuum box.

The casting machine is generally designed to cool the film and provide the desired surface finish on the film. In some embodiments, the casting machine comprises two casting rolls. The main casting roll may be used to provide initial cooling and surface finish on the film. The secondary casting roll can cool the opposite side of the film to provide uniformity in the film. For embossed film applications, the casting roll may have an engraved pattern and can be nipped with a rubber roll. Optionally, a water bath and squeegee roll can be used for cooling the surface of the rubber roll.

The casting rolls can be double shell style with spiral baffle, and may have an internal flow design to maintain superior temperature uniformity across the width of the web. Optionally, cold water from the heat transfer system can be circulated to cool the rolls.

Once cast, the film can optionally pass through a gauging system to measure and control thickness. Optionally, the film can be surface-treated either by a corona or a flame treater and passed through an oscillating station to randomize any gauge bands in the final wound product. Before the cast film enters the winder, the edges can be trimmed for recycling or disposal. In some embodiments, automatic roll and shaft handling equipment are sometimes provided for winders with short cycle times.

Laminate Film Process

In the laminate film process for making a multilayer film, the polymers for each of the layers are independently processed by an extruder to polymer melts. Subsequently, the polymer melts are combined in layers in a die, formed into a casting, and quenched to the solid state. This casting may be drawn uniaxially in the machine direction by reheating to from about 50° C. to about 200° C. and stretching from about 3 times to about 10 times between rolls turning at different speeds. The resulting uniaxially oriented film can then be oriented in the transverse direction by heating to from about 75° C. to about 175° C. in an air heated oven and stretching from about 3 times to about 10 times between diverging clips in a tenter frame.

Alternately, the two direction stretching may take place simultaneously in which case the stretching may be from about 3 times to about 10 times in each direction. The oriented film can be cooled to near ambient temperature. Subsequent film operations, such as corona treatment and metalization, may then be applied. Alternatively, the layers of the multilayer film can be brought together in stages rather than through the same die. In some embodiments, the base layer is cast initially, and then the sealant layer can be extrusion coated onto the base layer casting. In other embodiments, the sealant layer is cast initially, and then the base layer can be extrusion coated onto the sealant layer casting. In further embodiments, the sealant layer is cast initially, and then the tie layer and base layer can be extrusion coated onto the sealant layer casting sequentially or simultaneously. In further embodiments, the base layer is cast initially, and then the tie layer and sealant layer can be extrusion coated onto the base layer casting sequentially or simultaneously. This extrusion coating step may occur prior to MD orientation or after MD orientation.

If desirable, the multilayer film can be coated with a metal such as aluminum, copper, silver, or gold using conventional metalizing techniques. The metal coating can be applied to the base layer or sealant layer by first corona treating the surface of the base layer or sealant layer and then applying the metal coating by any known method such as sputtering, vacuum deposition, or electroplating.

If desirable, other layers may be added or extruded onto the multilayer film, such an adhesive or any other material depending on the particular end use. For example, the outer surface of the multilayer film, such as the base layer or sealant layer, may be laminated to a layer of cellulosic paper.

Three Layer Blown Film

Three-layer films were made by a blown film extrusion process on a 6 inch 3-Layer co-extrusion blown film line. The equipment was as follows:

1. Extruder A 2½" Egan 60 HP, 100 amp Max, 127 RPM, 24:1 Ratio.
2. Extruder B 2½" Egan 75 HP, 123 amp Max, 157 RPM, 24:1 Ratio.
3. Extruder C 2" Johnson 20 HP, 42 amp Max, 150 RPM, 24:1 Ratio.
4. Haul-Off, 500 fpm Max.

A Battenfeld Gloucester Extrol 6032 Process Control System with CRT display screen and printer was employed with a Battenfeld Gloucester hopper loading system with three hoppers. A six inch 3 layer co-extrusion Macro die and air ring was employed along with a die gap of 70 mil. A 10 HP Buffalo blower with variable speed control for air ring cooling air was used in conjunction with piped in block chilled water for chilled air in air ring. Other equipment included a Gloucester tower with Sano collapsing frame, bubble sizing cage and bubble enclosure for 18 to 40 inch lay flat, with nip rolls 54" long, adjustable bubble cage elevators, 15 HP blower on collapsing frame, a Gloucester 116 dual turret winder with 52" lug type expanding shafts with automatic cut-over, a 200 CFM fan coil heat exchanger from AEC, a Battenfeld Gloucester Internal Bubble Cooling (IBC) System, a Battenfeld Gloucester Cooling System for the IBC System.

Two screws for the 2½" Egan Extruders were used. The core is a DSB II manufactered by Davis Standard, has a bar flight type, a metering depth of 0.204 inches, a feed depth of 0.48 inches, a comp. ratio of 2.35, a MAD mixer type, a 0.04 inch mixer clear, a feed length of 5 inches, a tran. length of 14 inches and a meter length of 2 inches. The outside screw for the 2½" Egan Extruder is a SF High shear (with 2 interchangeable mixers) manufactured by New Castle, has an SF flight type, a metering depth of 0.104 inches, a feed depth of 0.3 inches, a comp. ratio of 2.88, a twisted Egan/Z-mixer type, a 0.0345 mixer clear, a feed length of 6 inches, a tran. length of 6 inches and a meter length of 12 inches.

The screw for the 2" Johnson Extruder is manufactered by Johnson, has an SF flight type, a metering depth of 0.17 inches, a feed depth of 0.425 inches, a comp. ratio of 2.5, a MAD mixer type, a 0.035 inch mixer clear, a feed length of 5 inches, a tran. length of 8 inches and a meter length of 8 inches.

Precision Air Convey Corporation Trim Removal System model number BC3-06-22A and Western Polymers Entrac Dual Iris for 6 inch monolayer die Model Number SAT II 0601 were also employed.

Three-layer films were made by a blown film extrusion process using the equipment above. One extruder was used for making the sealant layer, which has a barrel diameter of 2.5 inch and a single-flight-high-shear screw with a screw compression ratio of 2.88. A second extruder was used for making the tie layer, which has a barrel diameter of 2.5 inch and a modified-double-mix screw with a screw compression ratio of 3.64. A third extruder was used for making the base layer, which has a barrel diameter of 2.0 inch and a single-flighted screw with a screw compression ratio of 2.5. Each barrel has a length to diameter (L/D) ratio of 24:1 and has four temperature Zones, i.e., Zone 1, Zone 2, Zone 3, and Zone 4. Zone 1 is closest to the hopper end and Zone 4 is closest to the die end. The barrel diameter was 2.5 inch. All of barrels have smooth surfaces. The chill roll temperature was about 15° C. The Nip Pressure was about 13 kg/cm. The Extrusion Rate was about 35 kg/hr.

The temperatures profiles of each extruder is listed in Table 8 below.

TABLE 8

| Film Layer | Sealant layer | Tie layer | Base layer |
|---|---|---|---|
| Zone 1 (° F.) | 285 | 375 | 400 |
| Zone 2 (° F.) | 300 | 425 | 425 |
| Zone 3 (° F.) | 385 | 375 | 440 |
| Zone 4 (° F.) | 385 | 375 | 440 |
| Adapter Temp. (° F.) | 410 | 400 | 440 |

According to the type of polymers used, the following films were made.

Example BB

Example BB comprised a sealant layer made of 100% polymer of Example 16, a tie layer made of 90% ATTANE™ 4201 G, a linear low density polyethylene (LLDPE) having an $I_2$ of 1 and a density of 0.912 g/cc available at Dow Chemical, 10% of AMPLIFY™ GR 205, a maleic anhydride-grafted polyethylene available at Dow Chemical, and a base layer made of 100% ULTRAMID® C33L, a polyamide copolymer available at BASF. The total thickness of the film was 3.5 mils. The base layer had a thickness of 0.875 mils, constituting 25% of the total thickness. The tie layer had a thickness of 1.75 mils, constituting 50% of the total thickness. The sealant layer had a thickness of 0.875, constituting 25% of the total thickness.

Example CC

Example CC comprised a sealant layer made of 100% polymer of Example 17, a tie layer made of 90% ATTANE™ 4201 G, a linear low density polyethylene (LLDPE) having an $I_2$ of 1 and a density of 0.912 g/cc available at Dow Chemical, 10% of AMPLIFY™ GR 205, a maleic anhydride-grafted polyethylene available at Dow Chemical, and a base layer made of 100% ULTRAMID® C33L, a polyamide copolymer available at BASF. The total thickness of the film was 3.5 mils. The base layer had a thickness of 0.875 mils, constituting 25% of the total thickness. The tie layer had a thickness of 1.75 mils, constituting 50% of the total thickness. The sealant layer had a thickness of 0.875, constituting 25% of the total thickness.

Comparative Example DD

Comparative Example DD comprised a sealant layer made of 100% AFFINITY™ PL 1880G having an $I_2$ of 1 and a 0.902 g/cc density, a tie layer made of 90% ATTANE™ 4201 G, a linear low density polyethylene (LLDPE) having an $I_2$ of 1 and a density of 0.912 g/cc available at Dow Chemical, 10% of AMPLIFY™ GR 205, a maleic anhydride-grafted polyethylene available at Dow Chemical, and a base layer made of 100% ULTRAMID® C33L, a polyamide copolymer available at BASF. The total thickness of the film was 3.5 mils. The base layer had a thickness of 0.875 mils, constituting 25% of the total thickness. The tie layer had a thickness of 1.75 mils, constituting 50% of the total thickness. The sealant layer had a thickness of 0.875, constituting 25% of the total thickness.

Comparative Example EE

Comparative Example EE comprised a sealant layer made of 100% EXACT™ 3132 having an $I_2$ of 1.02 and 0.900 g/cc density, a tie layer made of 90% ATTANE™ 4201G, a linear low density polyethylene (LLDPE) having an $I_2$ of 1 and a density of 0.912 g/cc available at Dow Chemical, 10% of AMPLIFY™ GR 205, a maleic anhydride-grafted polyethylene available at Dow Chemical, and a base layer made of 100% ULTRAMID® C33L, a polyamide copolymer available at BASF. The total thickness of the film was 3.5 mils. The base layer had a thickness of 0.875 mils, constituting 25% of the total thickness. The tie layer had a thickness of 1.75 mils, constituting 50% of the total thickness. The sealant layer had a thickness of 0.875, constituting 25% of the total thickness.

Example II

Example II was a two-layer film. The base layer was made of Biaxially Oriented Polypropylene (BOPP) with a thickness of 0.5 mils. The sealant layer was made of the polymer of Example 18 with a thickness of 0.75 mils.

Example JJ

Example JJ was a three-layer film. The inside base layer was made of PET or Nylon with a thickness of 2 mils. The outside sealant layer was made of the polymer of Example 19 with a thickness of 2 mils. The tie layer between the sealant layer and the base layer was poly(ethylene vinyl acetate) with a thickness of 1 mils.

Example KK

Example KK was a four-layer film. The first layer was a base layer made of polycarbonates with a thickness of 0.1 mils. The second layer was a tie layer made of low density polyethylene (LDPE) with a thickness of 0.3 mils. The third layer was a sealant layer made of the polymer of Example 20 with a thickness of 0.7 mils.

Example LL

Example LL was a five-layer film. The first layer was a base layer made of polystyrene with a thickness of 0.3 mils. The second layer was a tie layer made of acid-modified polyolefin polymer with a thickness of 1 mil. The third layer was a middle layer made of vinylidene chloride (VDC)-methyl acrylate (MA) copolymer with a thickness of 0.5 mils. The fourth layer was a tie layer also made of acid-modified polyolefin polymer with a thickness of 1 mil. The fifth layer was a sealant layer made of the polymer of Example 21 with a thickness of 1.8 mils.

For examples BB-EE, the extruder profiles are approximately the same as shown in Table 8. For Examples MM through PP below, the extruder profiles are shown in Table 8a below:

TABLE 8a

| Film Layer | Sealant layer | Tie layer | Base layer |
|---|---|---|---|
| Zone 1 (° F.) | 375 | 375 | 400 |
| Zone 2 (° F.) | 425 | 425 | 425 |
| Zone 3 (° F.) | 375 | 375 | 440 |
| Zone 4 (° F.) | 375 | 375 | 440 |
| Adapter Temp. (° F.) | 400 | 400 | 440 |

Example MM

Example MM comprised a sealant layer made of 100% polymer of Example 20, a tie layer made of 90% DOWLEX™ 2038.68G, having a 1 I2 and a 0.935 g/cc density, a linear low density polyethylene (LLDPE) available at Dow Chemical, 10% of AMPLIFY™ GR 205, a maleic anhydride-grafted polyethylene available at Dow Chemical, and a base layer made of 100% ULTRAMID® C33L, a polyamide copolymer available at BASF. The total thickness of the film was 3.5 mils. The base layer had a thickness of 0.875 mils, constituting 25% of the total thickness. The tie layer had a thickness of 1.75 mils, constituting 50% of the total thickness. The sealant layer had a thickness of 0.875, constituting 25% of the total thickness.

Example NN

Example NN comprised a sealant layer made of 100% polymer of Example 21, a tie layer made of 90% DOWLEX™ 2038.68G, a linear low density polyethylene (LLDPE) available at Dow Chemical, 10% of AMPLIFY™ GR 205, a maleic anhydride-grafted polyethylene available at Dow Chemical, and a base layer made of 100% ULTRAMID® C33L, a polyamide copolymer available at BASF. The total thickness of the film was 3.5 mils. The base layer had a thickness of 0.875 mils, constituting 25% of the total thickness. The tie layer had a thickness of 1.75 mils, constituting 50% of the total thickness. The sealant layer had a thickness of 0.875, constituting 25% of the total thickness.

Comparative Example OO

Comparative Example OO comprised a sealant layer made of 100% polymer of ATTANE™ 4201G, a tie layer made of 90% DOWLEX™ 2038.68G, a linear low density polyethylene (LLDPE) available at Dow Chemical, 10% of AMPLIFY™ GR 205, a maleic anhydride-grafted polyethylene available at Dow Chemical, and a base layer made of 100% ULTRAMID® C33L, a polyamide copolymer available at BASF. The total thickness of the film was 3.5 mils. The base layer had a thickness of 0.875 mils, constituting 25% of the total thickness. The tie layer had a thickness of 1.75 mils, constituting 50% of the total thickness. The sealant layer had a thickness of 0.875, constituting 25% of the total thickness.

Comparative Example PP

Comparative Example PP comprised a sealant layer made of 100% polymer of EXCEED™ 1012CA, a 1 I2, 0.912 g/cc density LLDPE available from ExxonMobil Corporation, a tie layer made of 90% DOWLEX™ 2038.68G, a linear low density polyethylene (LLDPE) available at Dow Chemical, 10% of AMPLIFY™ GR 205, a maleic anhydride-grafted polyethylene available at Dow Chemical, and a base layer made of 100% ULTRAMID® C33L, a polyamide copolymer available at BASF. The total thickness of the film was 3.5 mils. The base layer had a thickness of 0.875 mils, constituting 25% of the total thickness. The tie layer had a thickness of 1.75 mils, constituting 50% of the total thickness. The sealant layer had a thickness of 0.875, constituting 25% of the total thickness.

Hot Tack Strength

Hot tack strength of BB-PP was measured on a J&B type Hot Tack testing apparatus following ASTM F 1921, Method B. As the thickness of the sealant layer was less than 1 mil, the dwell time was 500 ms. The seal pressure was 27.5 N/cm². Test specimens were 1 inch in width and were conditioned as specified by ASTM E 171. All specimens tested failed in an adhesive failure mode. The results are listed in Table 9 below.

TABLE 9

| | | Seal Bar Temperature (° C.) | | | | | | | | |
|---|---|---|---|---|---|---|---|---|---|---|
| | Example | 80 | 90 | 100 | 110 | 120 | 130 | 140 | 150 | 160 |
| Ex. BB | No. of Specimen | 5 | 5 | 7 | 6 | 5 | 7 | 6 | 5 | 7 |
| | Average Hot Tack (N) | 0.86 | 1.43 | 3.87 | 6.43 | 8.58 | 7.58 | 5.96 | 3.99 | 2.84 |

TABLE 9-continued

| | Example | Seal Bar Temperature (° C.) | | | | | | | | |
|---|---|---|---|---|---|---|---|---|---|---|
| | | 80 | 90 | 100 | 110 | 120 | 130 | 140 | 150 | 160 |
| | Standard Deviation (N) | 0.39 | 0.59 | 0.61 | 0.55 | 0.35 | 0.69 | 0.60 | 0.32 | 0.49 |
| Ex. CC | No. of Specimen | 3 | 7 | 12 | 9 | 5 | 6 | 8 | 9 | 5 |
| | Average Hot Tack (N) | 0.25 | 1.78 | 6.51 | 11.94 | 11.49 | 10.94 | 7.81 | 4.99 | 0.07 |
| | Standard Deviation (N) | 0.16 | 0.49 | 1.45 | 1.58 | 0.65 | 0.89 | 1.12 | 0.84 | 0.04 |
| Ex. DD | No. of Specimen | 6 | 6 | 9 | 6 | 6 | 5 | 7 | 9 | 9 |
| | Average Hot Tack (N) | 3.12 | 4.26 | 6.18 | 6.20 | 6.50 | 5.54 | 4.80 | 4.09 | 3.38 |
| | Standard Deviation (N) | 0.28 | 0.47 | 0.9 | 0.57 | 0.72 | 0.39 | 0.49 | 0.88 | 0.84 |
| Ex. EE | No. of Specimen | 5 | 5 | 12 | 6 | 6 | 10 | 10 | 8 | 14 |
| | Average Hot Tack (N) | 0.35 | 0.86 | 8.45 | 13.72 | 8.5 | 8.55 | 6.7 | 3.98 | 4.43 |
| | Standard Deviation (N) | 0.22 | 0.81 | 1.52 | 0.67 | 0.54 | 1.12 | 1.21 | 0.75 | 2.18 |
| Ex. MM | No. of Specimen | 0 | 4 | 4 | 4 | 4 | 4 | 4 | 4 | 6 |
| | Average Hot Tack (N) | | 0.08 | 2.01 | 6.63 | 9.08 | 9.98 | 8.64 | 6.97 | 4.14 |
| | Standard Deviation (N) | | 0.02 | 0.68 | 1.41 | 0.20 | 0.29 | 0.26 | 0.70 | 1.02 |
| Ex. NN | No. of Specimen | 0 | 4 | 3 | 4 | 4 | 4 | 4 | 4 | 4 |
| | Average Hot Tack (N) | | 0.06 | 1.30 | 8.86 | 11.52 | 11.94 | 9.64 | 6.19 | 4.28 |
| | Standard Deviation (N) | | 0.02 | 0.23 | 0.63 | 0.85 | 0.37 | 1.58 | 0.62 | 0.62 |
| Ex. OO | No. of Specimen | 4 | 4 | 4 | 4 | 4 | 4 | 4 | 4 | 4 |
| | Average Hot Tack (N) | 3.16 | 4.85 | 6.06 | 6.64 | 6.38 | 6.15 | 5.82 | 5.15 | 4.42 |
| | Standard Deviation (N) | 1.31 | 0.48 | 0.38 | 0.18 | 0.33 | 0.25 | 1.46 | 0.87 | 0.62 |
| Ex. PP | No. of Specimen | 4 | 4 | 4 | 4 | 4 | 4 | 4 | 4 | 6 |
| | Average Hot Tack (N) | 0.10 | 1.84 | 6.86 | 10.31 | 10.10 | 9.90 | 9.30 | 6.49 | 4.49 |
| | Standard Deviation (N) | 0.04 | 0.63 | 1.19 | 0.55 | 1.48 | 0.42 | 1.48 | 1.11 | 1.44 |

Figure 30:
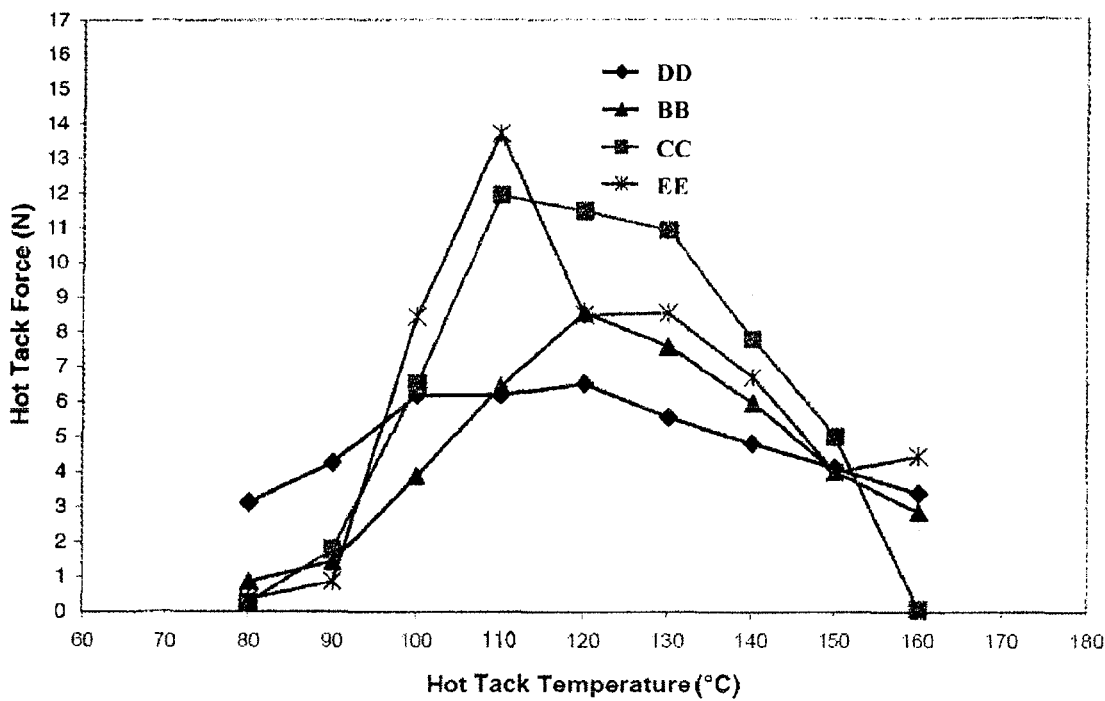
FIG. 30 is a graph showing the average hot tack force (N), i.e., average hot tack strength, of the inventive multilayer films of BB and CC vs. comparative multilayer films of DD and EE.
Figure 31:
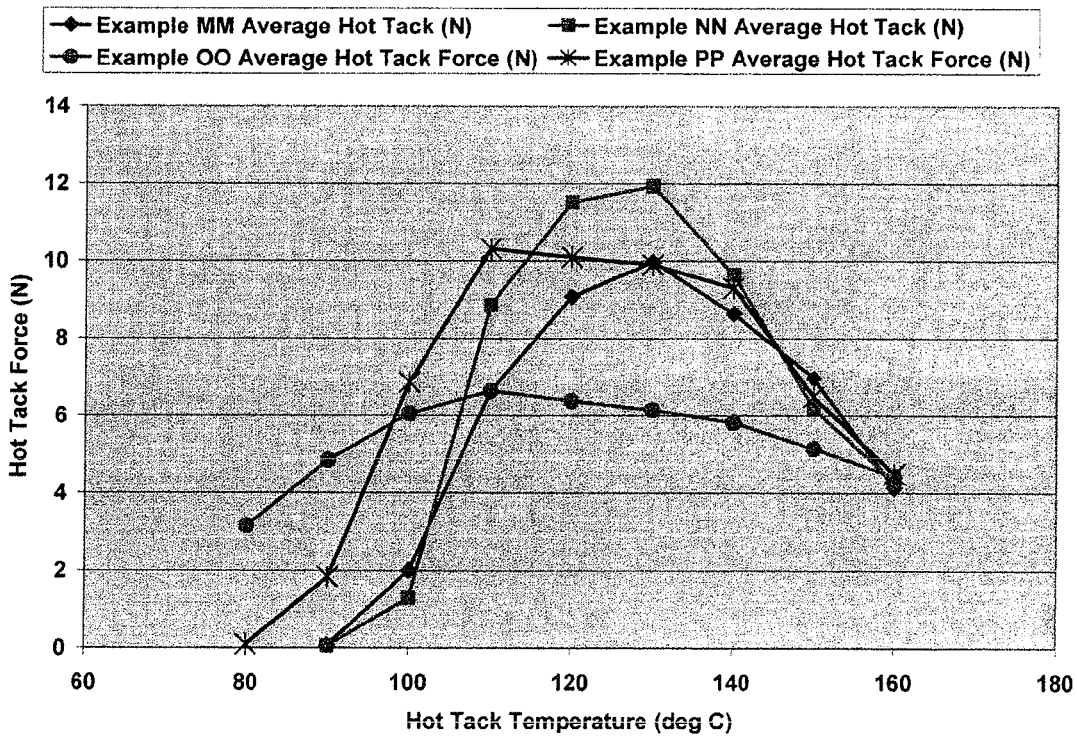
FIG. 31 is a graph showing the average hot tack force (N), i.e., average hot tack strength, of the inventive multilayer films of MM and NN vs. comparative multilayer films of OO and PP.

The average hot tack force (N) of multilayer films of BB, CC, DD, and EE at different temperatures is shown in FIG. 30. It can be seen that BB and CC that comprises the inventive polymers have improved hot tack properties over DD and EE that comprise comparative polymers. The average hot tack force (N) of multilayer films of examples MM, NN, OO, and PP are shown in FIG. 31. It can also be seen that Example NN has improved hot tack properties over Example OO and PP.

Oriented Films

A 25 mil thick film was made using the ethylene/α-olefin interpolymer of Example 22 and subsequently biaxially stretched using a Bruckner biaxial Tenter frame labscale device approximately 4.5× in each direction for a film gauge of about 1.25 mil. The film was oriented at various temperatures and the instrumented Dart impact was tested at ambient temperature using 0.5 inch diameter dart size, a clamp diameter films/1.5 in clamp, and a speed of 3.4 m/s. The results for the oriented film comprising the interpolymer of example 22 is shown in Table 10. The above procedure was conducted again except that Comparative Polymer G was substituted for the polymer of Example 22. The results for the oriented film comprising the interpolymer of Comparative Polymer G is shown in Table 11.

TABLE 10

Oriented Film of Example 22

| | Orientation Temperature | | |
|---|---|---|---|
| | 97° C. | 99° C. | 102° C. |
| Peak Defl avg (in.) | 2.4 | 2.3 | 1.8 |
| Peak Defl sdv (in.) | 0.1 | 0 | 0 |
| Peak energy avg (inch-lbs) | 21.3 | 19.2 | 6.7 |
| Peak Energy sdv (inch-lbs) | 4.3 | 1.4 | 1 |
| Peak load avg (lbs) | 56.5 | 54.5 | 35.6 |
| Peak load sdv (lbs) | 7.3 | 3.9 | 3.1 |
| Total energy avg (inch-lbs) | 21.8 | 19.3 | 6.8 |
| Total energy sdv (inch-lbs) | 4.2 | 1.4 | 1 |

TABLE 11

Oriented Film of Comparative Polymer G

| | Orientation Temperature | | | |
|---|---|---|---|---|
| | 91° C. | 94° C. | 98° C. | 102° C. |
| Peak Defl avg (in.) | 2 | 2 | 1.9 | 1.9 |
| Peak Defl sdv (in.) | 0 | 0 | 0 | 0 |
| Peak energy avg (inch-lbs) | 15 | 13.3 | 11 | 9.6 |
| Peak Energy sdv (inch-lbs) | 1.2 | 2.2 | 1.8 | 1.3 |
| Peak load avg (lbs) | 52.6 | 47 | 39.9 | 33.8 |
| Peak load sdv (lbs) | 1.1 | 1.6 | 2.1 | 1.6 |
| Total energy avg (inch-lbs) | 15.2 | 13.7 | 11.6 | 10 |
| Total energy sdv (inch-lbs) | 1.5 | 1.9 | 1.8 | 1.3 |

Figure 32:
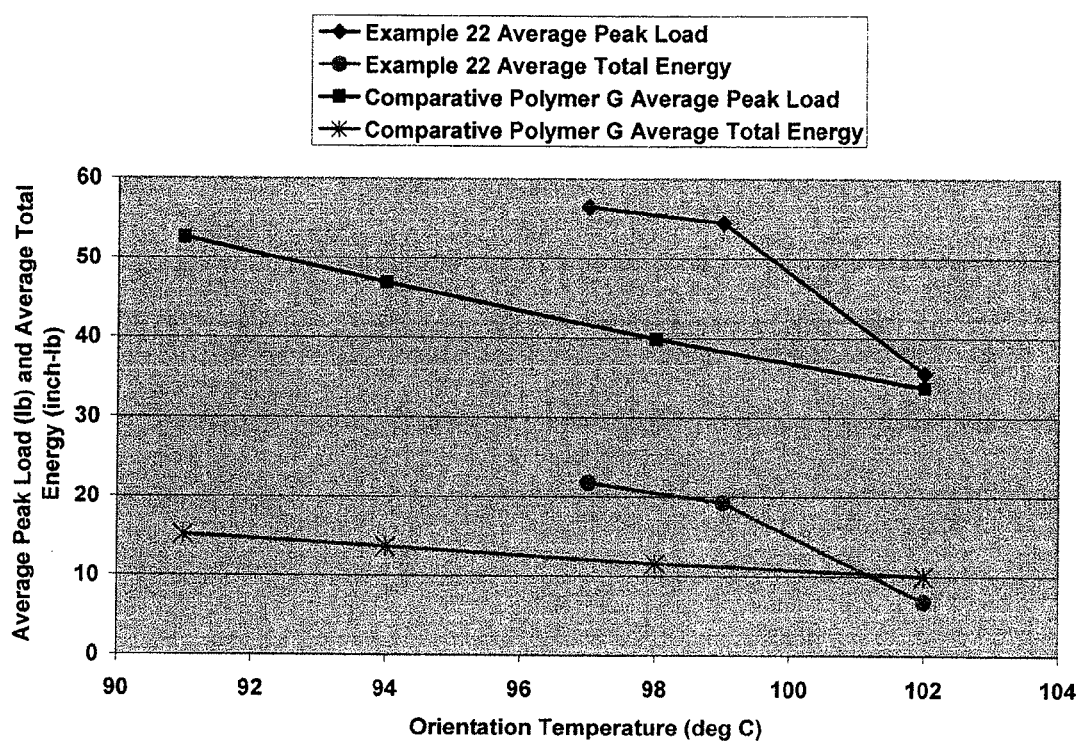
FIG. 32 is a graph showing a comparison of the average peak load and average total energy for an oriented film comprising the interpolymer of Example 22 and an oriented film comprising Comparative Polymer G.

A comparison of average peak load and average total energy is attached as FIG. 32 for the film comprising Example 22 and the film comprising Comparative Polymer G.
Bi-Axially Oriented Multi-Layer Films The first barrier layer—comprises a barrier polymer, particularly having barrier to oxygen. Suitable barrier polymer are Polyvinylidiene chloride copolymer (e.g. Saran from the Dow chemical company), EVOH, Nylon, etc.

Adhesive layers—Adhesive layers each adhered to a respective one of the opposite surface of barrier layer. Suitable polymers for adhesive layers include EVA, MAH-g-Polyethylene, etc.

The multi-layer film is biaxially oriented below the melting point of the unique quasi-homogeneous polyethylene resins using double-bubble, trapped bubble or tenter frame processes well-known in the art. The film can be crosslinked via E-beam radiation or UV radiation prior to the orientation step or after the orientation step. The film has improved puncture and dart impact (toughness) properties while relatively maintaining extrusion processing and ease of orientation in the second bubble. Multi-layer films may be prepared according to the present invention using double bubble process according to, for example, U.S. Pat. No. 3,456,044. The film may be irradiated before or after the orientation step if desired. The below film examples may be made according to the invention. Layer ratios and film thickness can be varied to get desired barrier property and desired toughness (puncture and dart impact) properties.

Layer 1 ETHYLENE/A-OLEFIN INTERPOLYMER
Layer 2 Vinylidene chloride-methyl acrylate (VDC-MA) copolymer as Barrier polymer
Layer 3 Polyolefin
Layer 1 ETHYLENE/A-OLEFIN INTERPOLYMER
Layer 2 Adhesive layer
Layer 3 VDC-MA copolymer
Layer 4 adhesive layer comprising 12% VA EVA
Layer 5 ETHYLENE/A-OLEFIN INTERPOLYMER
Layer 1 ETHYLENE/A-OLEFIN INTERPOLYMER-EVA blend
Layer 2 Adhesive layer
Layer 3 VDC-MA copolymer
Layer 4 adhesive layer
Layer 5 ETHYLENE/A-OLEFIN INTERPOLYMER
Layer 1 ETHYLENE/A-OLEFIN INTERPOLYMER-EVA blend
Layer 2 Adhesive layer,
Layer 3 VDC-MA copolymer
Layer 4 adhesive layer
Layer 5 ETHYLENE/A-OLEFIN INTERPOLYMER-EVA (12% VA) 70/30 blend
Layer 1 Nylon 6
Layer 2 Adhesive layer
Layer 3 EVOH
Layer 4 adhesive layer
Layer 5 ETHYLENE/A-OLEFIN INTERPOLYMER
Layer 1 Nylon 6
Layer 2 Adhesive layer
Layer 3 70/30 EVOH/Nylon 6 blends
Layer 4 adhesive layer
Layer 5 ETHYLENE/A-OLEFIN INTERPOLYMER
Layer 1 ETHYLENE/A-OLEFIN INTERPOLYMER-VLDPE (0.905 g/cc, 0.8 MI) 70/30 blend
Layer 2 Adhesive layer
Layer 3 VDC-MA copolymer
Layer 4 adhesive layer
Layer 5 ETHYLENE/A-OLEFIN INTERPOLYMER
Layer 1 ETHYLENE/A-OLEFIN INTERPOLYMER-VLDPE blend
Layer 2 Adhesive layer
Layer 3 VDC-MA copolymer
Layer 4 adhesive layer, 12% VA EVA
Layer 5 ETHYLENE/A-OLEFIN INTERPOLYMER-VLDPE blend
Layer 1 ETHYLENE/A-OLEFIN INTERPOLYMER-LLDPE blend
Layer 2 Adhesive layer, 12% VA EVA
Layer 3 VDC-MA copolymer
Layer 4 adhesive layer, 12% VA EVA
Layer 5 ETHYLENE/A-OLEFIN INTERPOLYMER
Layer 1 ETHYLENE/A-OLEFIN INTERPOLYMER-EVA blend
Layer 2 VDC-MA copolymer
Layer 3 ETHYLENE/A-OLEFIN INTERPOLYMER-EVA blend
Layer 1 ETHYLENE/A-OLEFIN INTERPOLYMER
Layer 2 Adhesive layer
Layer 3 EVOH
Layer 4 adhesive layer
Layer 5 ETHYLENE/A-OLEFIN INTERPOLYMER
Layer 1 ETHYLENE/A-OLEFIN INTERPOLYMER
Layer 2 Adhesive layer
Layer 3 EVOH-Nylon blends
Layer 4 adhesive layer
Layer 5 ETHYLENE/A-OLEFIN INTERPOLYMER
Layer 1 ETHYLENE/A-OLEFIN INTERPOLYMER
Layer 2 Adhesive layer
Layer 3 VDC-MA
Layer 4 adhesive layer
Layer 5 VLDPE
Layer 1 ETHYLENE/A-OLEFIN IN having 0.902 g/cc, MI=1.0, I10/I2=5.6
Layer 2 Adhesive layer
Layer 3 PET or Nylon
Layer 1 ETHYLENE/A-OLEFIN INTERPOLYMER having 0.902 g/cc, MI=1.0, I10/I2=5.6
Layer 2 Adhesive layer
Layer 3 VDC-MA copolymer
Layer 4 adhesive layer
Layer 5 Nylon
Layer 1 ETHYLENE/A-OLEFIN INTERPOLYMER having 0.902 g/cc, MI=1.0, I10/I2=5.6
Layer 2 Adhesive layer
Layer 3 BOPP Layer 1 ETHYLENE/A-OLEFIN INTERPOLYMER having 0.902 g/cc, MI=1.0, I10/12=5.6
Layer 2 LDPE
Layer 3 BOPP Theoretical Methods and Explanation To support the instant invention calculations were carried out using the commercially-available software package, Gaussian98 Revision A.10 distributed by Gaussian, Inc., Pittsburgh Pa., 2001. The computations utilized the density functional theory (DFT) method, B3LYP as described in, for example, Becke, A. D. *J. Chem. Phys.* 1993, 98, 5648; Lee, C.; Yang, W.; Parr, R. G. *Phys. Rev B* 1988, 37, 785; and Miehlich, B.; Savin, A.; Stoll, H.; Preuss, H. *Chem. Phys. Lett.* 1989, 157, 200 each of which is incorporated herein by reference. In a few cases, the results were reconfirmed using conventional theory with correlation, Møller-Plesset perturbation theory to second order (MP2) as described in, for example, Møller, C.; Plesset, M. S. *Phys. Rev.* 1934, 46, 618; Head-Gordon, M.; Pople, J. A.; Frisch, M. J. *Chem. Phys. Lett.* 1988, 153, 503; Frisch, M. J.; Head-Gordon, M.; Pople, J. A. *Chem. Phys. Lett.* 1990, 166, 275; Frisch, M. J.; Head-Gordon, M.; Pople, J. A. *Chem. Phys. Lett.* 1990, 166, 281; Head-Gordon, M.; Head-Gordon, T. *Chem. Phys. Lett.* 1994, 220, 122; and Saebo, S.; Almlof, J. *Chem. Phys. Lett.* 1989, 154, 83 each of which is incorporated herein by reference. Qualitatively, the results using MP2 were similar to those for B3LYP. A series of different basis sets were used and tested. Initially the modest LANL2DZ basis set as described in, for example, Dunning, Jr., T. H.; Hay, P. J. in *Modern Theoretical Chemistry*, Ed. H. F. Schaefer, III, Plenum, New York, 1976, vol 3, 1; Hay, P. J. Wadt, W. R. *J. Chem. Phys.* 1985, 82, 270; Wadt, W. R; Hay, P. J. *J. Chem. Phys.* 1985, 82, 284; and Hay, P. J. Wadt, W. R. *J. Chem. Phys.* 1985, 82, 299, was used for all atoms, but progressively larger basis sets were employed such as i) LANL2DZ on the transition metal and 6-31G* on all the other atoms as described in Ditchfield, R.; Hehre, W. J.; Pople, J. A. *J. Chem. Phys.* 1971, 54, 724; Hehre, W. J.; Ditchfield, R.; Pople, J. A. *J. Chem. Phys.* 1972, 56, 2257; and Gordon, M. S. *Chem. Phys. Lett.* 1980, 76, 163 and ii) LANL2DZ on the transition metal and 6-311G** on all other atoms as described in McLean, A. D.; Chandler, G. S. *J. Chem. Phys.* 1980, 72, 5639; and Krishnan, R.; Binkley, J. S.; Seeger, R.; Pople, J. A. *J. Chem. Phys.* 1980, 72, 650 and these did not qualitatively change the results. The inclusion of enthalpic and free energy corrections at a given temperature also did not change the results significantly.

The calculations involved locating four stationary points on the potential energy surface (see Diagram 1). Standard optimizations and defaults within the Gaussian98 program were utilized which included the Berny optimizer in redundant internal coordinates as described in Peng, C.; Ayala, P. Y.; Schlegel, H. B. Frisch, M. J. *J. Comp. Chem.* 1996, 17, 49; and Peng, C.; Schlegel, H. B. *Israel. J. Chem.* 1994, 33, 449. The four structures located were the transition state for ethylene inserting into the M-aryl or M-hydrocarbyl bond of the original species (1), the transition state for ethylene inserting in the polymeryl chain of the original species (2), the product of inserting into the aryl or hydrocarbyl group (3), and the product of inserting into the polymeryl chain (4). The stationary points defined as transition states were confirmed by one and only one imaginary frequency (corresponding to the reaction coordinate) as determined from mass-weighting of the eigenvalues from the diagonalization of the second derivative or Hessian matrix. The two products, 3 and 4, have no imaginary frequencies upon this analysis.

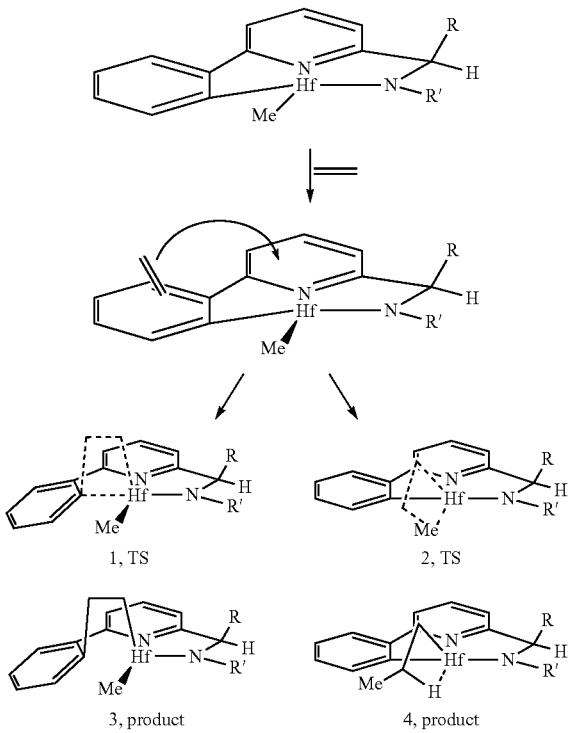

Diagram 1. Pathways to aryl or hydrocarbyl inserted and alkyl inserted products.

In examples involving ethylene/octene, more than one potential 'inserted' catalyst could be formed. Diagram 2 depicts the four possible octene inserted catalysts from one face. These four unique catalysts each could create polymer with different properties such as molecular weight and comonomer incorporation.

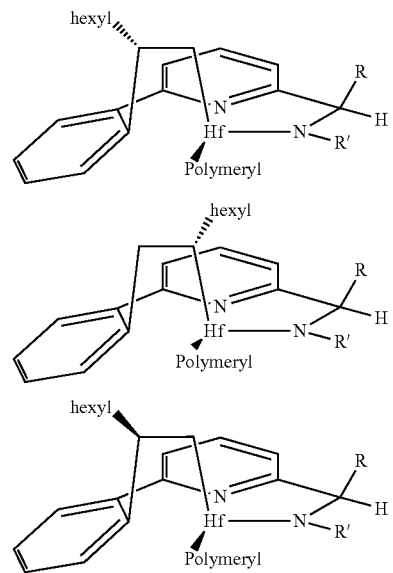

Diagram 2. Four possible octene inserted catalysts.

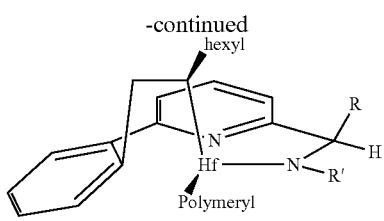

Insertions can occur on the top and bottom faces of the catalyst and these can be unique depending on the overall symmetry of the initial catalyst (Diagram 3). For the specific catalyst below, insertions into the top and bottom faces lead to unique isomers. Thus for ethylene/octene polymerizations, up to ten unique 'inserted' catalysts are possible. The aforementioned calculations indicate that not all are favorable, but certainly more than one is possible. As described above, the Applicants have determined that different conditions can be used to favor one or some over others.

Diagram 3. Ethylene inserting into top and bottom faces of the initial catalyst. Whether these two products are different depends on the symmetry of the catalyst (groups at R and R').

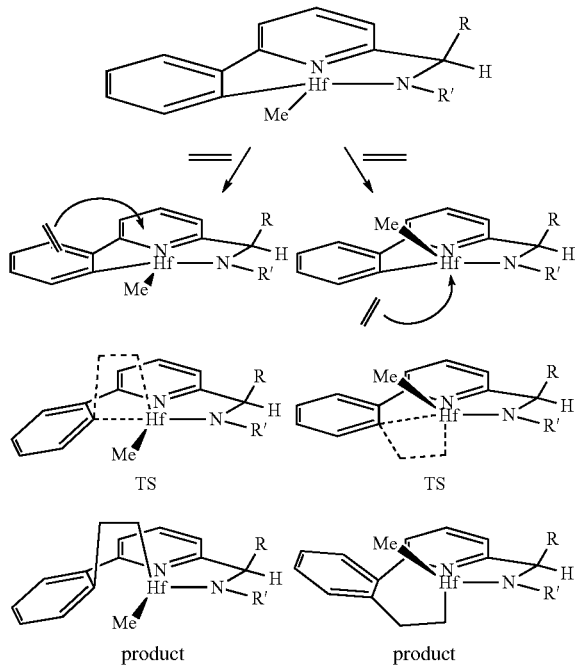

Based on catalyst activity such as the one above, barriers important for the polymerization may be estimated. If insertion into the aryl or hydrocarbyl is less than 10 kcal/mol higher than insertion into the alkyl, this reaction should occur during the polymerization cycle. From Diagrams 1 and 4, this implies that TS 1 lies no higher than 10 kcal/mol above TS 2. It is preferable that this difference is less than 5 kcal/mol and even more preferable that insertion into the aryl or hydrocarbyl is less than insertion into the alkyl. Insertion into the alkyl is not a reversible process, but to avoid reversibility of insertion into the aryl or hydrocarbyl, the product of insertion into the aryl or hydrocarbyl cannot lie more than 5 kcal/mol above insertion into the alkyl. From Diagrams 1 and 4, this implies that Product 3 lies no higher than 5 kcal/mol above Product 4. However, it is preferable that this difference is less and even more preferable that the product of aryl or hydrocarbyl insertion is lower than the product of alkyl insertion. Diagram 4 depicts a potential energy surface of the two processes.

Diagram 4. Potential energy surface for insertion into the Hf-aryl and Hf-alkyl bonds.

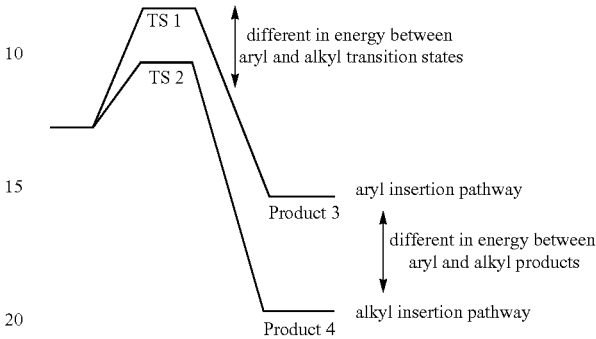

One skilled in the art may apply the above principles in selecting reaction conditions and catalyst to achieve a desired controlled molecular weight.

What is claimed is:

1. An ethylene/α-olefin interpolymer which has
   (i) a DSC curve characterized by an area under the DSC curve from the melting peak temperature to the end of melting is at least about 17% of the total area under the DSC melting curve from −20° C. to the end of melting;
   (ii) a density from about 0.875 g/cc to about 0.915 g/cc; and
   (iii) a $I_{10}/I_2$ from 5.5 to 6.5.

2. The ethylene/α-olefin interpolymer of claim 1 having no long chain branching.

3. The ethylene/α-olefin interpolymer of claim 1 which has a DSC curve characterized by an area under the DSC curve from the melting peak temperature to the end of melting is at least about 19% of the total area under the DSC melting curve from −20° C. to the end of melting.

4. The ethylene/α-olefin interpolymer of claim 1 which has a DSC curve characterized by an area under the DSC curve from the melting peak temperature to the end of melting is from at least about 19% to about 35% of the total area under the DSC melting curve from −20° C. to the end of melting.

5. The ethylene/α-olefin interpolymer of claim 1 which has a DSC curve characterized by an area under the DSC curve from the melting peak temperature to the end of melting is at least about 21% of the total area under the DSC melting curve from −20° C. to the end of melting.

6. The ethylene/α-olefin interpolymer of claim 1 which has a density from about 0.895 g/cc to about 0.910 g/cc.

7. The ethylene/α-olefin interpolymer of claim 1 wherein the $I_{10}/I_2$ is from about 5.6 to about 6.3.

8. The ethylene/α-olefin interpolymer of claim 1 wherein the interpolymer has a molecular weight distribution in the range from about 2.0 to about 3.8.

9. The ethylene/α-olefin interpolymer of claim 1 wherein the interpolymer has a molecular weight distribution in the range from about 2.2 to about 2.8.

10. The ethylene/α-olefin interpolymer of claim 1 which has a B value of greater than about 0.98.

11. The ethylene/α-olefin interpolymer of claim 1 having a density from 0.895 g/cc to 0.915 g/cc.

12. The ethylene/α-olefin interpolymer of claim 1 wherein the ethylene/α-olefin interpolymer is an ethylene/octene copolymer.

13. A film comprising:
an ethylene/α-olefin interpolymer which has
  (i) a DSC curve characterized by an area under the DSC curve from the melting peak temperature to the end of melting is at least about 17% of the total area under the DSC melting curve from −20° C. to the end of melting;
  (ii) a density from about 0.875 g/cc to about 0.915 g/cc; and
  (iii) a $I_{10}/I_2$ from 5.5 to 6.5.

14. The film of claim 13 wherein the ethylene/α-olefin interpolymer has no long chain branching.

15. The film of claim 13 wherein the ethylene/α-olefin interpolymer has a density from about 0.895 g/cc to about 0.915 g/cc.

16. The film of claim 13 wherein the ethylene/α-olefin interpolymer has a $I_{10}/I_2$ from about 5.6 to about 6.3.

17. A multilayer film comprising:
  a) a base layer comprising a first polymer;
  b) a tie layer comprising a second polymer; and
  c) a sealant layer comprising an ethylene/α-olefin interpolymer,
wherein the tie layer is between the base layer and the sealant layer and wherein the ethylene/α-olefin interpolymer of the sealant layer has
  (i) DSC curve characterized by an area under the DSC curve from the melting peak temperature to the end of melting is at least about 17% of the total area under the DSC melting curve from −20° C. to the end of melting;
  (ii) a density from about 0.875 g/cc to about 0.915 g/cc; and
  (iii) a $I_{10}/I_2$ from 5.5 to 6.5.

18. The multilayer film of claim 17 wherein the ethylene/α-olefin interpolymer has no long chain branching.

19. The ethylene/α-olefin interpolymer of claim 17 which has a density from about 0.895 g/cc to about 0.915 g/cc.

20. The ethylene/α-olefin interpolymer of claim 17 wherein the $I_{10}/I_2$ is from about 5.6 to about 6.3.

* * * * *